US008374446B2

(12) United States Patent
Mokrushin

(10) Patent No.: US 8,374,446 B2
(45) Date of Patent: Feb. 12, 2013

(54) ENCODING AND DECODING OF DIGITAL SIGNALS BASED ON COMPRESSION OF HIERARCHICAL PYRAMID

(76) Inventor: Vsevolod Yurievich Mokrushin, St. Petersburg (RU)

( * ) Notice: Subject to any disclaimer, the term of this patent is extended or adjusted under 35 U.S.C. 154(b) by 341 days.

(21) Appl. No.: 12/733,902

(22) PCT Filed: Sep. 28, 2007

(86) PCT No.: PCT/RU2007/000508
§ 371 (c)(1),
(2), (4) Date: Mar. 26, 2010

(87) PCT Pub. No.: WO2009/041843
PCT Pub. Date: Apr. 2, 2009

(65) Prior Publication Data
US 2010/0226569 A1     Sep. 9, 2010

(51) Int. Cl.
*G06K 9/36* (2006.01)
*G06K 9/46* (2006.01)
(52) U.S. Cl. .................. 382/240; 382/232; 382/244
(58) Field of Classification Search .................. None
See application file for complete search history.

(56) References Cited

U.S. PATENT DOCUMENTS

| 4,864,396 | A | * | 9/1989 | Martens | 375/240.14 |
| 4,947,447 | A | * | 8/1990 | Miyaoka et al. | 382/246 |
| 5,020,120 | A | * | 5/1991 | Weldy | 382/240 |
| 5,305,103 | A | * | 4/1994 | Golin | 375/240.12 |
| 5,767,986 | A | * | 6/1998 | Kondo et al. | 358/426.14 |
| 6,252,989 | B1 | * | 6/2001 | Geisler et al. | 382/232 |
| 6,760,479 | B1 | * | 7/2004 | Feria | 382/238 |

(Continued)

FOREIGN PATENT DOCUMENTS

| DE | 103 43 817 A1 | 4/2005 |
| RU | 2 305 377 C2 | 11/2004 |

(Continued)

OTHER PUBLICATIONS

Batista de Lima Filho, et al., "Universal Image Compression Using Multiscale Recurrent Patterns With Adaptive Probability Model", IEEE Transactions on Image Processing, vol. 17, No. 4, pp. 512-527, (Apr. 2008), IEEE Signal Processing Society.

(Continued)

*Primary Examiner* — Li Liu
(74) *Attorney, Agent, or Firm* — The Nath Law Group; Jerald L. Meyer; Stanley N. Protigal

(57) ABSTRACT

The invention relates to systems for a transmission of images via channels of communication with a limited capacity by means of application of compression of the images. The technical result consists in an increase of the compression degree upon encoding, and it allows to fulfill the transmission of such encoded images via the channel of communication with the limited capacity, therewith a high degree of the compression is provided without of increase of computational power of encoding device and without of distortions upon decoding. The result is obtained by the usage of more effective method of interpolation of restored subsamples, in this method there is used an adaptive and applicative set of samples, which restore a quantized signal, and this set of the samples allows to improve an accuracy of the interpolation with a number of the subsamples, which is necessary for the right interpolation that is simultaneously decreased one.

86 Claims, 20 Drawing Sheets

U.S. PATENT DOCUMENTS

| | | | |
|---|---|---|---|
| 6,771,835 B2 * | 8/2004 | Han et al. | 382/260 |
| 6,876,771 B2 * | 4/2005 | Prakash et al. | 382/239 |
| 7,046,856 B2 * | 5/2006 | Feria et al. | 382/248 |

FOREIGN PATENT DOCUMENTS

| | | |
|---|---|---|
| RU | 2 307 478 C2 | 3/2005 |
| WO | WO 91/18477 A1 | 11/1991 |
| WO | WO 02/1881 A2 | 1/2002 |

OTHER PUBLICATIONS

Rath, et al., "Compression of Laplacian Pyramids Through Orthogonal Transforms and Improved Prediction", IEEE Transactions on Image Processing, vol. 17, No. 9, pp. 1587-1604, (Sep. 2008), IEEE Signal Processing Society.

Rodrigues, et al., "On Dictionary Adaption for Recurrent Pattern Image Coding", IEEE Transactions on Image Processing, vol. 17, No. 9, pp. 1640-1653, (Sep. 2008), IEEE Signal Processing Society.

Jiang, et al., "A Video Coding Scheme Based on Joint Spatiotemporal and Adaptive Prediction", IEEE Transactions on Image Processing, vol. 18, No. 5, pp. 1025-1036, (May 2009), IEEE Signal Processing Society.

Sarkis, et al., "Content Adaptive Mesh Representation of Images Using Binary Space Partitions", IEEE Transactions on Image Processing, vol. 18, No. 5, pp. 1069-1079, (May 2009), IEEE Signal Processing Society.

Kassim, et al., "Hierarchical Segmentation-Based Image Coding Using Hybrid Quad-Binary Trees", IEEE Transactions on Image Processing, vol. 18, No. 6, pp. 1284-1291, (Jun. 2009), IEEE Signal Processing Society.

* cited by examiner

ENCODING AND DECODING OF DIGITAL SIGNALS BASED ON COMPRESSION OF HIERARCHICAL PYRAMID

This is a National Phase Application filed under 35 U.S.C. 371 as a national stage of PCT/RU2007/000508, filed on Sep. 28, 2007, the content of which is hereby incorporated by reference in its entirety.

FIELD OF THE INVENTION

The claimed group of inventions refers to data transfer and is intended for digital signal processing, above all, for compressing digitized analog two-dimensional signals such as images and video sequences for the purpose of obtaining a compact data file, which can be saved on digital data carriers or transmitted via digital communication channels, with the original digital signal to be subsequently decoded and restored, with an accuracy level determined at the stage of compression.

Each of the group's inventions may be used as an independent device, or as a component of a more complex device for compression and processing of digital signals.

PRIOR ART

At present, there exist two main directions in data compression, i.e. lossless compression and lossy compression. In the former case, the restored signal matches the input one precisely, yet its shortcoming is that the compression ratio is rather low and does not generally exceed 2-3. In the latter case, much higher compression ratios may be achieved owing to the fact that the restored signal is nothing but an approximation to the original signal. In the presented group of inventions, lossy compression of input data is used. In such methods, the required compression ratio may be set in a wide range, yet its shortcoming is that the restored signal distortion level would grow along with increasing the compression ratio. One of the known methods of lossy image compression is compression through using a hierarchical pyramid (Laplacian pyramid). FIG. 1 presents a method of forming a Laplacian pyramid with three decimation levels. Low-pass filter (101) mitigates the aliasing effect on a reduced image [1]. A traditional method of image compression by means of a Laplacian pyramid is successive interpolation of reduced copies of the original image down to the original size. In other words, (106) is used for obtaining (105), then (104), and finally (103). The difference between the interpolated image and the original is quantized and recorded in a file, or transmitted via a communication channel to be subsequently restored [2], [3], [4]. With such an approach, the original image compression efficiency is directly determined by quality of interpolated filters applied, as well as by quality of low-pass filters used prior to the decimation procedure in forming a Laplacian pyramid, as aliasing would lower the quality of operation of interpolators. To raise the compression efficiency, there have been suggested adaptive interpolation methods, as well as combining interpolation with two-dimensional adaptive prediction of values of the image elements [5], [6], [7]. The principal shortcoming of the above-mentioned compression methods is their high computational complexity. For each differential factor, it is necessary to carry out complicated and slow procedures of prediction, quantization and entropy (lossless) encoding. Besides, with a standard Laplacian pyramid used, the number of differential factors exceeds the number of the original image elements. With 2 decimation levels and K elements of the input image, the total number of differential elements will be 1.3125*K. There exist methods of reducing the number of differential elements down to K owing to abandoning low-pass filtration in the original image decimation, but it would result in worse operation of adaptive predictors and interpolators due to strong aliasing of subsamples and, accordingly, a decrease of the maximum attainable compression efficiency [8][9][10]. Here, the number of differential elements and, accordingly, the computational complexity remain rather high. It is possible to reduce computational complexity sharply, if, instead of differential factors being transmitted, for each section of the original image, the maximum decimation level would be determined, with which the restored image distortions would not exceed a predetermined threshold. In other words, compression involves taking a set of subsamples from different decimation levels of the original Laplacian pyramid, depending on the signal's local statistics, with further computations based on the aforesaid subsamples only; here, the number of processed subsamples to undergo further processing may be several times as small as that of the image initial elements. In the process of unpacking, the original image is drawn together as a "mosaic" of variable size blocks [11], [12], [13].

This compression method is of a very low computational complexity. At the same time, it features a serious problem, which prevents using this approach from achieving high compression efficiency, namely, absence of efficient interpolation of restored subsamples, with the latter ones being unevenly distributed along the image to be restored. Therefore, the aforesaid algorithms suggest either using an elemental rectangle function [13], which is calculated independently for each subsample, or an elemental bilinear interpolation. Here, subsamples, which have not undergone low-pass filtration, may be used as reference subsamples for bilinear interpolation, which means that the quality of such interpolation would be lower due to aliasing [11], [12].

The closest to the claimed group of inventions is the technical solution disclosed in source of information [12].

SUMMARY OF THE INVENTION

The technical objective of this group of inventions sharing a common inventive conception is creation of efficient methods of encoding and decoding digital signals, devices for implementation thereof, devices for processing digital signals and systems for efficient transmission of digital signals via limited throughput communication channels, as well as expansion of the arsenal of methods for encoding and decoding digital signals, encoding and decoding devices, as well as systems for transmission of digital signals via limited throughput communication channels.

The technical result to ensure reaching the objective set lies in the fact that the compression ratio for encoding is raised without increasing computational complexity of encoding device, distortions of decoding are reduced without increasing computational complexity of decoding device, with high quality ensured for transmission of digital signals via a limited throughput communication channel. The proposed group of inventions present new methods of data encoding and decoding, which allow raising compression efficiency and/or raising quality of the image being restored owing to a more efficient method of interpolating subsamples being restored and using an adaptively applied set of resampling patterns, which makes it possible to raise interpolation accuracy, with the number of subsamples required for correct interpolation concurrently reduced.

The essence of the invention as for a method of encoding digital signals lies in the fact that, by means of computing facilities, as well as adaptive and/or linear overlapping low-pass filters, a hierarchical pyramid is formed based on encoded data, signal differences between this pyramid's levels are calculated to be used in the course of preliminary classification of the aforesaid hierarchical pyramid, which is carried out successively, from the level of a section with the lowest spatial resolution to the level of a section with the highest spatial resolution, and the aforesaid hierarchical pyramid is finally classified with a predetermined set of resampling patterns, whereupon each section of the aforesaid hierarchical pyramid selected at the stage of preliminary classification is converted into an array of subsamples, which is achieved by means of adaptive and/or linear filters set in the resampling pattern put in line with the aforesaid section at the final classification, and the obtained array is converted into a one-dimensional data array, with information on location of obtained subsamples and resampling patterns used for obtaining thereof saved, whereupon the aforesaid array is encoded through lossy compression, and information on location of subsamples is encoded through lossless compression.

In specific cases, this method is characterized that:

The calculated signal difference between the levels of the aforesaid hierarchical pyramid is used to change the compression threshold at different sections of data being encoded.

If no pattern can be selected from the predetermined set of patterns for a section of the aforesaid hierarchical pyramid chosen in the course of preliminary classification, samples contained in such a section are directly added to the array of subsamples to be created, whereas information is saved stating that none of the patterns was used on the section in question.

Information on location of obtained subsamples and the type of resampling patterns used for obtaining thereof, which is saved in the course of encoding, is presented in the form of a hierarchical tree structure.

Signal differences between the levels of the aforesaid hierarchical pyramid are calculated by means of adaptive and/or linear overlapping low-pass interpolation filters.

The process of compression of the one-dimensional array of subsamples is optimized by means of statistical data collected at the stages of preliminary and final classification.

Preliminary and final classifications are optimized, with a criterion of minimization of the common distortion level used for a predetermined data level.

The process of converting an array of subsamples into a one-dimensional array is carried out as an adaptive process, its parameters changing depending on statistics of signals being processed.

A hierarchical pyramid is formed based on encoded data with at least three decimation levels.

In the course of preliminary classification of sections of the aforesaid hierarchical pyramid, sections of different fixed size are used, whereas in the course of final classification by means of a predetermined set of resampling patterns, several resampling patterns are used, each of them intended for its own size of section being processed.

Contents, or a part of contents, of the used set of resampling patterns is encoded through the lossless method and saved together with encoded data.

Encoded data constitute a full-color image presented as a number of color planes, each of which is encoded separately.

The process of encoding a one-dimensional data array is carried out through discrete cosine transform and linear and/or non-linear adaptive quantization, with subsequent encoding of data obtained after quantization, together with quantization parameters, through a method of encoding with variable-length codes.

The process of encoding a one-dimensional data array is carried out through stationary and/or adaptive wavelet transform, as well as linear and/or non-linear adaptive quantization, with subsequent encoding of data obtained after quantization, together with quantization parameters, through a method of encoding with variable-length codes.

The process of encoding a one-dimensional data array is carried out through stationary and/or adaptive sub-band transform, as well as linear and/or non-linear adaptive quantization, with subsequent encoding of data obtained after quantization, together with quantization parameters, through a method of encoding with variable-length codes.

In the aforesaid processes of encoding one-dimensional data arrays, instead of the method of encoding with variable-length codes, the arithmetic encoding method is used, jointly with a predetermined and/or adaptive statistical model.

Before being encoded, a one-dimensional data array undergoes preliminary segmentation, whereas encoding is carried out through several various lossy compression methods to be selected individually for each obtained segment.

The method of encoding with variable-length codes is used for encoding information on location of subsamples and the type of resampling patterns applied.

The method of arithmetic encoding jointly with a predetermined and/or adaptive statistical model is used for encoding information on location of subsamples and the type of resampling patterns applied.

Operations are performed for an entire array of data being encoded.

The array of data being encoded is preliminarily divided into overlapping blocks, with operations performed for each block independently from the others.

The essence of the invention in the part of decoding encoded digital signals presented as a one-dimensional array of data obtained from subsamples taken from sections of a hierarchical pyramid formed from digital signals being encoded (the aforesaid array compressed through the lossy compression method) and information on location of these subsamples in the aforesaid pyramid encoded through the lossless compression method, lies in the fact that there is performed restoration of the array of subsamples through the lossy decoding method, decoding information on location of transmitted subsamples through the lossless method, restoration of transmitted sections of the hierarchical pyramid with the restored array of subsamples and decoded information on their location, restoration of missed sections of the hierarchical pyramid, for which there are restored similarly located sections on levels with a higher spatial resolution, performed by means of non-overlapping filters with subsequent decimation, whereupon the process of, final interpolation of transmitted data is performed with adaptive and/or linear composite cascade overlapping interpolation filters, which is carried out successively, from the level of a section with the lowest spatial resolution to the level of a section with the highest spatial resolution, whereupon restored digital signals are read from the hierarchical pyramid level with the highest spatial resolution.

In the preferred embodiment variants, an encoded one-dimensional data array is formed of subsamples obtained from sections of the aforesaid hierarchical pyramid by means of adaptive and/or linear filters set in the resampling pattern used in encoding, the above pattern selected out of a predetermined set of resampling patterns, where information on the type of resampling patterns applied is encoded together with information on location of transmitted subsamples; here, in the course of restoration of transmitted sections of the hierarchical pyramid, non-overlapping parts of adaptive and/or linear composite cascade interpolation filters are used, which are determined for each sample belonging to a section being restored of the hierarchical pyramid in a predetermined set of resampling patterns, whereas, concurrently with the process of final interpolation, there is performed final filtration of transmitted data sections with overlapping compensating parts of adaptive and/or linear composite cascade interpolation filters determined for each sample belonging to a section being restored of the hierarchical pyramid in a predetermined set of resampling patterns.

Besides, in specific cases, this method is characterized that:

The process of restoration of missed sections of the hierarchical pyramid, for which there are restored similarly located sections on levels with a higher spatial resolution, is performed without using non-overlapping low-pass filters; instead, direct decimation is performed for sections with a higher spatial resolution.

The transmitted data sections having been restored, the process of restoration is performed for the hierarchical pyramid sections missed in the course of restoration, for which there are restored similarly located sections on the pyramid levels with a lower spatial resolution, which is performed by means of non-overlapping interpolation filters, whereas the subsequent restoration of the missed sections of the hierarchical pyramid, for which there are restored similarly located sections on the levels with a higher spatial resolution, is performed by means of overlapping adaptive and/or linear filters with subsequent decimation.

An additional stage of restoration of missed sections and the corresponding stage of restoration by means of overlapping adaptive and/or linear filters with subsequent decimation are only performed for parts of the levels of the hierarchical pyramid being restored, which have low spatial resolution.

The aforesaid subsamples are obtained from sections of the above hierarchical pyramid, which have different fixed sizes, whereas the processes of restoration of transmitted data sections and final filtration are performed by means of several sets of resampling patterns, each of them intended for its own fixed section size.

Encoded data contain information encoded through the lossless method, which comprises resampling patterns used in the course of encoding, or just parts of these patterns; here, restoration of encoded data is preceded by decoding of the aforesaid information, whereupon decoded patterns, or parts thereof, are added to the set of resampling patterns used in the process of restoration of encoded data.

Encoded data constitute a number of separately encoded color planes belonging to a full-color image, where the process of decoding is performed independently for each of the encoded color planes.

Operations are performed for an entire array of data being restored.

The array of data being restored is preliminarily divided into overlapping blocks, with operations performed for each block independently from the others.

The essence of the invention in the part of another variant of encoding digital signals lies in the fact that, by means of computing facilities, as well as adaptive and/or linear overlapping low-pass filters, a hierarchical pyramid is formed based on encoded data, as well as reference hierarchical pyramids of the same size based on reference data arrays, whereupon, based on the reference hierarchical pyramids and the original hierarchical pyramid, differential hierarchical pyramids are calculated, whereupon signal differences are calculated between the levels of the hierarchical pyramid created based on encoded data and the levels of the aforesaid differential pyramids, with the resulting interlevel difference to be used in the process of preliminary classification of the aforesaid hierarchical pyramid and obtained differential hierarchical pyramids, which is performed successively, from the level of a section with the lowest spatial resolution to the level of a section with the highest spatial resolution, where the aforesaid hierarchical pyramid and the obtained differential hierarchical pyramids are finally classified with a predetermined set of resampling patterns, whereupon each section of the aforesaid hierarchical pyramid and the section of the differential pyramids selected at the stage of preliminary classification is converted into an array of subsamples, which is achieved by means of adaptive and/or linear filters set in the resampling pattern put in line with the aforesaid section at the final classification, and the obtained subsamples are converted into at least two data arrays, for subsamples obtained from the aforesaid pyramid, and for subsamples obtained from differential pyramids, with information on location of obtained subsamples and resampling patterns used for obtaining thereof saved, whereupon the aforesaid arrays are encoded through lossy compression, and information on location of subsamples is encoded through lossless compression.

In specific cases, this method is characterized that:

The calculated signal difference between the levels of the aforesaid hierarchical pyramid and the levels of the differential pyramids is used to change the compression threshold at different sections of data being encoded.

If no pattern can be selected from the predetermined set of patterns for a section of the aforesaid hierarchical pyramid and the differential pyramids chosen in the course of preliminary classification, samples contained in such a section are directly added to the array of subsamples to be created, whereas information is saved stating that none of the patterns was used on the section in question.

Information on location of obtained subsamples and the type of resampling patterns used for obtaining thereof, which is saved in the course of encoding, is presented in the form of a hierarchical tree structure.

Signal differences between the levels of the aforesaid hierarchical pyramid and between the levels of the differential pyramids are calculated by means of adaptive and/or linear overlapping interpolation filters.

The process of compression of one-dimensional arrays of subsamples is optimized by means of statistical data collected at the stages of preliminary and final classification.

Preliminary and final classifications are optimized, with a criterion of minimization of the common distortion level used for a predetermined data level.

The process of converting an array of subsamples into one-dimensional arrays is carried out as an adaptive process, its parameters changing depending on statistics of signals being processed.

A hierarchical pyramid is formed based on data being encoded, and reference pyramids are formed based on reference data, with at least three decimation levels.

In the course of preliminary classification of sections of the aforesaid hierarchical pyramid and differential hierarchical pyramids, sections of different fixed size are used, whereas in the course of final classification by means of a predetermined set of resampling patterns, several resampling patterns are used, each of them intended for its own size of section being processed.

Contents, or a part of contents, of the used set of resampling patterns is encoded through the lossless method and saved together with encoded data.

Encoded data constitute a full-color image presented as a number of color planes, each of which is encoded separately.

The process of encoding one-dimensional data arrays is carried out through discrete cosine transform and linear and/or non-linear adaptive quantization, with subsequent encoding of data obtained after quantization, together with quantization parameters, through a method of, encoding with variable-length codes.

The process of encoding one-dimensional data arrays is carried out through stationary and/or adaptive wavelet transform, as well as linear and/or non-linear adaptive quantization, with subsequent encoding of data obtained after quantization, together with quantization parameters, through a method of encoding with variable-length codes.

The process of encoding one-dimensional data arrays is carried out through stationary and/or adaptive sub-band transform, as well as linear and/or non-linear adaptive quantization, with subsequent encoding of data obtained after quantization, together with quantization parameters, through a method of encoding with variable-length codes.

In the aforesaid processes of encoding one-dimensional data arrays, instead of the method of encoding with variable-length codes, the arithmetic encoding method is used, jointly with a predetermined and/or adaptive statistical model.

Before being encoded, one-dimensional data arrays undergo preliminary segmentation, whereas encoding is carried out through several various lossy compression methods to be selected individually for each obtained segment.

The method of encoding with variable-length codes is used for encoding information on location of subsamples and the type of resampling patterns applied.

The method of arithmetic encoding jointly with a predetermined and/or adaptive statistical model is used for encoding information on location of subsamples and the type of resampling patterns applied.

Operations are performed for an entire array of data being encoded.

The array of data being encoded is preliminarily divided into overlapping blocks, with operations performed for each block independently from the others.

The essence of the invention in the part of decoding encoded digital signals presented as one-dimensional arrays of data obtained from subsamples taken from sections of a hierarchical pyramid formed from digital signals being encoded and sections of the differential pyramids obtained from the aforesaid pyramid and from reference hierarchical pyramids of the same size obtained from reference data arrays (the aforesaid one-dimensional arrays compressed through the lossy compression method), and information on location of these subsamples in the aforesaid pyramid and in the differential pyramids encoded through the lossless compression method, lies in the fact that there is performed formation of reference hierarchical pyramids based on reference data arrays, decoding of information describing location of transmitted subsamples in the hierarchical pyramid based on encoded data, as well in differential pyramids, which is performed through a lossless decompression method, restoration of the arrays of subsamples through the lossy decoding method, whereupon there is performed restoration of transmitted sections of the aforesaid hierarchical pyramid with the restored arrays of subsamples and decoded information on their location, as well as with reference hierarchical pyramids for sections being restored from subsamples obtained from differential pyramids, whereupon there is performed restoration of missed sections of the hierarchical pyramid, for which there are restored similarly located sections on levels with a higher spatial resolution, performed by means of non-overlapping filters with subsequent decimation, whereupon the process of final interpolation of transmitted data is performed with adaptive and/or linear composite cascade overlapping interpolation filters, which is carried out successively, from the level of a section with the lowest spatial resolution to the level of a section with the highest spatial resolution, where for sections of the aforesaid pyramid restored from subsamples obtained from differential pyramids, and for sections obtained from those sections by means of interpolation, the processes of final filtration and interpolation are performed with using the relevant sections of reference hierarchical pyramids, whereupon restored digital signals are read from the hierarchical pyramid level with the highest spatial resolution.

Preferably, the encoded one-dimensional data arrays are formed of subsamples obtained from sections of the aforesaid hierarchical pyramid and sections of the differential pyramids by means of adaptive and/or linear filters set in the resampling pattern used in encoding, the above pattern selected out of a predetermined set of resampling patterns, where information on the type of resampling patterns applied is encoded together with information on location of transmitted subsamples; here, in the course of restoration of transmitted sections of the hierarchical pyramid, non-overlapping parts of adaptive and/or linear composite cascade interpolation filters are used, which are determined for each sample belonging to a section being restored of the hierarchical pyramid in a predetermined set of resampling patterns, whereas, concurrently with the process of final interpolation, there is performed final filtration of transmitted data sections with overlapping compensating parts of adaptive and/or linear composite cascade interpolation filters determined for each sample belonging to a section being restored of the hierarchical pyramid in a predetermined set of resampling patterns, where, for sections of the aforesaid pyramid restored from subsamples obtained from differential pyramids, all the above-mentioned processes of filtration and interpolation are performed with using the relevant sections of the reference hierarchical pyramids.

Besides, in specific cases, this method is characterized that:

The process of restoration of missed sections of the hierarchical pyramid, for which there are restored similarly located sections on levels with a higher spatial resolution, is performed without using non-overlapping low-pass filters; instead, direct decimation is performed for sections with a higher spatial resolution.

The transmitted data sections having been restored, the process of restoration is performed for the hierarchical pyramid sections missed in the course of restoration, provided that there are restored similarly located sections on the pyramid levels with a lower spatial resolution, which is performed by means of non-overlapping interpolation filters, where, for sections of the aforesaid pyramid restored from subsamples obtained from differential pyramids, the aforesaid interpolation is performed with using the relevant sections of the reference hierarchical pyramids; besides, subsequent restoration of the missed sections of the hierarchical pyramid, for which there are restored similarly located sections on levels with a higher spatial resolution, is performed by means of overlapping adaptive and/or linear filters with subsequent decimation.

An additional stage of restoration of missed sections and the corresponding stage of restoration by means of overlapping adaptive and/or linear filters with subsequent decimation are only performed for the part of the levels of the hierarchical pyramid being restored, which have low spatial resolution.

The aforesaid subsamples are obtained from sections of the above hierarchical pyramid, which have different fixed sizes, whereas the processes of restoration of transmitted data sections and final filtration are performed by means of several sets of resampling patterns, each of them intended for its own fixed section size.

Encoded data contain information encoded through the lossless method, which comprises resampling patterns used in the course of encoding, or just parts of these patterns; here, restoration of encoded data is preceded by decoding of the aforesaid information, whereupon decoded patterns, or parts thereof, are added to the set of resampling patterns used in the process of restoration of encoded data.

Encoded data constitute a number of separately encoded color planes belonging to a full-color image, where the process of decoding is performed independently for each of the encoded color planes.

Operations are performed for an entire array of data being restored.

The array of data being restored is preliminarily divided into overlapping blocks, with operations performed for each block independently from the others.

The essence of the invention in the part of device for implementation of the method of encoding digital signals lies in the fact that it comprises a unit of forming and storing hierarchical pyramid from input data, a unit of calculating interlevel difference, a unit of preliminary classification of data sections, a unit of final classification, filtration and resampling, a unit of converting filtered subsamples into a one-dimensional array, a unit of encoding location of subsamples and lossless compression, a unit of lossy compression of one-dimensional array, an output driver unit, and a storage of a set of predetermined resampling patterns, where the unit of forming and storing hierarchical pyramid from input data is connected to the unit of calculating interlevel difference and the unit of final classification, filtration and resampling, whereas the unit of calculating interlevel difference is connected to the unit of preliminary classification of data sections, where the latter one is connected to the unit of final classification, filtration and resampling, which, in its turn, is connected to the storage of a set of predetermined resampling patterns and to the unit of converting filtered subsamples into a one-dimensional array, which is connected to the unit of encoding location of subsamples and lossless compression, and to the unit of lossy compression of one-dimensional array, their outputs connected to the output driver unit.

In specific cases, it is characterized by:

availability of a unit of calculating local compression thresholds connected to the unit of calculating interlevel difference and to the unit of preliminary classification of data sections;

the fact that the unit of preliminary classification of data section classifies the data into sections of different fixed size, while the unit of final classification, filtration and resampling processes sections of different fixed size;

availability of a unit of lossless encoding of resampling patterns, which is connected to the storage of a set of predetermined resampling patterns, and to the output driver unit;

the fact that the process of encoding a full-color image comprising a number of color planes is performed independently for each of the aforesaid planes;

the fact that the output driver unit adds more information to encoded data.

The essence of the invention in the part of device for implementation of the method for decoding digital signals lies in the fact that it contains a unit of receiving input encoded data and demultiplexing, a unit of lossless decompression and decoding of information on location of subsamples, a unit of decoding a one-dimensional array of subsamples encoded by means of a lossy compression algorithm, a unit of restoration of transmitted data sections, a unit of restoration of missed sections, for which there are similar restored sections on the pyramid levels with a higher spatial resolution, a unit of final filtration and interpolation, a unit of storing and output of hierarchical pyramid, a storage of a set of predetermined resampling patterns; where the unit of receiving input encoded data and demultiplexing is connected to the unit of lossless decompression and decoding of information on location of subsamples, and to the unit of restoration of a one-dimensional array of subsamples encoded by means of a lossy compression, their outputs connected to the unit of restoration of transmitted data sections, which is connected to the unit of storing and output of hierarchical pyramid, the storage of a set of predetermined resampling patterns and the unit of restoration of missed sections, for which there are similar restored sections on the pyramid levels with a higher spatial resolution, the latter being connected to the unit of storing and output of hierarchical pyramid and the unit of final filtration and interpolation, which is connected to the unit of storing and output of hierarchical pyramid and the storage of a set of predetermined resampling patterns.

In specific cases, it is characterized by:

availability of a unit of interpolation of missed sections, for which there are restored similarly located sections on levels with a lower spatial resolution, which is connected to the opening of the link between the unit of restoration of transmitted data sections and the unit of restoration of missed sections, for which there are similar restored sections on the pyramid levels with a higher spatial resolution, and also connected to the unit of storing and output of hierarchical pyramid;

the fact that the unit of restoration of transmitted data sections and the unit of final filtration and interpolation work with data sections of different fixed sizes, while using several sets of resampling patterns stored in the storage of a set of resampling patterns, where each of the aforesaid sets is intended for its own fixed size of the section being processed;

availability of a unit of lossless decoding of transmitted patterns, which is connected to the unit of receiving input encoded data and demultiplexing, and to the storage of a set of predetermined resampling patterns;

the fact that decoding of an encoded full-color image comprising a number of color planes is performed independently for each of the aforesaid planes;

the fact that the unit of receiving encoded data and demultiplexing singles out additional information from encoded data.

The essence of the invention in the part of another variant of the device for implementation of the method of encoding digital signals lies in the fact that it comprises a unit of forming and storing a hierarchical pyramid from input data, a unit of forming reference hierarchical pyramids from reference data, a unit of calculating and storing differential hierarchical pyramids, a unit of calculating interlevel difference, a unit of preliminary classification of data sections, as well as a unit of final classification, filtration and resampling, a unit of converting filtered subsamples into one-dimensional arrays, a unit of encoding location of subsamples and lossless compression, a unit of lossy compression of one-dimensional data arrays, a unit of output driver and a storage of a set of predetermined resampling patterns, where the unit of forming and storing hierarchical pyramid from input data is connected to the unit of calculating and storing differential hierarchical pyramids, as well as to the unit of calculating interlevel difference and the unit of final classification, filtration and resampling, while the unit of forming reference hierarchical pyramids from reference data is connected to the unit of calculating and storing differential hierarchical pyramids, whereas the latter one is connected to the unit of final classification, filtration and resampling, and to the unit of calculating interlevel difference, where the latter one is connected to the unit of preliminary classification of data sections, which is connected to the unit of final classification, filtration and resampling, which, in its turn, is connected to the storage of a set of predetermined resampling patterns, and to the unit of converting filtered subsamples into one-dimensional arrays, which is connected to the unit of encoding location of subsamples and lossless compression, and to the unit of lossy compression of data arrays, their outputs connected to the output driver unit.

In specific cases, it is characterized by:
availability of a unit of calculating local compression thresholds, which is connected to the unit of calculating interlevel difference, and to the unit of preliminary classification of data sections;

the fact that the unit of preliminary classification of data sections classifies the data into sections of different fixed size, while the unit of final classification, filtration and resampling processes sections of different fixed size;

availability of a unit of lossless encoding of resampling patterns, which is connected to the storage of a set of predetermined resampling patterns, and to the output driver unit;

the fact that the process of encoding a full-color image comprising a number of color planes is performed independently for each of the aforesaid planes.

the fact that the output driver unit adds more information to encoded data.

The essence of the invention in the part of device for implementation of another variant of the method for decoding digital signals lies in the fact that it comprises a unit of receiving input encoded data and demultiplexing, a unit of lossless decompression and decoding of information on location of subsamples, a unit of decoding one-dimensional arrays of subsamples encoded by means of a lossy compression algorithm, a unit of restoration of transmitted data sections, a unit of restoration of missed sections, for which there are similar restored sections on the pyramid levels with a higher spatial resolution, a unit of final filtration and interpolation, a unit of storing and output of hierarchical pyramid, a unit of forming and storing reference hierarchical pyramids from reference data, a storage of a set of predetermined resampling patterns, where the unit of receiving input encoded data and demultiplexing is connected to the unit of lossless decompression and decoding of information on location of subsamples, and to the unit of restoration of one-dimensional arrays of subsamples encoded by means of a lossy compression, their outputs connected to the unit of restoration of transmitted data sections, which is connected to the unit of storing and output of hierarchical pyramid, to the unit of forming and storing reference hierarchical pyramids from reference data, to the storage of a set of predetermined resampling patterns and the unit of restoration of missed sections, for which there are similar restored sections on the pyramid levels with a higher spatial resolution, the latter being connected to the unit of storing and output of hierarchical pyramid and to the unit of final filtration and interpolation, which is connected to the unit of storing and output of hierarchical pyramid, to the unit of forming and storing reference hierarchical pyramids from reference data, and to the storage of a set of predetermined resampling patterns.

In specific cases, it is characterized by:
availability of a unit of interpolation of missed sections, for which there are restored similarly located sections on the levels with a lower spatial resolution, which is connected to the opening of the link between the unit of restoration of transmitted data sections and the unit of restoration of missed sections, for which there are similar restored sections on the pyramid levels with a higher spatial resolution, and also connected to the unit of storing and output of hierarchical pyramid, and to the unit of forming and storing reference hierarchical pyramids from reference data;

the fact that the unit of restoration of transmitted data sections and the unit of final filtration and interpolation work with data sections of different fixed sizes, while using several sets of resampling patterns stored in the storage of a set of resampling patterns, where each of the aforesaid sets is intended for its own fixed size of the section being processed;

the fact that the device contains a unit of lossless decoding of transmitted patterns, which is connected to the unit of receiving input encoded data and demultiplexing, and to the storage of a set of predetermined resampling patterns;

the fact that decoding of encoded full-color image comprising a number of color planes is performed independently for each of the aforesaid planes;

the fact that the unit of receiving encoded data and demultiplexing singles out additional information from encoded data.

The essence of invention in the part of the system for image transmission via limited throughput communication channels lies in the fact that it comprises a device for image registration, a unit for data format conversion, a data encoding device executed subject to the aforesaid, a low throughput communication channel, a decoding device executed subject to the aforesaid, a unit for inverse transformation of data format and a device for displaying images, where the device for image registration is connected to the unit for data format conversion connected to the data encoding device executed subject to the aforesaid connected to the limited throughput communication channel connected to the decoding device executed subject to the aforesaid connected to the unit for inverse transformation of data format connected to the device for displaying images.

The essence of the invention in the part of another variant of a system for image transmission via limited throughput communication channels lies in the fact that it comprises a device for registration of video sequences, a unit for data format conversion, a unit for forming reference data arrays at encoding, a data encoding device executed subject to the aforesaid, a limited throughput communication channel, a decoding device executed subject to the aforesaid, a unit for forming reference data arrays at decoding, a unit for inverse transformation of data format and a device for displaying video sequences, where the device for registration of video sequences is connected to the unit for data format conversion connected to the data encoding device executed subject to the aforesaid, and to the unit for forming reference data arrays at encoding, with the latter connected to the data encoding device executed subject to the aforesaid, which is connected to the limited throughput communication channel connected to the decoding device executed subject to the aforesaid, which is connected to the unit for forming reference data arrays at decoding, and to the unit for inverse transformation of data format connected to the device for displaying video sequences.

PREFERRED EMBODIMENT

FIG. 1 presents an example of a known scheme of forming a hierarchical pyramid (Laplacian pyramid).

DETAILED DESCRIPTION OF THE INVENTION

Embodiment of Invention

Figure 1:
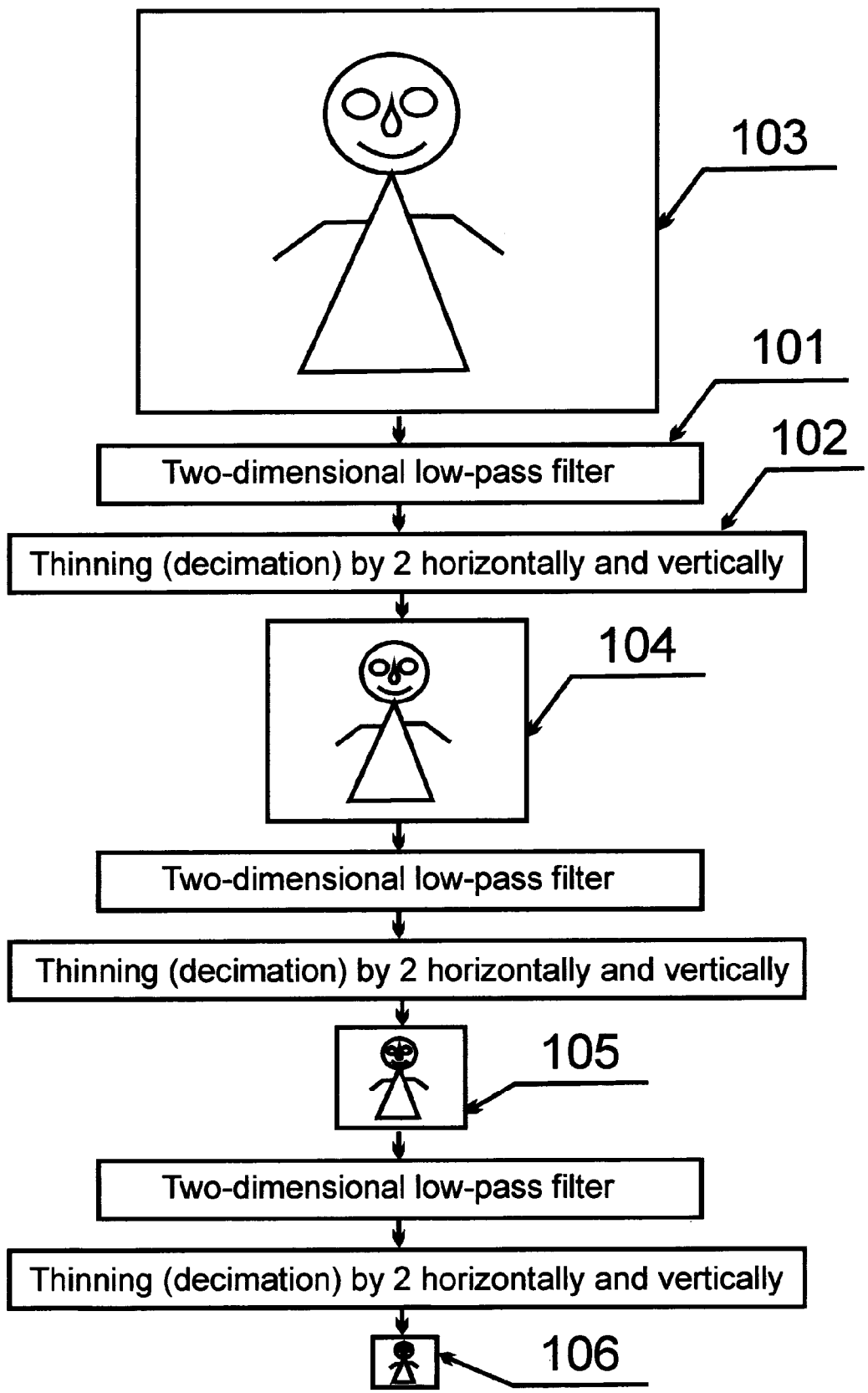

List of positions presented in FIG. 1-23.
101—Two-dimensional low-pass filter.
102—Thinning (decimation) by 2 horizontally and vertically.
103—Zero decimation level in building a hierarchical pyramid.
104—First decimation level.
105—Second decimation level.
106—Third decimation level.
201—Device for image registration.
202, 209—Unit for converting the data format.
203, 210—Encoding device.
204, 212—Limited throughput communication channel.
205, 213—Decoding device.
206, 215—Unit for inverse transformation of data format.
207—Device for displaying images.
208—Device for registration of video sequences.
211—Unit for forming reference arrays at encoding.
214—Unit for forming reference arrays at decoding.
216—Device for displaying video sequences.
301, 302, 303, 304—Units of adaptive and/or linear filtration and decimation combined into a unit of forming and storing hierarchical pyramid from input data.
305, 306, 307, 308—Decimation levels stored in the unit of forming and storing hierarchical pyramid from input data.
309, 310, 311, 312—Adaptive and linear interpolator combined in a unit of calculating interlevel difference.
313, 314, 315, 316—Calculators of the square of interlevel signal difference combined in a unit of calculating interlevel difference.
317, 503—Source general parameters of compression.
318, 504—Unit of calculating local compression thresholds.
319, 534—Local compression thresholds.

320, 535—Unit of preliminary classification of data sections.

321, 536—List of sections processed by the unit of final classification, which comprises additional statistical information.

322, 538—Unit of final classification, filtration and resampling.

323, 537—Storage of a set of predetermined resampling patterns.

324—Unit of converting filtered subsamples into a one-dimensional array.

325, 542—Array of subsamples.

326, 543—Statistical and control data.

327, 544, 547—One-dimensional data array.

328, 545, 548—Additional statistical and control data.

329—Unit of lossy compression of one-dimensional array.

330, 550—Unit of encoding location of subsamples and lossless compression.

331, 552—Additional data.

332, 551—Output driver unit.

400, 600, 1000, 1500, 1600, 1700, 1800, 1900—Start of operation.

401—Creation of a full list of non-overlapping data sections located at a level of hierarchical pyramid with the lowest spatial resolution.

402, 602—Check: are there remaining elements on the list?

403—Reading location of the next data section from the list and calculation of accumulative metric value for the aforesaid section.

404—Check: is the metric value smaller than the local threshold?

405—Removing the current data section off the list of sections and addition of its location and calculated metric value to the list of sections processed in the unit of final classification.

406—Removing the current section off the list. Passing to a level of hierarchical pyramid having a higher spatial resolution than the removed section. Singling out a data section located equivalently to the removed one and dividing it into four sub-sections.

407—Check: are new sections located at the level of the highest spatial resolution?

408—Adding new sections to the list of sections processed in the unit of final classification.

409—Adding new sections to the list of sections created at the first step of the algorithm.

410, 610, 1013, 1510, 1613, 1710, 1815, 1909—End of operation.

501—Reference data arrays.

502—Array of encoded input data.

505, 507, 509—Units of adaptive and/or linear filtration and decimation combined in a unit of forming reference hierarchical pyramids from reference data.

506, 508, 510—Decimation levels belonging to a reference hierarchical pyramid and stored in the unit of forming reference hierarchical pyramids from reference data.

511, 513, 515—Units of adaptive and/or linear filtration and decimation combined in a unit of forming and storing hierarchical pyramid from input data.

512, 514, 516—Decimation levels belonging to the original hierarchical pyramid and stored in the unit of forming and storing hierarchical pyramid from input data.

517, 519, 521, 523, 526, 529—Adaptive and/or linear interpolators combined in a unit of calculating interlevel difference.

518, 520, 522, 524, 527, 530—Calculators of the square of interlevel signal difference combined in a unit of calculating interlevel difference.

522, 525, 528, 531—Calculators of difference combined in a unit of calculating and storing differential hierarchical pyramids.

532—Interlevel signal energy for input data.

533—Interlevel signal energy for input data from differential hierarchical pyramids.

539—Data from differential hierarchical pyramids.

540—Data from the original hierarchical pyramid.

541—Unit of converting filtered subsamples into one-dimensional arrays.

546, 549—Units of lossy compression combined in a unit of lossy compression of one-dimensional data arrays.

601—Creation of a full list of non-overlapping data sections located at levels with the lowest spatial resolution belonging to the main and differential hierarchical pyramids. Each group comprises a data section from the main pyramid and sections from differential pyramids from sections equivalent thereto.

603—Reading location of the next group of data section from the list and calculating a value of accumulative metric for each of the section belonging to the group. Selecting a section with the smallest metric value out of sections belonging to the group.

604—Check: is the metric value smaller than the local threshold?

605—Removing the current group of sections off the list of groups. Adding location of the selected section together with the calculated metric value to the list of sections processed in the unit of final classification.

606—Removing the current group of sections off the list of groups. Passing to neighboring levels of hierarchical pyramids having a higher spatial resolution than levels of location of the removed group. Singling out data sections located equivalently to sections of the removed group. Dividing the sections into four sub-groups.

607—Check: are new groups located at levels having the highest spatial resolution?

608—Adding sections belonging to new groups, yet located in the hierarchical pyramid, which comprised a section selected at stage 603, to the list of sections processed in the unit of final classification.

609—Adding new groups of sections to the list created at the first step of the algorithm.

701—Original interpolation filter with overlapping.

702—Simplified interpolation filter without overlapping.

703—Compensating filter with overlapping.

704—Amplitude-frequency function of original interpolation filter.

705—Amplitude-frequency function of simplified interpolation filter.

706—Amplitude-frequency function of compensating filter.

801—Original interpolation filter with overlapping.

802—Filter without overlapping.

803, 804—Compensating filters.

900—Original data section.

901, 902, 903, 904, 905, 906, 907, 908—Examples of configuration of resampling patterns.

909—Center of filtered subsample.

910, 911—Borders of non-overlapping parts of composite interpolation filters.

1001—Reading a list of data sections made at the stage of preliminary classification.

1002—Check: are there remaining unprocessed sections?

1003—Reading location of the next data section out of the list of sections. Selecting a group of resampling patterns, in which the input data section is divided into the smallest number of subsamples.

1004—Calculating the values of subsamples for each of the patterns belonging to the group, by means of overlapping adaptive and/or linear low-pass filters.

1005—Restoring a value of the original data section for each pattern belonging to the group, by means of non-overlapping parts of adaptive and/or linear composite cascade interpolation filters set for each subsample in the bank of patterns.

1006—Final interpolation for each pattern belonging to the group, with using overlapping compensating parts of adaptive and/or linear composite cascade interpolation filters.

1007—Calculating the total metric for each pattern belonging to the group. Selecting a pattern with the smallest total metric value.

1008—Check: is the total metric value smaller than the local compression threshold?

1009—Storing the values of subsamples, their locations and information on the type of selected resampling pattern.

1010—Check: are all the available groups of patterns checked?

1011—Selecting a group of patterns having the smallest number of subsamples out of the groups, which have not been checked yet.

1012—Storing the values of samples of the data section being processed and information on their location, with a statement that no resampling pattern was used for this particular section.

1101—Data section located at the level of hierarchical pyramid with the lowest spatial resolution, for which there are filial sections.

1102, 1103—Data sections located at the level of hierarchical pyramid with the lowest spatial resolution, for which various resampling patterns were used.

1104, 1105—Filial data sections located at levels of hierarchical pyramid with a higher spatial resolution.

1200—Input data array.

1201—Discrete cosine transform.

1202—Adaptive quantizer.

1203—Statistical data.

1204—Arithmetic encoder.

1205—Adaptive and/or stationary statistical model.

1301, 1401—Unit of receiving input encoded data and demultiplexing.

1302, 1402—Unit of lossless decompression and decoding of information on location of subsamples.

1303, 1403—Additional data.

1304—Unit of decoding one-dimensional array of subsamples encoded with a lossy compression algorithm.

1305, 1405—Unit of restoring transmitted data sections, which is performed by means of using non-overlapping parts of interpolation filters set in resampling patterns.

1306, 1406—Storage of a set of predetermined resampling patterns.

1307, 1407—Unit of storing and output of hierarchical pyramid.

1308, 1408—Decoded information on location of subsamples and type of used resampling patterns.

1309—Restored array of subsamples.

1310, 1412—Restored data sections.

1311, 1313, 1315, 1413, 1415, 1417—Support data array.

1312, 1414—Unit of interpolation of missed sections, for which there are restored similarly located sections on levels with a lower spatial resolution.

1314, 1416—Unit of restoring missed sections, for which there are restored similarly located sections on levels with a higher spatial resolution.

1316, 1418—Unit of final filtration and interpolation.

1317, 1419—Restored data.

1404—Unit of decoding one-dimensional arrays of subsamples encoded with a lossy compression algorithm.

1409—Restored arrays of subsamples.

1410—Unit of forming and storing reference hierarchical pyramids from reference data.

1411—Reference data.

1501—Making a list of transmitted data sections. Reading information on location and type of applied resampling pattern for the first data section on the list.

1502—Check: was a resampling pattern used in encoding the current section?

1503—Restoring the current data section with values from the one-dimensional array of subsamples.

1504—Reading values of subsamples from the one-dimensional array and restoring the current data section by means of non-overlapping parts of adaptive and/or linear composite cascade interpolation filters determined for each sample belonging to a section being restored in the resampling pattern in use.

1505—Check: does the current section belong to a differential hierarchical pyramid?

1506—Adding values of a similarly located section taken from the relevant reference hierarchical pyramid to the current data section.

1507—Recording the current data section values in the relevant place of the hierarchical pyramid being restored and restoring parameters of the current section in the support array of control data.

1508—Reading information on location and type of applied resampling pattern for the next data section out of the list of transmitted sections.

1509—Check: are all the transmitted data sections processed?

1601—Creating a full list of non-overlapping data sections located at a level of hierarchical pyramid with the lowest spatial resolution and selecting the first section out of the list.

1602—Check: does the current section contain restored data?

1603—Check: is the current section restored by means of a reference pyramid?

1604—Interpolation of the current data section by means of non-overlapping interpolation filters.

1605—Deducting values of a similarly located section of a reference pyramid from the current section values.

1606—Interpolation of obtained data by means of non-overlapping interpolation filters.

1607—Adding values of a similarly located section on the next level of reference pyramid with a higher spatial resolution to the obtained data.

1608—Recording interpolated data to a similar section located on a neighboring level of pyramid with a higher spatial resolution.

1609—Check: are all the sections on this pyramid level processed?

1610—Selecting the next section out of the list.

1611—Check: is the next level of the highest spatial resolution?

1612—Passing to the next level of hierarchical pyramid with a higher spatial resolution. Making a list of sections and selecting the first data section out of the list.

1701—Making a full list of non-overlapping data sections located on a level of hierarchical pyramid with the highest spatial resolution, and selecting the first section out of the list.

1702—Check: is there a non-restored section located similarly to the current section, yet located on the nearest level of hierarchical pyramid with a lower spatial resolution?

1703—Filtration of values of the current data section by means of adaptive and/or linear overlapping low-pass filters.

1704—Decimation of filtered values for obtaining a reduced copy of the section being processed.

1705—Recording a reduced copy of the data section being processed into a relevant non-restored section belonging to the nearest level of hierarchical pyramid with a lower spatial resolution than the level being processed.

1706—Check: are all the sections on this pyramid level processed?

1707—Selecting the next section out of the list.

1708—Check: is the next level of the lowest spatial resolution?

1709—Passing to the next level of hierarchical pyramid with a lower spatial resolution. Making a list of sections and selecting the first data section out of the list.

1801—Making a full list of non-overlapping data sections located on a level of hierarchical pyramid with the lowest spatial resolution, and selecting the first section out of the list.

1802—Check: Is the current section restored, and does it contain data restored in the course of restoration of missed sections of hierarchical pyramid, for which there are restored similarly located sections on levels with a higher spatial resolution?

1803—Check: is the current section restored by means of a reference pyramid?

1804—Final interpolation by means of a reference hierarchical pyramid.

1805, 1902—Check: is the current pattern restored by means of a resampling pattern?

1806, 1904—Check: is the current section interpolated by means of non-overlapping parts of adaptive and/or linear composite cascade interpolation filters?

1807—Filtration of the current data section with overlapping compensating parts of adaptive and/or linear composite cascade interpolation filters determined for each sample belonging to the current data section in the predetermined set of resampling patterns.

1808—Filtration of the current section by means of overlapping compensating parts of adaptive and/or linear composite cascade interpolation filters.

1809, 1906—Check: is the current level not of the maximum possible resolution?

1810—Interpolating values of the current section by means of non-overlapping parts of adaptive and/or linear composite cascade interpolation filters and recording interpolated data into a similar section located on a neighboring level of hierarchical pyramid with a higher spatial resolution.

1811—Check: are all the sections on this pyramid level processed?

1812—Selecting the next section out of the list.

1813—Check: are all the levels processed yet?

1814—Passing to the next level of hierarchical pyramid with a higher spatial resolution. Making a list of sections and selecting the first data section out of the list.

1901—Calculating the difference between values of the current data section and values of a similarly located section of the reference hierarchical pyramid, as well as between the data adjacent to the section being processed and the relevant data of the reference hierarchical pyramid.

1903—Filtration of obtained data by means of overlapping compensating parts of adaptive and/or linear composite cascade interpolation filters determined for each sample belonging to the current data section in the predetermined set of resampling patterns.

1905—Filtration of obtained data by means of overlapping compensating parts of adaptive and/or linear composite cascade interpolation filters.

1907—Adding values of a similarly located section of the reference pyramid to obtained data and recording obtained values back into the current section of the pyramid being processed.

1908—Interpolation of values of obtained data by means of non-overlapping parts of adaptive and/or linear composite cascade interpolation filters. Adding values of a similarly located section on a neighboring level of the reference pyramid with a higher spatial resolution to obtained data and recording obtained data into the relevant section of the pyramid being processed.

2001, 2006—Initial state of the pyramid being restored after operation of the unit of restoration of transmitted sections by means of non-overlapping parts of interpolation filters predetermined in resampling patterns.

2002, 2003—Stages of operation of the unit of interpolation of missed sections, for which there are restored similarly located sections on levels with a lower spatial resolution.

2004, 2005—Stages of operation of the unit of restoring missed sections, for which there are similar restored sections on the levels of pyramid with a higher spatial resolution.

2007, 2008—Stages of operation of the unit of restoring missed sections, for which there are similar restored sections on the levels of pyramid with a higher spatial resolution, if this unit implements an accelerated restoration scheme.

2100, 2200—Original hierarchical pyramid being restored.

2101, 2201—Reference hierarchical pyramid.

2102, 2202—Zero decimation level belonging to the original hierarchical pyramid being restored.

2103, 2203—First decimation level belonging to the original hierarchical pyramid being restored.

2104, 2204—Zero decimation level belonging to the reference hierarchical pyramid.

2105, 2105—First decimation level belonging to the reference hierarchical pyramid.

2106, 2206, 2209—Calculating the difference.

2107—Interpolator using non-overlapping filters.

2108, 2209, 2212—Calculating the total.

2207, 2211—Filtration by means of overlapping compensating parts of adaptive and/or linear composite cascade interpolation filters.

2208—Interpolation by means of non-overlapping parts of adaptive and/or linear composite cascade interpolation filters.

2300—System comprising the device of the claimed invention, or just a component thereof, and/or comprising a decoding device of the claimed invention, as well as a component thereof.

2301—Central processing unit; 2302—Nonvolatile (permanent) memory; 2303—Main memory; 2304—System bus; 2305—Hard disk; 2306—Graphics processor; 2307—Displaying device (display); 2308—Communication interface; 2309—Data network; 2310—Peripheral interface; 2311—Camcorder; 2312—Scanner; 2313—Memory card reader; 2314—Memory card; 2315—Removable disk drive; 2316—Removable disk; 2317—Pointing device interface; 2318—Pointing device; 2319—Keyboard interface; 2320—Keyboard; 2321—Printer.

Figure 2:
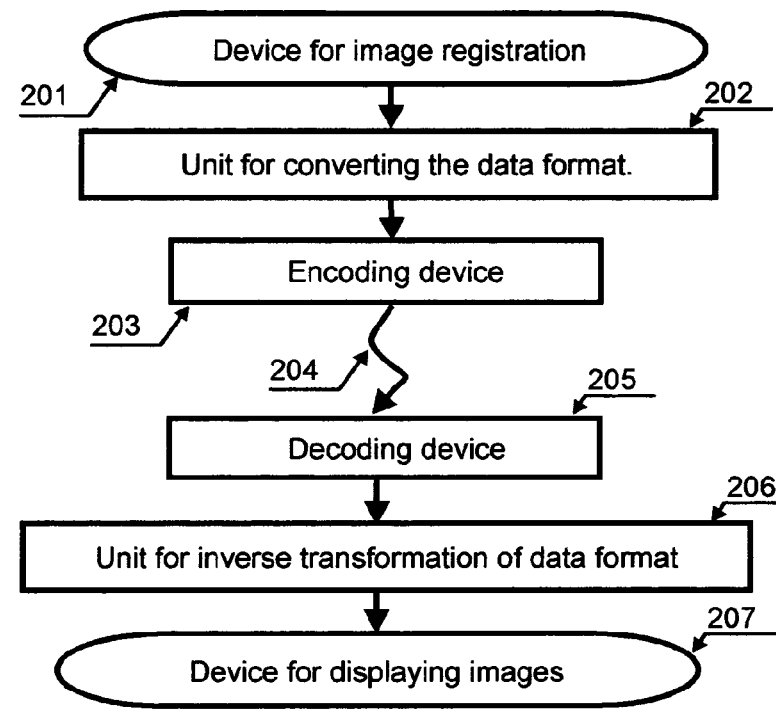
FIG. 2 is a general diagram of variants for implementation of a system comprising an encoding device and a decoding device and intended for transmission of images or video sequences through a limited throughput communication channel.
Figure 2:
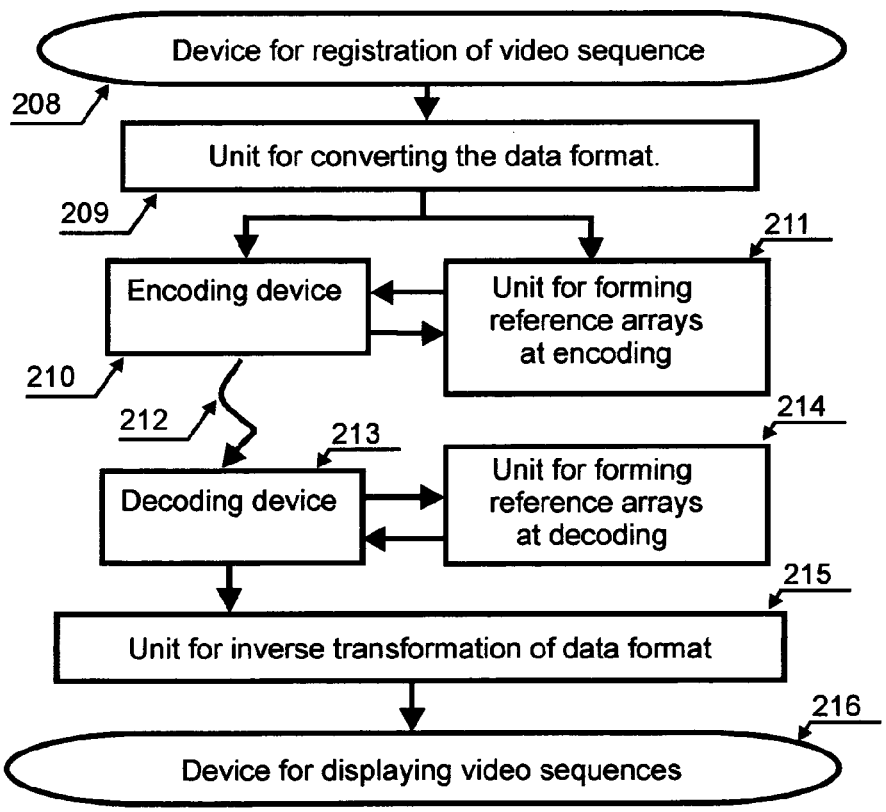

FIG. 2 presents examples of implementation of systems, which use the claimed group of inventions and intended for transfer of images and/or video sequences via limited throughput communication channels.

Images, upon being converted into an electric signal by means of registration device (201), come to unit (202) of format data conversion, where the format of input data is coordinated with the format used by encoding device (203). For example, a method of color representation of data being compressed, or their spatial resolution may vary. Then data encoded by means of encoding device (203) are transmitted via limited throughput communication channel (204) to the input of decoding device (205), whereupon the format of decoded data is inversely transformed in unit of inverse transformation (206), which communicates the restored images to displaying device (207).

Video sequences, upon being converted into an electric signal by means of registration device (208), come to the unit (209) of format data conversion, where the format of input data is coordinated with the format used by encoding device (210). For example, a method of color representation of data being compressed, or their spatial resolution may vary. Then the converted data come to the input of unit (211) of forming reference data arrays at encoding, and to the input of encoding device (210). Unit (211) of forming reference data arrays may form reference arrays by means of sections of video sequences, which were already encoded before, and transmit rules of formation of the aforesaid reference arrays through encoding device (210) via communication channel (212). Data encoded by means of encoding device (210) and reference data arrays are transmitted via limited throughput communication channel (212) to the input of decoding device (213). Decoding device uses reference data arrays formed by unit (214) of forming reference arrays at decoding, which may use in its operation previously transmitted sections, of video sequences and rules of formation of reference data arrays, which were transmitted via communication channel. Upon encoding, the format of encoded data is inversely transformed in unit of inverse transformation (215), which communicates the restored video sequences to displaying device (216).

Figure 7:
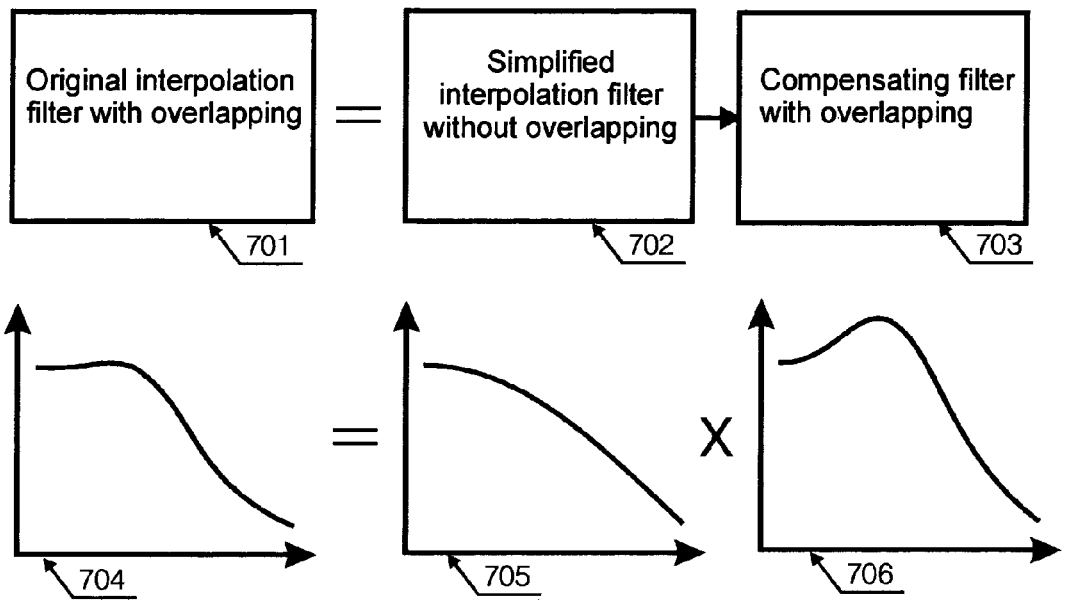
FIG. 7 is a method of implementation of composite cascade interpolation filters.
Figure 8:
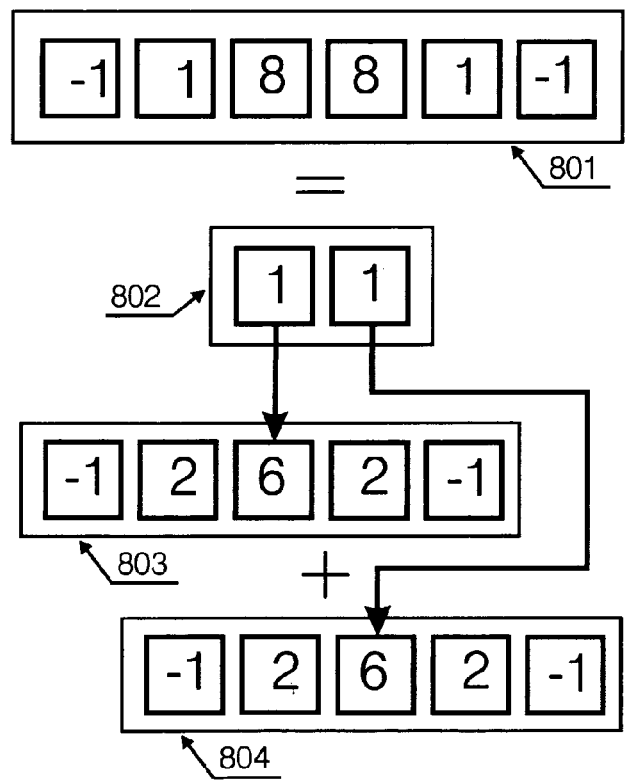
FIG. 8 is an example of practical implementation of a composite cascade interpolation filter.

In the claimed group of inventions, composite cascade interpolation filters are used (FIG. 7). Original interpolation, filter with overlapping (701) is replaced with an equivalent cascade of two filters in series interpolation filter without overlapping (702) and compensating filter (703) with overlapping. With filters (705,706) connected as a cascade, their amplitude-frequency functions are multiplied, with the result of operation of such a cascade becoming equal to the result of operation of original interpolation filter (704) with overlapping. FIG. 8 presents an example of transforming weight ratios of original interpolation filter (801). At the first stage, the signal is interpolated by filter (802) without overlapping. At the second stage, each sample obtained after interpolation is filtered by compensating filter (803,804) with overlapping. The final result of operation of the cascade is numerically equal to operation of the original interpolation filter with overlapping.

The claimed group of inventions involves using resampling patterns. A separate resampling pattern is an informational structure comprising unambiguous description of the process of converting original samples contained in the data section being processed into an array of subsamples, as well as comprising unambiguous description of the process of restoring original samples contained in the data section being processed out of an array of subsamples. The process of obtaining an array of subsamples may involve using adaptive and/or linear filters, whereas the process of restoring original samples may involve using adaptive and/or linear composite cascade interpolation filters. Patterns are kept in the storage of a set of patterns.

Figure 9:
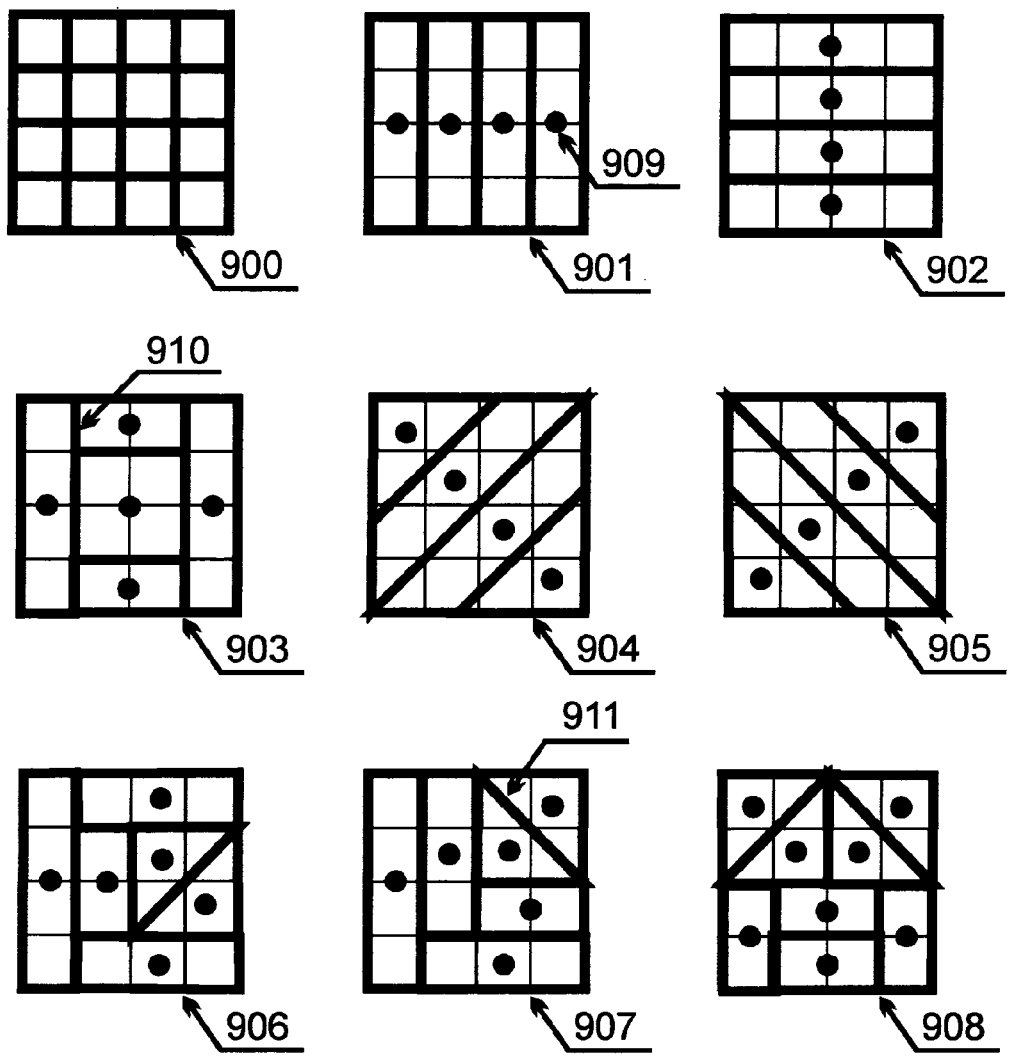
FIG. 9 are examples of resampling patterns, with the 4×4 size of a data section being processed.

FIG. 9 presents examples of resampling patterns, with section being processed (900) being 4×4 in size. Centers of filtered subsamples are shown as circles (909), whereas borders of non-overlapping parts of composite interpolation filters are highlighted in bold lines (910).

Configuration of resampling patterns may virtually be arbitrary. For example, configuration may be linear with resampling by horizontal (902) or vertical axes (901), non-linear with maintaining horizontal or vertical orientation of interpolating filters (903), directional with diagonal orientation of interpolating filters (904, 905), or mixed with arbitrary orientation of interpolating filters and arbitrary arrangement of subsamples in the pattern (906,907,908). If the border of non-overlapping parts of composite interpolation filters (911) passes across the area occupied by one sample of the data section being restored, at the first stage of interpolation, the value of this sample is determined through the equation below:

$$Ots = Pl_1 * Samp_1 + Pl_2 * Samp_2 \qquad (1),$$

where $Pl_1$ and $Pl_2$ are relative areas occupied by non-overlapping parts of interpolation filters, for the first ($Samp_1$) and second ($Samp_2$) subsample, respectively, Ots is obtained value of the data sample being restored.

The claimed group of inventions may involve using adaptive filters, i.e. filters changing their transfer characteristics depending on current statistical properties of the signal being processed. Variants of implementation of adaptive filters are presented in [15] and [16]. In particular, adaptive filters may be used as compensating filters within composite cascade interpolators, in units of two-dimensional adaptive and/or linear filtration and decimation, as well as in resampling patterns.

Figure 3:
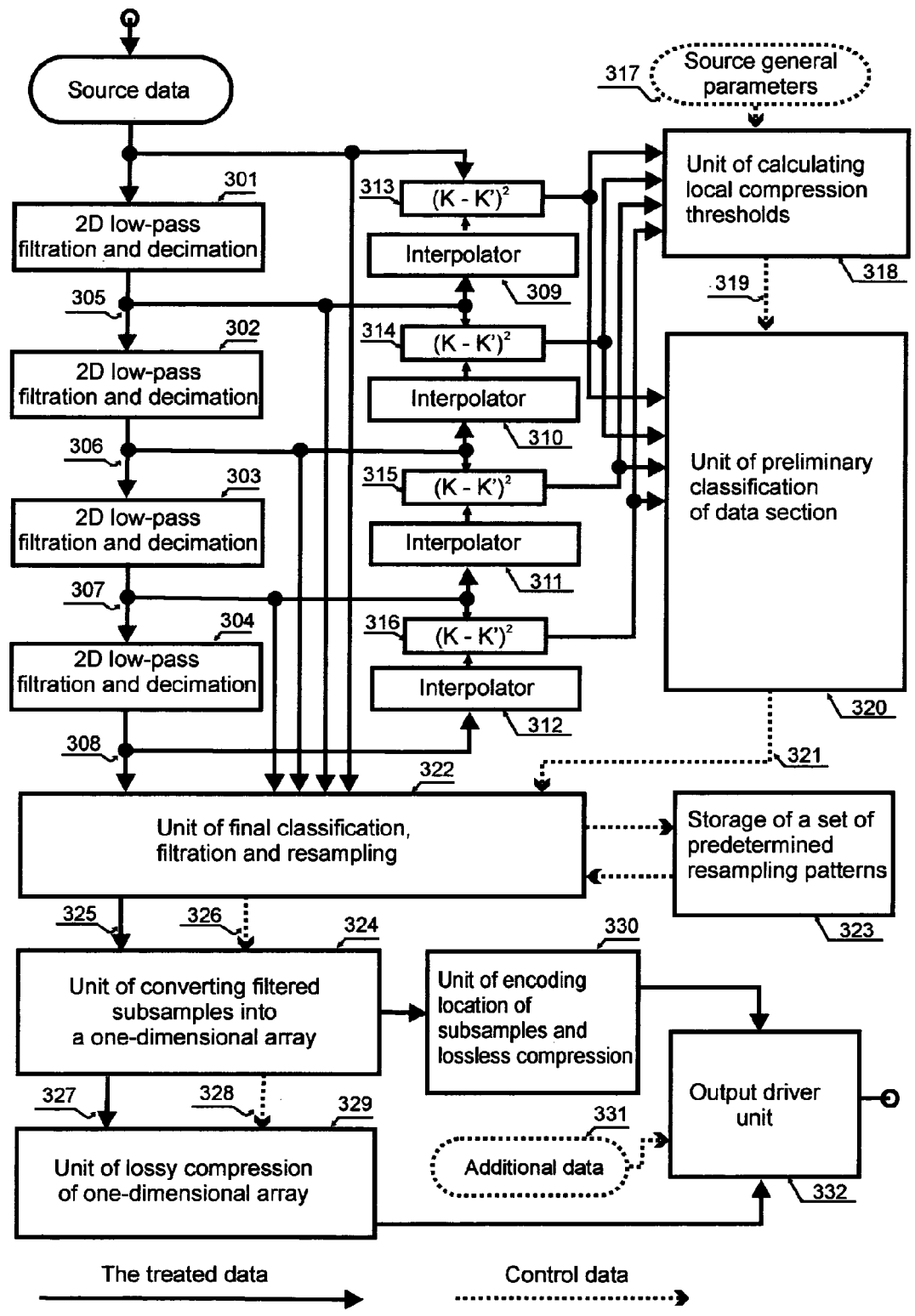
FIG. 3 is a general diagram of a device, which implements the presented method of encoding.

FIG. 3 is a schematic presentation of a device implementing a variant of the claimed encoding method.

At the first stage of this method, the input digital signal is presented as a hierarchical pyramid (Laplacian pyramid) with an arbitrary, predetermined number of levels. For example, FIG. 3 presents division into four levels. To this effect, original data are successively fed through units (301,302,303,304) of adaptive and/or linear filtration and decimation combined in a unit of forming and storing a hierarchical pyramid out of input data. Here, reduced copies of input data are created, which are kept at levels (305,306,307,308) of decimation in the unit of forming and storing hierarchical pyramid out of input data.

Thereafter, calculation is made of differential signal drive between hierarchical levels of the Laplacian pyramid created at the preliminary stage. Reduced copies (305,306,307,308) of original data are fed through units (309,310,311,312) of adaptive and/or linear interpolation, which, together with calculators (313,314,315,316) of the square of interlevel signal difference, are combined in a unit of calculating interlevel difference. Calculators (313,314,315,316) of the square of interlevel signal difference calculate the square of difference between the corresponding elements of the interpolated level and the level of the original hierarchical pyramid with a higher resolution, i.e. interlevel differential signal energy.

For data sections located on levels of a hierarchical pyramid with a low spatial resolution (high decimation level), calculation is made of accumulative metric characterizing statistical properties of a particular section of the input signal. The accumulative metric is characterized in that calculation thereof involves using the differential signal energy determined by means of calculators (313,314,315,316). Generally, in calculating accumulative metric Sen for a data section located at the decimation level with number M>0 and containing the number of value of differential signal enemy $N_M$>0, the equation below is applied:

$$Sen = \sum_{i=1}^{M} 2^{2(i-1)} \sum_{i=1}^{M} E_{n_i}, \quad (2)$$

where $N_i$ at i<M is the number of values of differential signal energy for a data section located similarly to the one being processed, but of a lower decimation level, $E_{n_i}$ is the value of differential signal energy with serial number n and located at decimation level i in the hierarchical pyramid being processed, $2^{2(i-1)}$ is compensating factor.

A metric determined in the above-described way may be applied to calculating local compression thresholds of input image (319), with global compression parameters (317) used in unit (318) of calculating local compression thresholds. For example, for each section of the hierarchical pyramid being compressed, it is possible to calculate the local compression threshold through a simple equation presented below:

$$Tlok = Tgl + Kdet*Sen \quad (3),$$

where Tlok is calculated local compression threshold,
Tgl is original general compression threshold,
Kdet is factor set for each decimation level,
Sen is value of the above metric.

Using pre-calculated values of differential signal energy makes it possible to raise the operating speed of unit (318) substantially. For data sections located at the zero level of the hierarchical pyramid being compressed, for which the value of Sen is not determined, one may use the value of Sen calculated for similarly located sections of a higher decimation level.

Local compression thresholds obtained in the aforesaid way are used during operation of unit (320) of preliminary classification of data sections. This unit would determine the sections of hierarchical levels of the Laplacian pyramid, to which predetermined non-linear resampling patterns will be applied.

Figure 4:
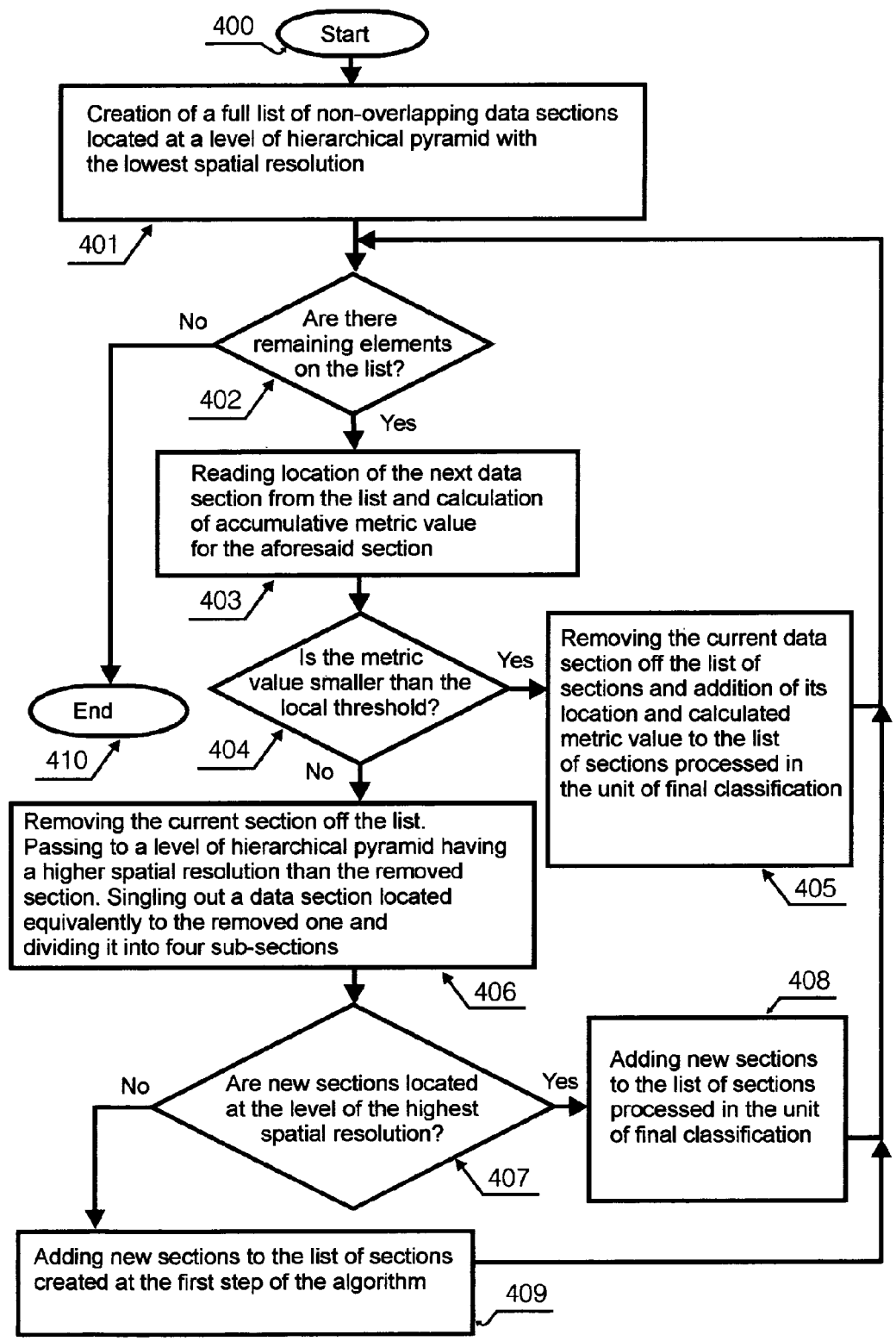
FIG. 4 is a sequence of operations with an operating unit for preliminary classification of data sections.

FIG. 4 presents a sequence of operations with operating unit (320) of preliminary classification of data sections. At the first stage (401), a list is made containing location of all the non-overlapping data sections, which are at a level of the hierarchical pyramid with the lowest spatial resolution. The size of these sections is set as equal to the size of a section being processed by unit (322) of final classification, filtration and resampling. Then the principal cycle (402) of processing is performed. Information is extracted (403) out of the list of elements being processed on location of the current data section in the hierarchical pyramid, with the above accumulative metric (2) calculated for this section. If the metric value is smaller (404) than the local compression threshold calculated in unit (318) of calculating local compression thresholds, information on location of the data section being processed is removed (405) off the processing list and put on the list of data sections being processed by unit (322) of final classification, filtration and resampling, together with calculated values of the accumulative metric. Otherwise (406), the section being processed is also removed off the processing list, yet transition occurs to a similarly located data section being on a neighboring level of the hierarchical pyramid with a higher spatial resolution. The new section is divided into four sub-sections, so that the amount of data contained in each sub-sections would match the amount of data in the original section removed off the processing list. Thereafter a check is performed (407) of location of new sections. If these sections are on the level of the hierarchical pyramid, which is of the highest spatial resolution, information on location of new sections is added (408) to the list of sections being processed by unit (322) of final classification, filtration and resampling, whereas zero values are recorded instead of the accumulative metric values. Otherwise (409), data on location of new sections are added to the processing list created at the first (401) stage of the algorithm. At the beginning of each new processing cycle, a check is performed for availability of elements on the list being processed (402), and with all the elements having been processed, the process of preliminary classification is completed (410). This method of preliminary classification makes it possible to achieve multiple acceleration of the compression process, as, in most of the cases, it is sufficient to process only the data sections located on levels of the original hierarchical pyramid, which have a low spatial resolution.

The size of each data section, which is being processed in unit (322) of final classification, filtration and resampling, must be equal to the size of resampling patterns recorded in the storage (323) of a set of predetermined resampling patterns.

Figure 10:
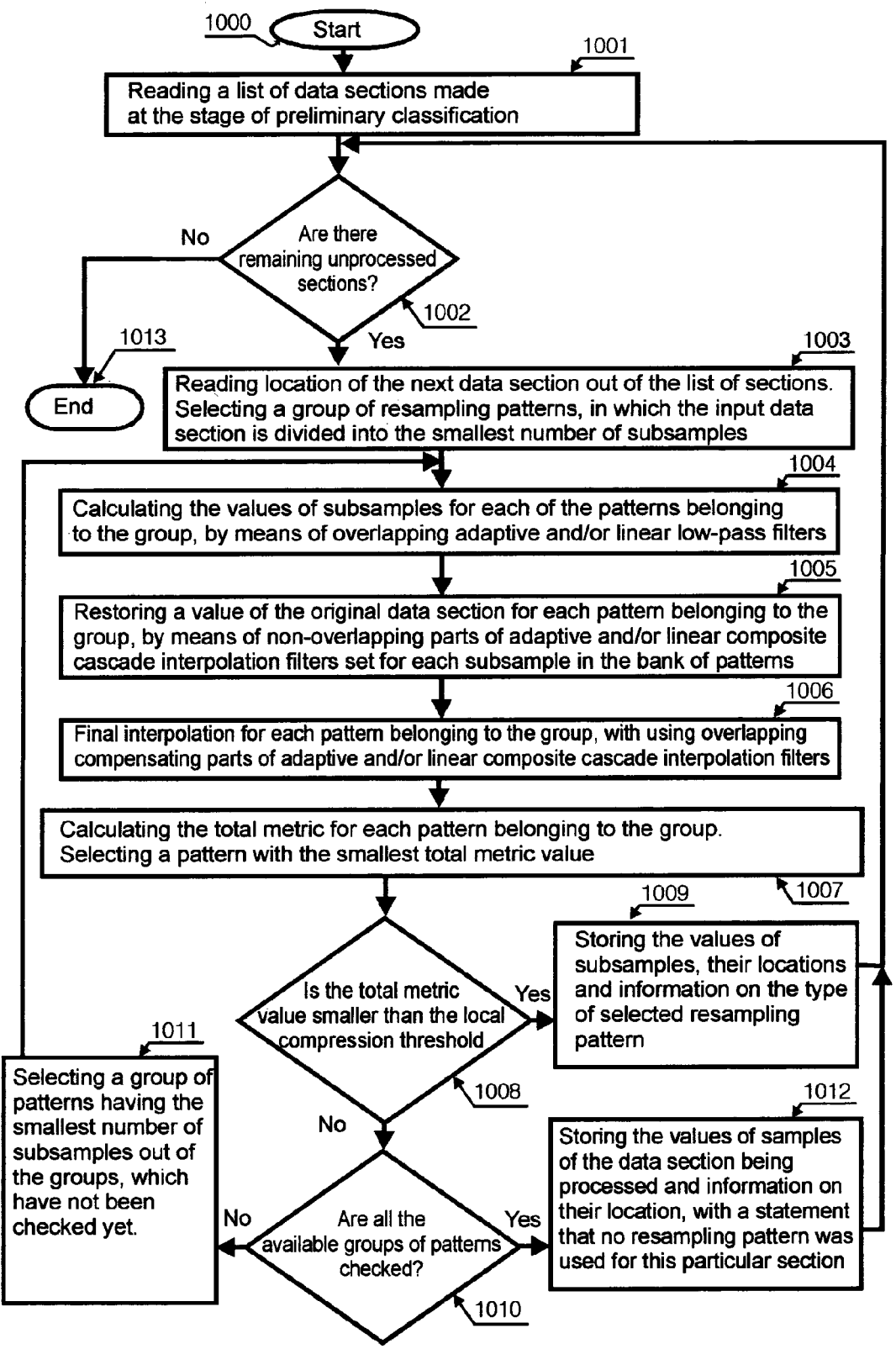
FIG. 10 is a sequence of operations, with an operating unit of final classification, filtration and resampling.

FIG. 10 is a schematic presentation of the sequence of operations with operating unit (322) of final classification, filtration and resampling. In storage (323) of a set of predetermined resampling patterns, all the patterns are grouped. Each group has patterns having the same number of sub-samples, yet of different configuration thereof. At the first stage of operation (1001), reading is performed (321) of the list of sections selected by the unit of preliminary classification, by means of the process detailed above. For each section, the list specifies its location and additional statistical information, including the calculated value of accumulative metric. The list of sections having been read (321), the principal cycle of processing is performed (1002). Location of the next data section out of the processing list is read (1003), and a group of resampling patterns is selected, in which the original data section is divided into the smallest number of sub-samples. Thereafter, calculation is performed (1004) of the value of subsamples for each of the patterns belonging to the group. Calculation (1004) is performed by means of overlapping adaptive and/or linear low-pass filters predetermined for each subsample in storage (323) of a set of predetermined resampling patterns, and with using the values of data located near the data section being processed in the main and differential hierarchical pyramids. It is followed by the first stage of restoring the original data section from obtained subsamples, which is performed (1005) for each of the resampling patterns belonging to the group. This stage involves using non-overlapping parts of adaptive and/or linear composite cascade interpolation filters determined for each subsample in storage (323) of a set of predetermined resampling patterns. Thereafter, for each pattern belonging to the group, the final stage of restoration is performed (1006), which involves using overlapping compensating parts of adaptive and/or linear composite cascade interpolation filters determined, for each sample of the data section being processed, in storage (323) of a set of predetermined resampling patterns, as well as using values of the data located near the section being processed in the original hierarchical pyramid. Thereafter, for each pattern belonging to the group, calculation is made (1007) of the total metric (Msym), which is performed through the following equation:

$$Msym = Sen + 2^{2M} \sum_{n=1}^{N} (K_n - K'_n)^2, \quad (4)$$

where Sen is the value of accumulative metric calculated for the data section being processed, M is the number of decimation level of the hierarchical pyramid, on which the unit being processed is located, N is the number of data samples in the unit being processed, $K_n$ is the original value of a data sample numbered as n, $K'_n$ is restored value of a data sample numbered as n.

It is followed by selecting (1007) a pattern of the smallest Msym value and belonging to the group of patterns being processed. The minimum value of total metric calculated in the aforesaid way is compared (1008) to the local threshold calculated by unit (318) of calculating local compression thresholds. Should the value of the total metric be smaller than the local compression threshold, there is performed storing (1009) of values of subsamples calculated at stage (1004), their location and information on the type of the resampling pattern selected at stage (1007). Thereafter, transition (1002) is performed to processing the next section of the image. Otherwise (1010), it is checked, whether there are still unchecked groups of resampling patterns and, if such groups are available, there is selected (1011) a group of patterns with the smallest number of subsamples out of those, which have not been checked yet, which is followed by proceeding to step (1004). If all the available configurations of resampling patterns have been checked, with no positive results given by the aforesaid check, the values of samples of the data section being processed is stored (1012), along with information on their location, with a statement that no resampling pattern was used for this particular section.

Then the subsamples obtained at the previous compression stage are converted into a one-dimensional data array. Unit (324) of converting obtained subsamples into a one-dimensional array may use both the elementary method of conversion based on copying input subsamples into output arrays according to the order, in which they were processed by unit (322) of final classification, filtration and resampling, and more complex adaptive methods of conversion. More complex conversion methods may use statistical and control data (326) obtained from the previous unit, and/or analyze values of subsamples (325) for creating a one-dimensional data array (327), in which subsamples of similar values and statistical properties would occupy close positions.

Figure 11:
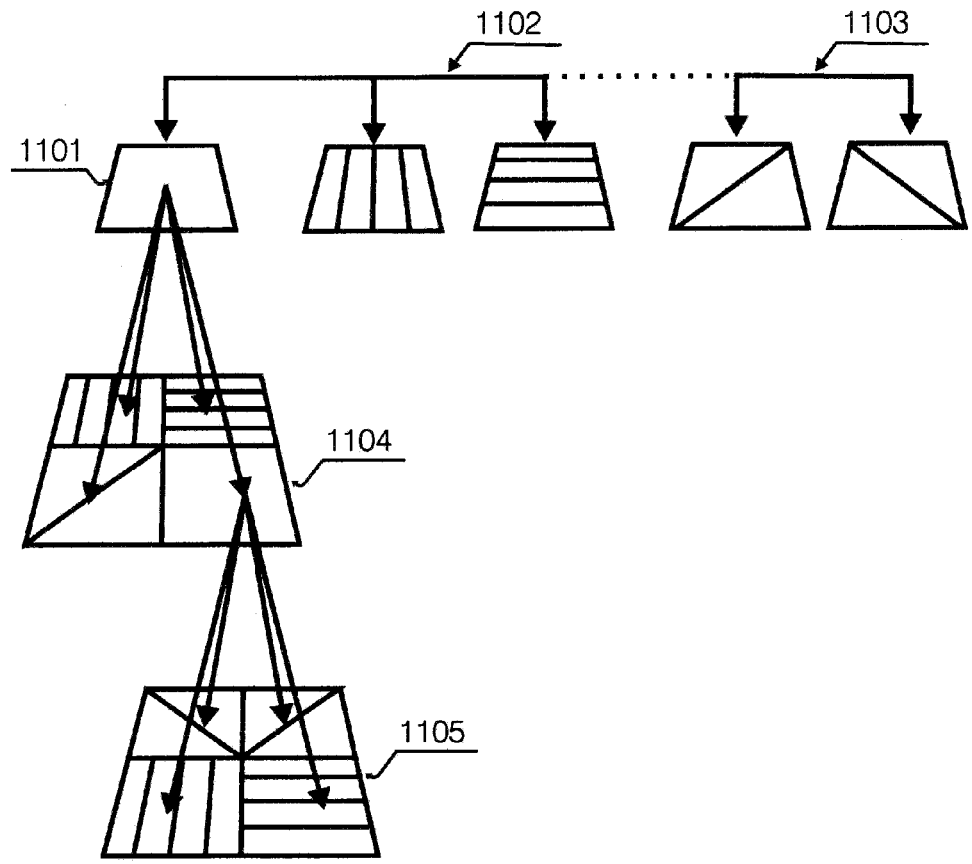
FIG. 11 is an example of constructing a embedded quadtree.

Data, which characterize arrangement of subsamples in original hierarchical pyramids, type of applied resampling patterns and procedure of selecting subsamples out of one-dimensional data array (327), are transmitted to unit (330) of encoding location of subsamples and lossless compression. This unit may use compact presentation of information on location of subsamples in the form of a hierarchical tree structure. Binary trees, quadtrees, or more complex structures, e.g. embedded quadtrees, octo-trees, etc. may be used as such structure. The final form of the tree structure is determined by the set of resampling patterns, which is used in compression. For example, FIG. 11 presents the principle of constructing a embedded quadtree. For each data section located at a level of hierarchical pyramid with the lowest spatial resolution (1101), the serial number of resampling pattern is saved (1102,1103), which was used for calculating subsamples on this section, and which is stored in storage (323) of a set of predetermined resampling patterns, and information is also saved, which characterizes unambiguously the process of restoring these subsamples from a one-dimensional data array. If this section were not selected in the process of operation of unit (320) of preliminary classification of data sections, zero value is stored for it, and transition is made to four filial data sections (1104) located on a neighboring level of hierarchical pyramid with a higher spatial resolution. If, however, the level in question of the hierarchical pyramid also contains unselected sections, the process of transition is repeated (1105). Information on location of subsamples presented in the form of a compact data structure may be additionally encoded by means of lossless compression algorithms, such as arithmetic encoding, or encoding with variable-length codes.

Figure 12:
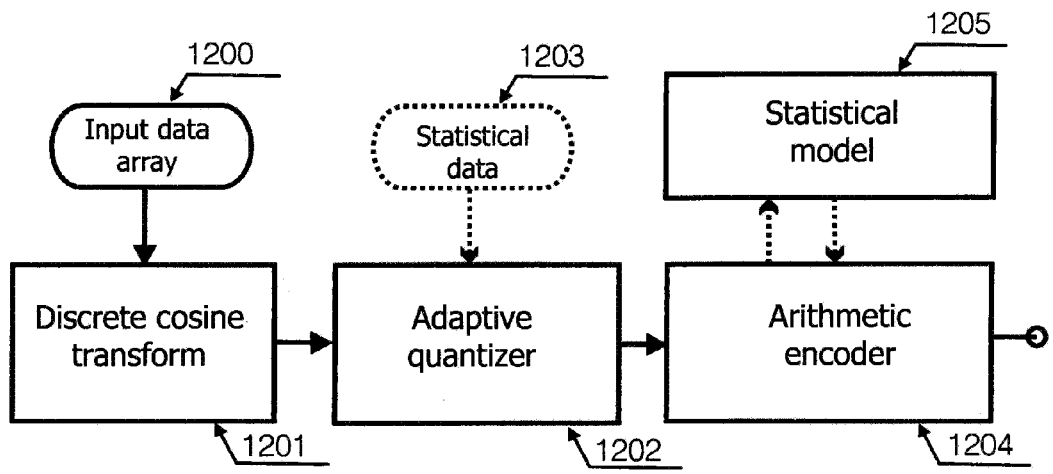
FIG. 12 is an example of implementation of a unit for lossy compression.

One-dimensional array of subsamples obtained as a result of operation of conversion unit (324) is compressed in unit (329) of lossy compression of one-dimensional array. Any of currently common algorithms of lossy compression may be used in this unit. In particular, this may be adaptive differential pulse-code modulation (ADPCM), discrete cosine transform (DCT), wavelet transform, sub-band transform, overlapped block transform, transform based on wavelet packet or Matching Pursuit [14]. The transform data may be applied jointly with scalar or vector quantization of obtained factors. Vector quantization without preliminary conversion may also be used. The original one-dimensional array may be divided into uneven sections, and different lossy compression algorithms may be applied to different sections. Unit (329) of lossy compression of one-dimensional array may use additional statistical and control data (328) for optimization of the compression process: for example, for selecting the quantization threshold, type of conversion applied, code book of vector quantization. FIG. 12 presents an example of implementation of lossy compression unit (329). An input one-dimensional array of subsamples (1200) is converted by means of discrete cosine transform (1201), whereupon obtained values are quantized by adaptive (1202) quantizer and compressed by arithmetic encoder (1204). Adaptive quantizer (1202) uses statistical data (1203) transmitted from unit (324) of converting filtered subsamples into a one-dimensional array, for optimization of the quantization process. Arithmetic encoder (1204) uses adaptive and/or stationary statistical model (1205) for raising encoding efficiency.

Data obtained as a result of operation of unit (330) of encoding location of subsamples and lossless compression, as a result of operation of unit (329) of lossy compression of one-dimensional array, are transmitted to output driver unit (332), where they are multiplexed and prepared for being transmitted via a communication channel. Output driver unit (332) may enter additional data (331) to the output flow, such as information on original size of the image being compressed, information on color format of data being compressed, rules of forming reference data arrays, etc.

In addition, the claimed method and device of encoding may be characterized as comprising the following essential features:

Unit (320) of preliminary classification of data sections may classify the original hierarchical pyramid into data sections of different fixed size, whereas unit (322) of final classification, filtration and resampling may use several sets of resampling patterns, each intended for its own size of data sections being processed.

Information, or a part thereof, comprising unambiguously described process of restoring encoded data sections from a restored array of subsamples, i.e. content, or a part of content of storage of resampling patterns may be encoded in the unit of lossless encoding of resampling patterns by means of the lossless method and be transmitted together with encoded data.

If data being encoded constitute a full-color image presented in the form of several color planes, for example, a luminance plane and color-difference planes, each of the aforesaid planes is encoded separately in the above-described way.

Processes of preliminary and final classification may be optimized by means of using a criterion of minimization of the general distortion rate, for a predetermined data level.

The encoding process may be performed for the entire input data array, or else this array may be divided into overlapping units, and for each unit the above-enumerated operations may be performed independently from the others.

Figure 5:
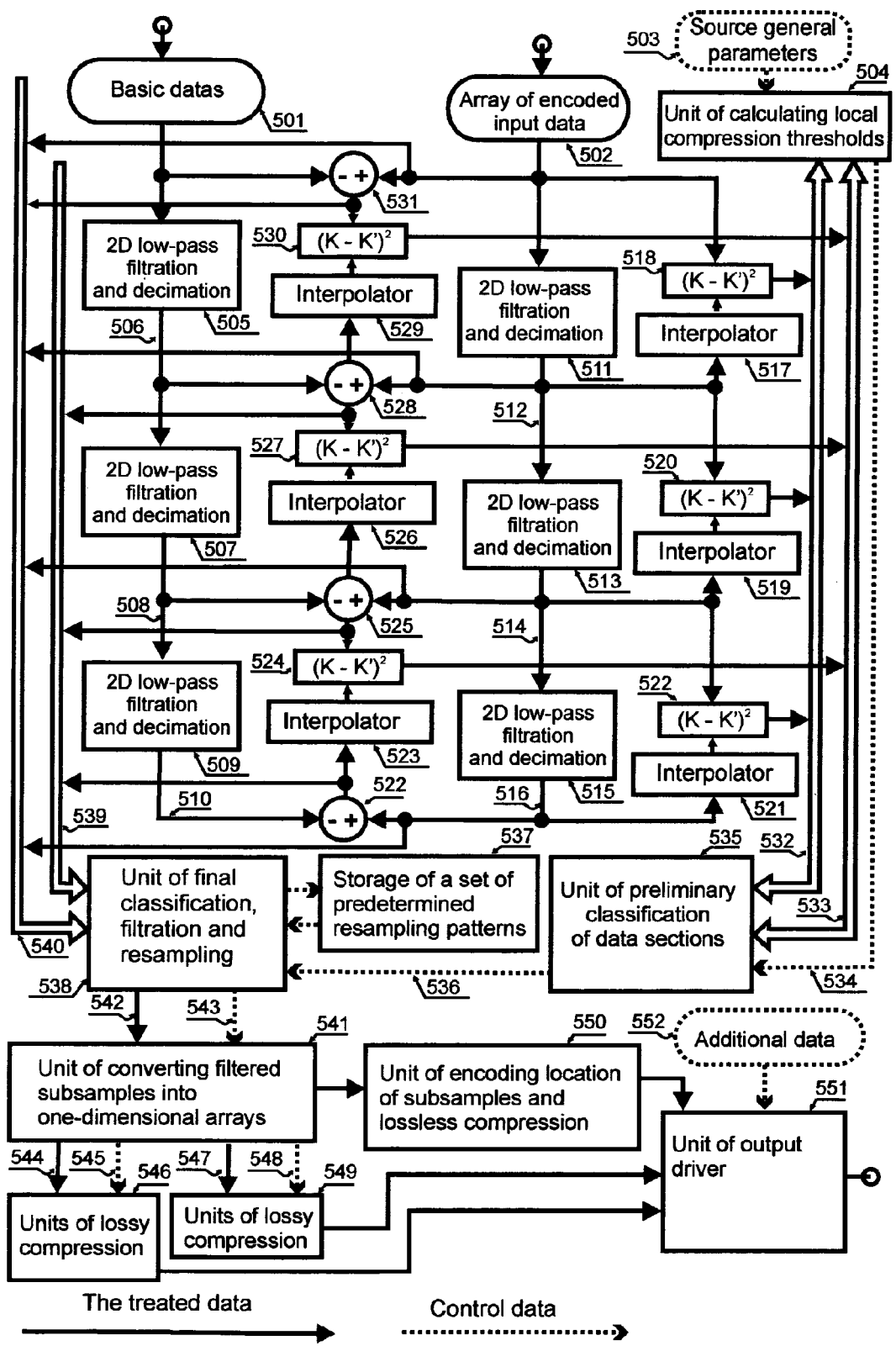
FIG. 5 is a general diagram of a device, which implements a variant of the presented method of data encoding, provided that reference data arrays are used.

FIG. 5 is a schematic presentation of a device implementing a variant of the claimed encoding method, for a case, when reference data arrays are used.

At the first stage of this method, the original digital signal, as well as reference data arrays are presented in the form of hierarchical pyramids (Laplacian pyramids) with an arbitrary predetermined number of levels. For example, FIG. 5 presents division of data into three decimation levels, with just one reference array used. To this effect, original data (502) are successively fed through units of adaptive and/or linear filtration and decimation (511,513,515) combined in a unit of forming and storing hierarchical pyramids from input data. Here, reduced copies of original data are created, which are stored on decimation levels (512,514,516) in the unit of forming and storing a hierarchical pyramid from input data. Reference data arrays (501) are also successively fed through units (505,507,509) of adaptive and/or linear filtration and decimation combined in a unit of forming reference hierarchical pyramids from reference data. Here, reduced copies of original reference data arrays are created, which are stored on decimation levels (506,508,510) in the unit of forming reference hierarchical pyramids from reference data.

Thereafter, differential hierarchical pyramids are created by means of calculators of difference (522,525,528,531) combined in a unit of calculating and storing differential hierarchical pyramids. Here, differences are calculated between corresponding levels of the original hierarchical pyramid and reference hierarchical pyramids. In other words, (510) is deducted from (516), (508) is deducted from (514), (506) is deducted from (512), and (501) is deducted from (502).

Thereafter, calculation is performed of interlevel differential signal energy for differential hierarchical pyramids and for the reference hierarchical pyramid. Decimation levels obtained in the course of creating the aforesaid pyramids are fed through units (517,519,521,523,526,529) of adaptive and/or linear interpolation, which, together with calculators (518,520,522,524,527,530) of the square of interlevel signal difference, are combined in a unit of calculating interlevel difference. Calculators (518,520,522,524,527,530) of the square of interlevel signal difference calculate the square of the difference between the corresponding elements of the interpolated level and the level belonging to the same hierarchical pyramid, but of a higher spatial resolution, i.e. determine interlevel differential signal energy.

The values of interlevel signal energy for original data (532) and data being in differential pyramid (533), which were obtained in the aforesaid way, are used for calculation of accumulative metric (2) used in the process of operation of the unit of calculating local compression thresholds (504) and in the process of operation of the unit of preliminary classification of data sections (535).

Thus, accumulative metric (2) may be used for operation of the unit of calculating local compression thresholds. Here, similarly located sections of the original and differential hierarchical pyramids are grouped. Thereafter, it is possible to calculate the local compression threshold for each group, which is performed through the simple equation given below:

$$Tlok = Tgl + Kdet*SenM \tag{5},$$

where Tlok is calculated local compression threshold,
Tgl is original general compression threshold,
Kdet is factor set for every decimation level,
SenM is the minimum value of accumulative metric out of the values, which were calculated for each of the sections in the group.

Here, a single local compression threshold is set for all the sections belonging to the group. Using pre-calculated values of differential signal energy allows a significant increase in operating speed of unit (504) of calculating local compression thresholds. For data sections located on the zero level of the hierarchical pyramid being compressed, for which the value of Sen was not determined, it is possible to use the value of Sen calculated for similarly located sections of a higher decimation level.

Figure 6:
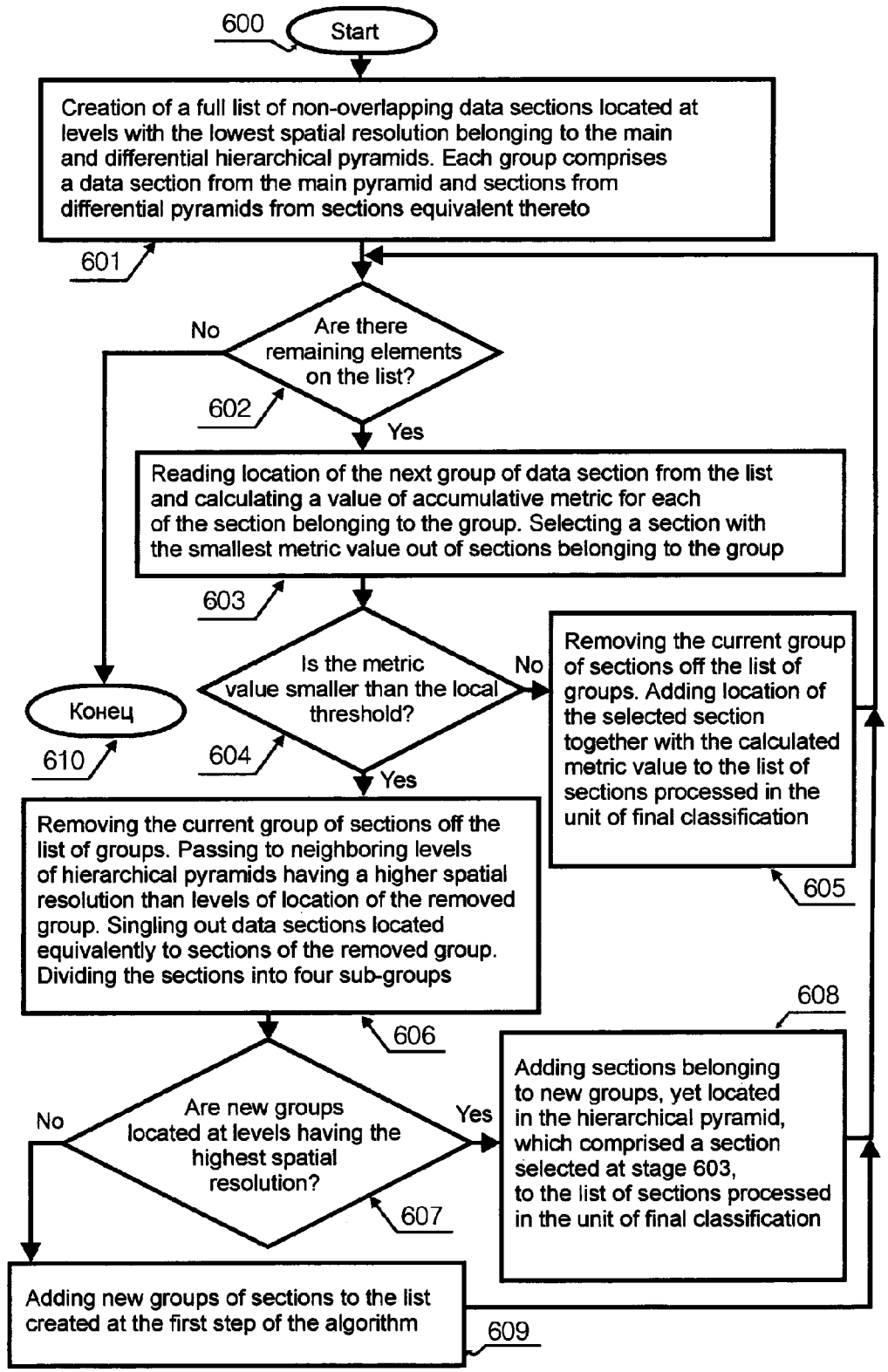
FIG. 6 is modified sequence of operations with an operating unit for preliminary classification of data sections for a variant of the presented encoding method, in case reference data arrays are used.

Obtained local compression thresholds (534) are used during operation of unit (535) of preliminary classification of the image sections. FIG. 6 presents a modified sequence of operations with operating unit of preliminary classification for a variant of the claimed encoding method, where reference data arrays are used. At the first stage (601), a full list is created of non-overlapping data sections located on levels with the lowest spatial resolution and belonging to the main and differential hierarchical pyramids. The size of these sections is set equal to the size of the section being processed by unit (538) of final classification, filtration and resampling. It is followed by grouping of data sections. Each group is to include a data section from the main pyramid and sections equivalent thereto from differential pyramids. This is followed by the principal cycle (602) of processing. Location of each of the sections belonging to the current group is read from the list of groups being processed (603). For each of the aforesaid sections, a value of accumulative metric (2) is calculated, and a section is selected, for which the calculated metric value is minimum. If the metric value is smaller (604) than the local compression threshold calculated in unit (504) of calculating local compression thresholds, the current group of sections is removed (605) off the processing list, whereas location of the section selected at the stage (603), together with the calculated value of accumulative metric, is put on the list of sections meant for being processed by unit (538) of final classification, filtration and resampling. Otherwise (606), the current group is also removed off the processing list, but with transition to a similarly located group of sections being on neighboring levels of the original and differential hierarchical pyramids with a higher spatial resolution. The new group is divided into four sub-groups, so that the amount of data in each sub-group would match the amount of data in the removed original group. It is followed by check (607) of location of new groups. If data sections belonging to these groups are on levels of the original and differential hierarchical pyramids of the highest spatial resolution, information on location of the new sections belonging to the new groups, and at the same time belonging to the same hierarchical pyramid as the section selected at stage (603), is added (608) to the list of sections meant for being processed by unit (538) of final classification, filtration and resampling. Zero values are recorded instead of the accumulative metric value for sections to be stored. If, however, condition (607) is not met, new groups are added (609) to the processing list created at the first stage of algorithm (601). At the beginning of each new processing cycle, a check is performed for availability of groups on the list being processed (602) and, with all the elements processed, the process of preliminary classification is completed (610). This method of preliminary classification allows multiple acceleration of the compression process and, at the same time, rational use of correlation between the data being compressed and the reference data.

The size of each data section, which is processed in unit (538) of final classification, filtration and resampling, must be equal to the size of resampling patterns recorded in storage (537) of a set of predetermined resampling patterns.

FIG. 10 is schematic representation of sequence of operations with operating unit (538) of final classification, filtration and resampling. In storage (537) of a set of predetermined resampling patterns, all the patterns are grouped. In each group, there are patterns having the same number of subsamples, but different configuration thereof. At the first stage of operation (1001), reading is performed of list (536) of sections selected by the unit of preliminary classification in the reference and differential hierarchical pyramids, by means of the process detailed above. For each section, the list comprises its location and additional statistical information, in particular, calculated value of accumulative metric. List (536) of sections having been read, the principal processing cycle (1002) is performed. Location of the next data section from the processing list is read (1003), and a group of resampling patterns is selected, in which the original data section is divided into the smallest number of subsamples. Thereafter, values of subsamples for each of the patterns belonging to the group are calculated (1004). Calculation (1004) is performed by means of overlapping adaptive and/or linear low-pass filters determined for each subsample in storage (537) of a set of predetermined resampling patterns, and with using values of the data being close to the data section being processed in the main and differential hierarchical pyramid. It is followed by the first stage of restoring the original data section from obtained subsamples, which is performed for each of resampling patterns belonging to the group. This stage is performed (1005) by means of non-overlapping parts of adaptive and/or linear composite cascade interpolation filters determined for each subsample in storage (537) of a set of predetermined resampling patterns. Thereafter, for each pattern belonging to the group, there is performed (1006) the final stage of restoration by means of overlapping compensating parts of adaptive and/or linear composite cascade interpolation filters determined for each sample of the data section being processed in the bank of patterns, and with using values of the data being close to the section being, processed in the original hierarchical pyramid and in differential hierarchical pyramids. Thereafter, for each pattern belonging to the group, the total metric (Msym) is calculated (1007), which is performed through the following equation:

$$Msym = Sen + 2^{2M} \sum_{n=1}^{N} (K_n - K'_n)^2, \quad (6)$$

where Sen is the value of accumulative metric calculated for the data section being processed, M is the number of decimation level of the hierarchical pyramid, where the unit being processed is located, N is the number of data samples in the unit being processed, $K_n$ is the original value of data sample with number n, $K'_n$ is restored value of data sample with number n.

Then a pattern is selected (1007), which has the minimum value of Msym and belongs to the group of patterns being processed. The minimum value of the total metric calculated in the aforesaid way is compared (1008) to the local threshold calculated by unit (504) of calculating local compression thresholds. If the total metric value is smaller than the local compression threshold, values of subsamples calculated at stage (1004), their location and information on the type of resampling pattern selected at stage (1007) are saved (1009). Thereafter, transition is performed (1002) to processing the next section of image. Otherwise, a check is made (1010) on whether there are still unchecked groups of resampling patterns, and, if such groups are available, a group of patterns is selected (1011) with the smallest number of subsamples out of those unchecked, whereupon transition is performed to step (1004). If, however, all the available configurations of resampling patterns were checked, with no positive results brought by the check, the values of samples of the data section being processed and information on location thereof are saved (1012), with a statement that no resampling pattern was used for this particular section.

Then subsamples obtained at the previous compression stage are converted into a number of one-dimensional data arrays. One array is used for storing subsamples obtained from data sections located in the original hierarchical pyramid, and the rest of them are formed of subsamples obtained from sections of differential pyramids. Unit (541) of converting obtained subsamples into one-dimensional arrays may use both the elementary method of conversion based on copying input subsamples into output arrays according to the order, in which they were processed by unit (538) of final classification, filtration and resampling, and more complex adaptive methods of conversion. More complex conversion methods may use statistical and control data (543) obtained from the previous unit, and/or analyze values of subsamples (542) for creating one-dimensional data arrays (544,547), in which subsamples of similar values and statistical properties would occupy close positions.

Data (544,547), which characterize arrangement of subsamples in original hierarchical pyramids, type of applied resampling patterns and procedure of selecting subsamples out of one-dimensional data arrays are transmitted to unit (550) of encoding location of subsamples and lossless compression. This unit may use compact presentation of information on location of subsamples in the form of a hierarchical tree structure. Binary trees, quadtrees, or more complex structures, e.g. embedded quadtrees, octo-trees, etc. may be used as such structure. The final form of the tree structure is determined by the set of resampling patterns, which is used in compression. For example, FIG. 11 presents the principle of constructing a embedded quadtree. For each group (601) of data sections located at levels of hierarchical pyramids with the lowest spatial resolution (1101), the serial number of the hierarchical pyramid is saved, in which there is a section selected in the process of preliminary classification, as is the serial number of resampling pattern (1102,1103), which was used for calculating subsamples on this section, and which is stored in storage (537) of a set of predetermined resampling patterns, and information is also saved, which characterizes unambiguously the process of restoring these subsamples from a one-dimensional data array. If, however, in the group being processed, no section was selected in the process of operation of unit (535) of preliminary classification, zero value is stored for it, and transition is made to four filial groups of data sections (1104) located on neighboring levels of hierarchical pyramids with a higher spatial resolution. If, however, these levels of hierarchical pyramids also have groups with unselected sections, the transition process is repeated (1105).

Information on location of subsamples presented in the form of a compact data structure may be additionally encoded by means of lossless compression algorithms, such as arithmetic encoding, or encoding with variable-length codes.

One-dimensional arrays of subsamples obtained as a result of operation of unit (541) of converting filtered subsamples into one-dimensional arrays are compressed in units (546, 549) of lossy compression combined in a unit of lossy compression of one-dimensional data arrays. Any of currently common algorithms of lossy compression may be used in these units. In particular, this may be adaptive differential pulse-code modulation (ADPCM), discrete cosine transform (DCT), wavelet transform, sub-band transform, overlapped block transform, transform based on wavelet packet or Matching Pursuit [14]. The transform data may be applied jointly with scalar or vector quantization of obtained factors. Vector quantization without preliminary conversion may also be used. The original one-dimensional array may be divided into uneven sections, and different lossy compression algorithms may be applied to different sections. Units (546, 549) of lossy compression may use additional statistical and control data (545,548) for optimization of the compression process: for example, for selecting the quantization threshold, type of conversion applied, code book of vector quantization. FIG. 12 presents an example of implementation of lossy compression unit (546,549). An input one-dimensional array of subsamples (1200) is converted by means of discrete cosine transform (1201), whereupon obtained values are quantized by adaptive quantizer (1202) and compressed by arithmetic encoder (1204). Adaptive quantizer uses statistical data transmitted from unit (541) of converting filtered subsamples into a one-dimensional array, for optimization of the quantization process. Arithmetic encoder uses adaptive and/or stationary statistical model (1205) for raising encoding efficiency.

Data obtained as a result of operation of unit (550) of encoding location of subsamples and lossless compression, as a result of operation of the unit of lossy compression of one-dimensional arrays, are transmitted to output driver unit (551), where they are multiplexed and prepared for being transmitted via a communication channel. Output driver unit (551) may enter additional data (552) to the output flow, such as information on original size of the image being compressed, information on color format of data being compressed, rules of forming reference data arrays, etc.

In addition, the claimed method and device of encoding may be characterized as comprising the following essential features:

Unit (535) of preliminary classification of data sections may classify the original hierarchical pyramid and differential hierarchical pyramids into data sections of different fixed size, whereas the unit of final classification, filtration and resampling may use several sets of resampling patterns, each intended for its own size of data sections being processed.

Information, or a part thereof, comprising unambiguously described process of restoring encoded data sections from a restored array of subsamples, i.e. content, or a part of content, of storage of resampling patterns, may be encoded in the unit of lossless encoding of resampling patterns by means of the lossless method and be transmitted together with encoded data.

If data being encoded constitute a full-color image presented in the form of several color planes, for example, a luminance plane and color-difference planes, each of the aforesaid planes is encoded separately in the above-described way.

Processes of preliminary and final classification may be optimized by means of using a criterion of minimization of the general distortion rate, for a predetermined data level.

The encoding process may be performed for the entire input data array, or else this array may be divided into overlapping units, and for each unit the above-enumerated operations may be performed independently from the others.

Figure 13:
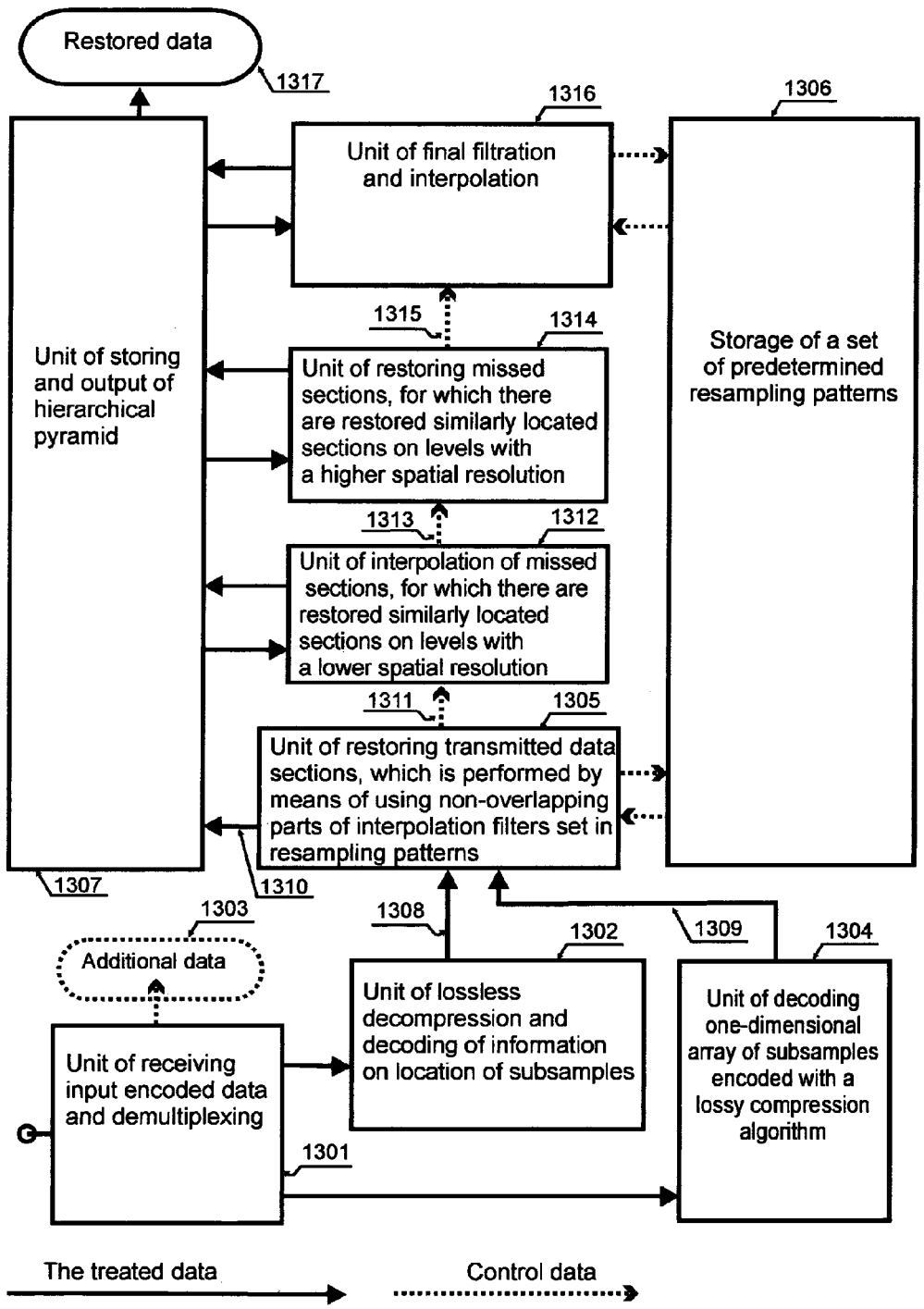
FIG. 13 is a general diagram of a device implementing the above method of decoding compressed data.

FIG. 13 is schematic presentation of a device implementing a variant of the claimed method of decoding data, where encoded data are presented in the form of a one-dimensional data array compressed by means of the lossy compression method, and information encoded by the lossless method, where the aforesaid one-dimensional data array is obtained from subsamples obtained by means of adaptive and/or linear filters from sections of a hierarchical pyramid formed from digital signals being encoded, whereas the aforesaid adaptive and/or linear filters are set in a resampling pattern used in encoding and selected out of a predetermined set of resampling patterns, where the aforesaid information contains data on location of these subsamples in the aforesaid pyramid and data on the type of resampling patterns used for obtaining these subsamples.

At the first stage of this method, compressed data are divided in unit (1301) of receiving input encoded data and demultiplexing. Here, additional data (1303) are singled out, which may contain, e.g., information on the number of decimation levels used in compression, or on the size of the original data array. A compressed array of subsamples is restored in unit (1304) of decoding one-dimensional array of subsamples encoded by means of an algorithm of lossy compression. In particular, this unit may successively use algorithms of arithmetic decoding, inverse quantization and inverse DCT transform. Compressed data on location of subsamples in the original hierarchical pyramid are decoded in unit (1302) of lossless decompression and decoding information on location of subsamples in the image. In particular, this unit may use the algorithm of arithmetic decoding and the algorithm of decoding information from a compact hierarchical tree structure of data. Besides, this unit decodes information on types of resampling patterns used in encoding.

Thereafter, in unit (1305) of restoring transmitted data sections, there is performed restoration of transmitted sections of the original hierarchical pyramid and storing them (1310) to unit (1307) of storing and output of hierarchical pyramid.

Figure 15:
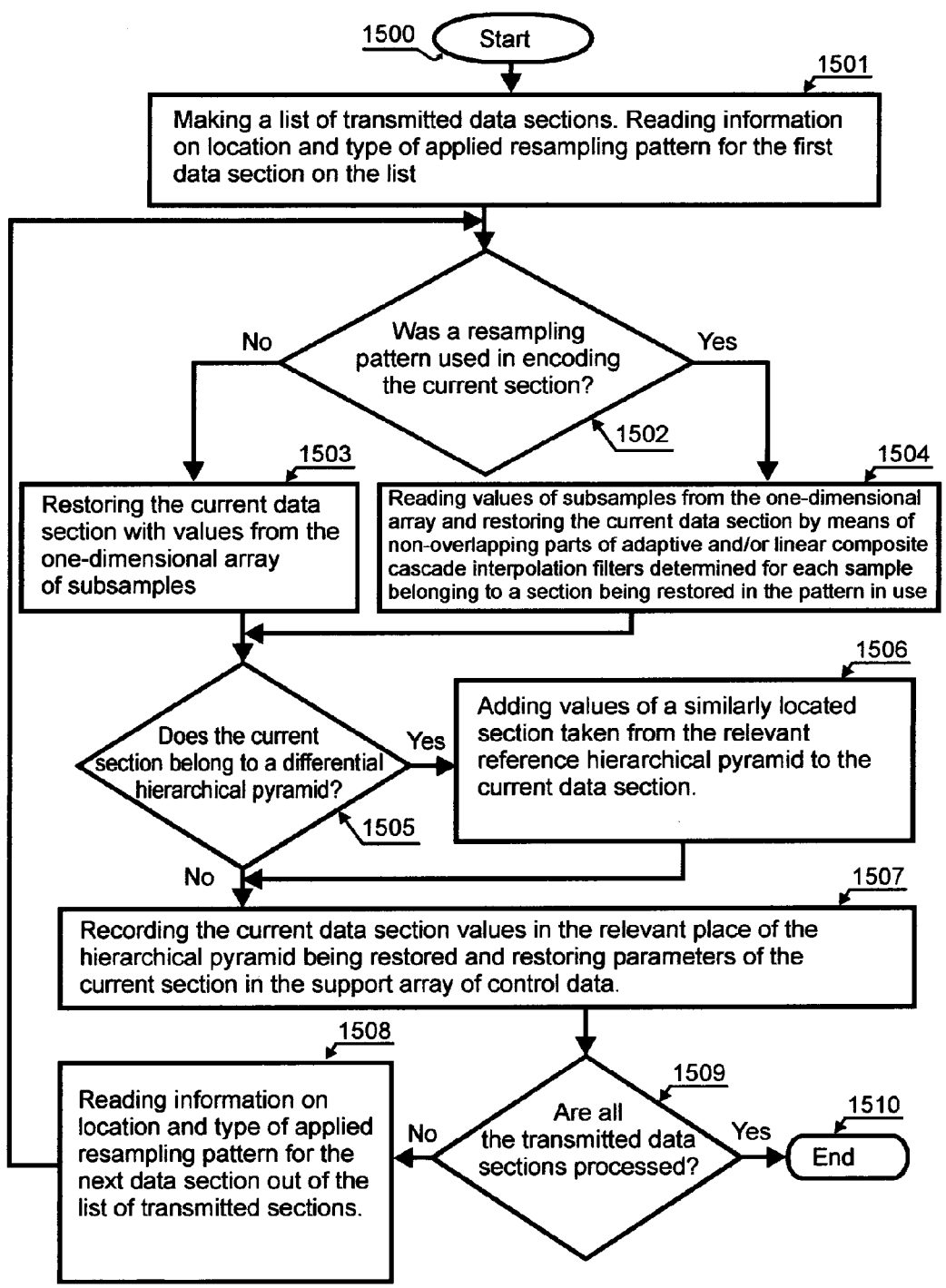
FIG. 15 is a sequence of operations with an operating unit of restoring transmitted data sections, which is performed by means of non-overlapping parts of interpolation filters set in resampling patterns.

FIG. 15 presents an example of sequence of operations with operating unit (1305) of restoring transmitted data sections, which is performed by means of non-overlapping parts of interpolation filters set in resampling patterns. At the first stage (1501), based on decoded information (1308) on location of subsamples and the type of applied resampling patterns, a list is created of all the data sections transmitted by the encoding device, and information is read on location and type of the used resampling pattern for the first data section on the list. If (1502) the current section is encoded with a resampling pattern, reading is performed (1504) of the values of the restored array of subsamples (1309), and the current data section is restored by means of non-overlapping parts of adaptive and/or linear composite cascade interpolation filters determined for each sample of the data section being restored in the applied resampling pattern. Here, the applied resampling pattern is read from storage (1306) of a set of resampling patterns. Otherwise, direct restoration is performed (1503) of the current data section by means of values from the restored array of subsamples (1309). Data (1310) obtained in the aforesaid way are recorded (1507) on a relevant place in the unit of storing and output of hierarchical pyramid (1307). Additionally, information on parameters of restoration of the current data section is saved to support data array (1311). If (1509) there are still data sections, which are not processed yet, information is read (1508) on the next section on the list, and processing is repeated (1510).

Thereafter, restoration is performed of sections missed at the previous stage, and these sections are saved to unit (1307) of storing and output of hierarchical pyramid. This process is performed by unit (1312) of interpolation of missed sections, for which there are restored similarly located sections on levels with a lower spatial resolution.

Figure 16:
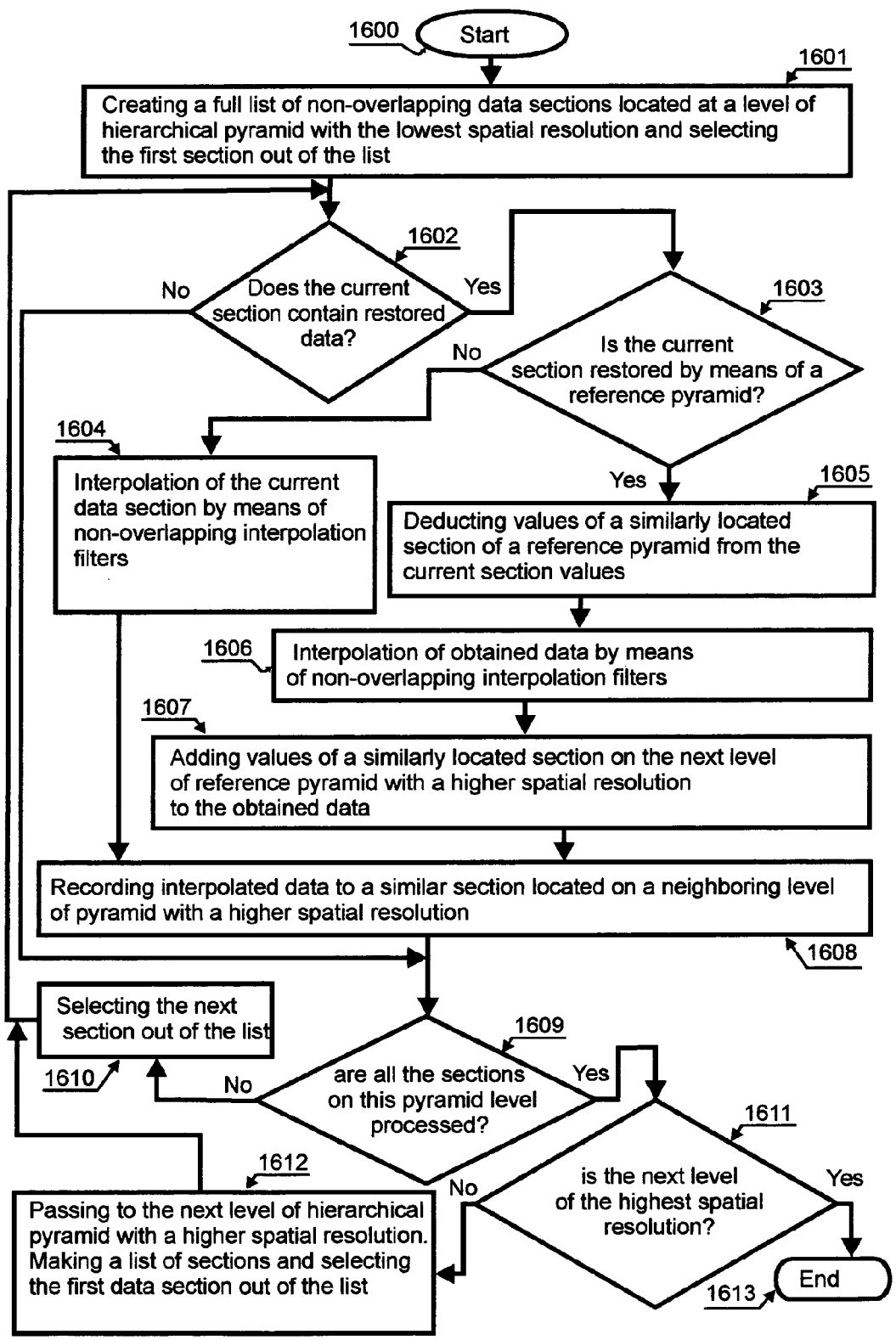
FIG. 16 is a sequence of operations with an operating unit of interpolation of missed sections, for which there are restored similarly located sections on levels with a lower spatial resolution.

FIG. 16 presents an example of sequence of operations with the aforesaid unit (1312) operating. At the first stage, there is performed (1601) creation of a full list of non-overlapping data sections located on the level of hierarchical pyramid with the lowest spatial resolution, and selection of the first section out of the list. Thereafter, by means of support data array (1311), a check is made (1602) on whether the current section contains restored data. If there are no such data on the section, the section is not processed. Otherwise, interpolation (1604) is performed of the current data section by means of non-overlapping interpolation filters. Obtained values are recorded (1608) on a similar section located on a neighboring level of the pyramid being restored with a higher spatial resolution. Additionally, for the recorded section, information is renewed in support data array (1311), and apart from that, all the accumulated support data are copied to output support data array (1313). Therefore, at processing of the next levels of the hierarchical pyramid, the recorded section is accounted for as a restored one. If (1609) on the level being processed of hierarchical pyramid there remain unprocessed sections, the next section is selected out of the list (1610), and the cycle is repeated. Otherwise, a check is performed (1611) on whether the next unprocessed level of hierarchical pyramid is of the highest spatial resolution, and if it is not, transition is performed (1612) to the next level of the hierarchical pyramid with a higher spatial resolution. Here, a full list of data sections is created on the new level of hierarchical pyramid, and the first section is selected out of the list, whereupon the processing cycle is repeated. If, however, there is the only unprocessed level of hierarchical pyramid with the highest spatial resolution, processing is completed (1613).

It is followed by restoration of the missed sections of the hierarchical pyramid located on the levels of the hierarchical pyramid being processed with a low spatial resolution, and saving these sections to unit (1307) of storing and output of hierarchical pyramid. This process is performed by means of unit (1314) of restoring missed sections, for which there are restored similarly located sections on levels with a higher spatial resolution.

Figure 17:
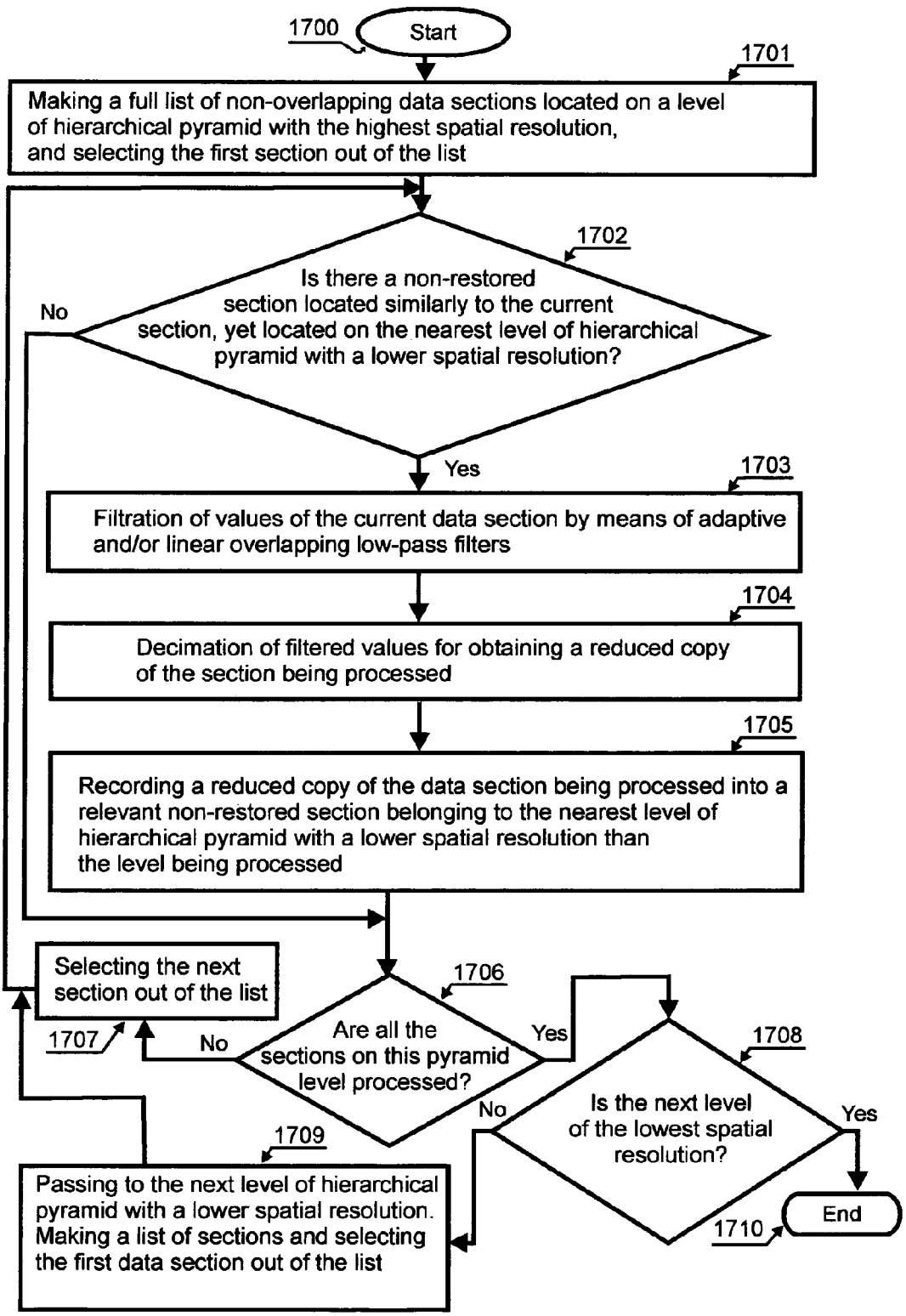
FIG. 17 is a sequence of operations with an operating unit of restoring missed sections, for which there are restored similarly located sections on levels with a higher spatial resolution.

FIG. 17 presents an example of sequence of operations with the aforesaid unit (1314) operating. At the first stage (1701), there is performed creation of a full list of non-overlapping data sections located on the level of hierarchical pyramid with the highest spatial resolution, as well as selection of the first section out of the list. Therefore, by means of support data array (1313), a check is performed (1702) for availability of an unrestored data section located similarly to the current restored data section, at the same time located on the nearest level of hierarchical pyramid with a lower spatial resolution. If there is no such section, or the current section is not restored, no processing is performed. Otherwise, filtration is performed (1703) of values of the current data section by means of adaptive and/or linear overlapping low-pass filters (1703), with subsequent decimation of obtained values (1704). A reduced copy of the data section being restored obtained in the aforesaid way is recorded (1705) to a relevant unrestored section belonging to the nearest level of hierarchical pyramid with a lower spatial resolution than the level being processed. Here, for the recorded data section, information is renewed in support data array (1313), and apart from that, all the accumulated support data are copied to output support data array (1315). Therefore, at processing of the next levels of the hierarchical pyramid, the recorded section is accounted for as a restored one. If (1706) on the section being processed of the hierarchical pyramid there remain unprocessed sections, the next section is selected (1707) out of the list, and the cycle is repeated. Otherwise, a check is made (1708) on whether the next unprocessed level of the hierarchical pyramid is of the lowest spatial resolution, and if it is not, transition is performed (1709) to the next level of hierarchical pyramid with a lower spatial resolution. Here, a full list of data sections is created on the new level of hierarchical pyramid, and the first section is selected out of the list, whereupon the processing cycle is repeated. If, however, there is the only unprocessed level of hierarchical pyramid with the lowest spatial resolution, processing is completed (1710).

Figure 20:
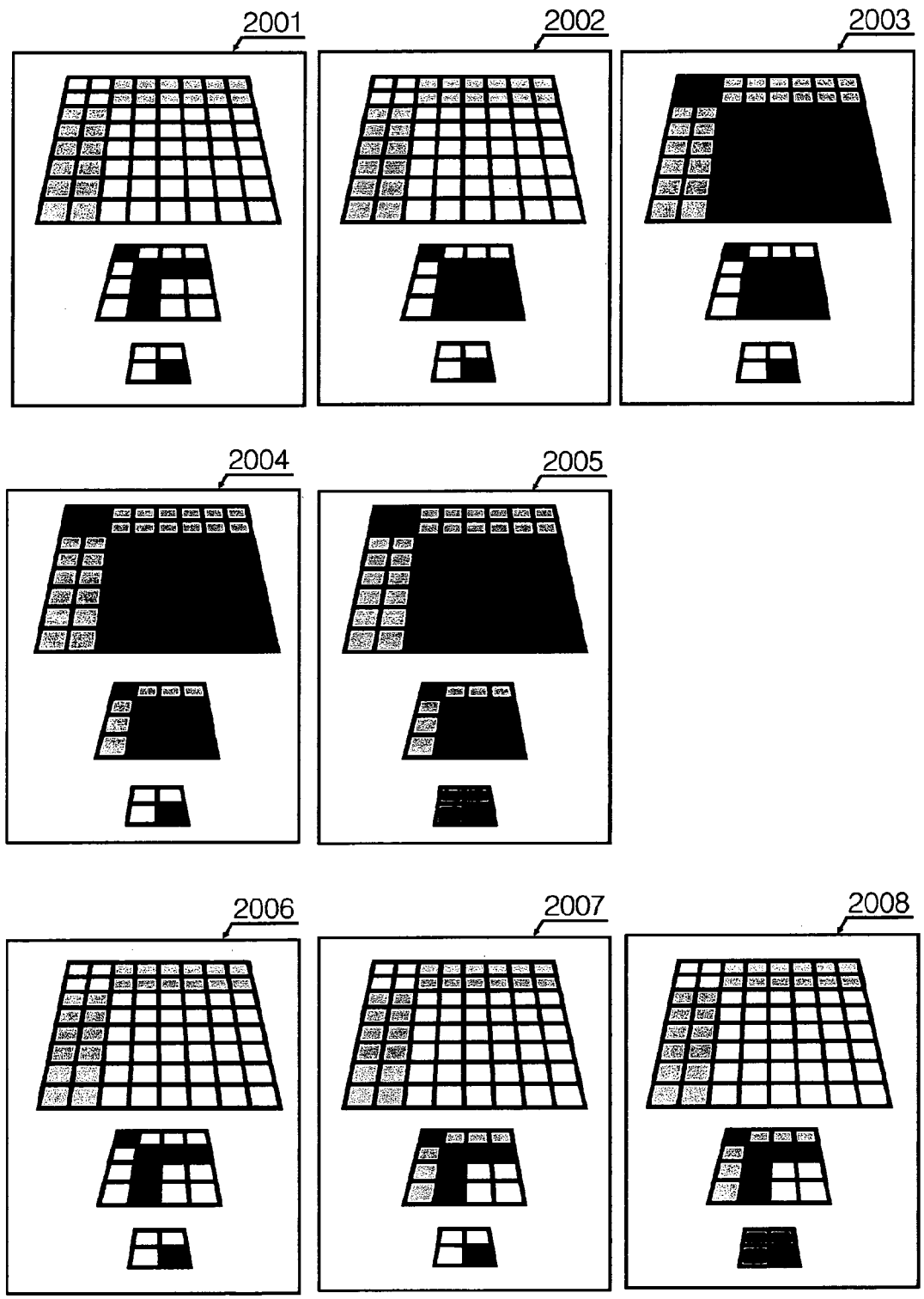
FIG. 20 is an example of restoration of an original hierarchical pyramid for ordinary and accelerated restoration methods.

FIG. 20 presents an example of restoring sections of hierarchical pyramid missed by the unit of restoring transmitted data sections (1305). Operation of this unit leaves a lot of unrestored (2001) data sections (white squares in FIG. 20). Unit (1312) of interpolation of missed sections, for which there are restored similarly located sections on levels with a lower spatial resolution, successively interpolates restored units of the image, beginning with the lowest level of hierarchical pyramid (2002, 2003), by using information (1311) on location of restored units of the image. As a result, the highest level of the hierarchical pyramid becomes filled completely. Interpolation is performed by means of non-overlapping interpolation filters. Thereafter, unit (1314) of restoring missed sections, for which there are restored similarly located sections on levels with a higher spatial resolution, restores, by means of information on missed samples (1313), the data section remaining unrestored, while using filtration of values of the current data section, by means of adaptive and/or linear overlapping low-pass filters, with subsequent decimation of obtained values. This process is performed successively, beginning with a level of the hierarchical pyramid being restored with the highest spatial resolution (2004) towards the level of the aforesaid pyramid with the lowest spatial resolution (2005). At the end of restoration process, all the sections of the hierarchical pyramid stored in unit (1307) of storing and output of hierarchical pyramid become filled completely (2005).

It is followed by processes of final interpolation and filtration of data section stored in unit (1307) of storing and output of hierarchical pyramid. This process is performed by unit (1316) of final filtration and interpolation.

Figure 18:
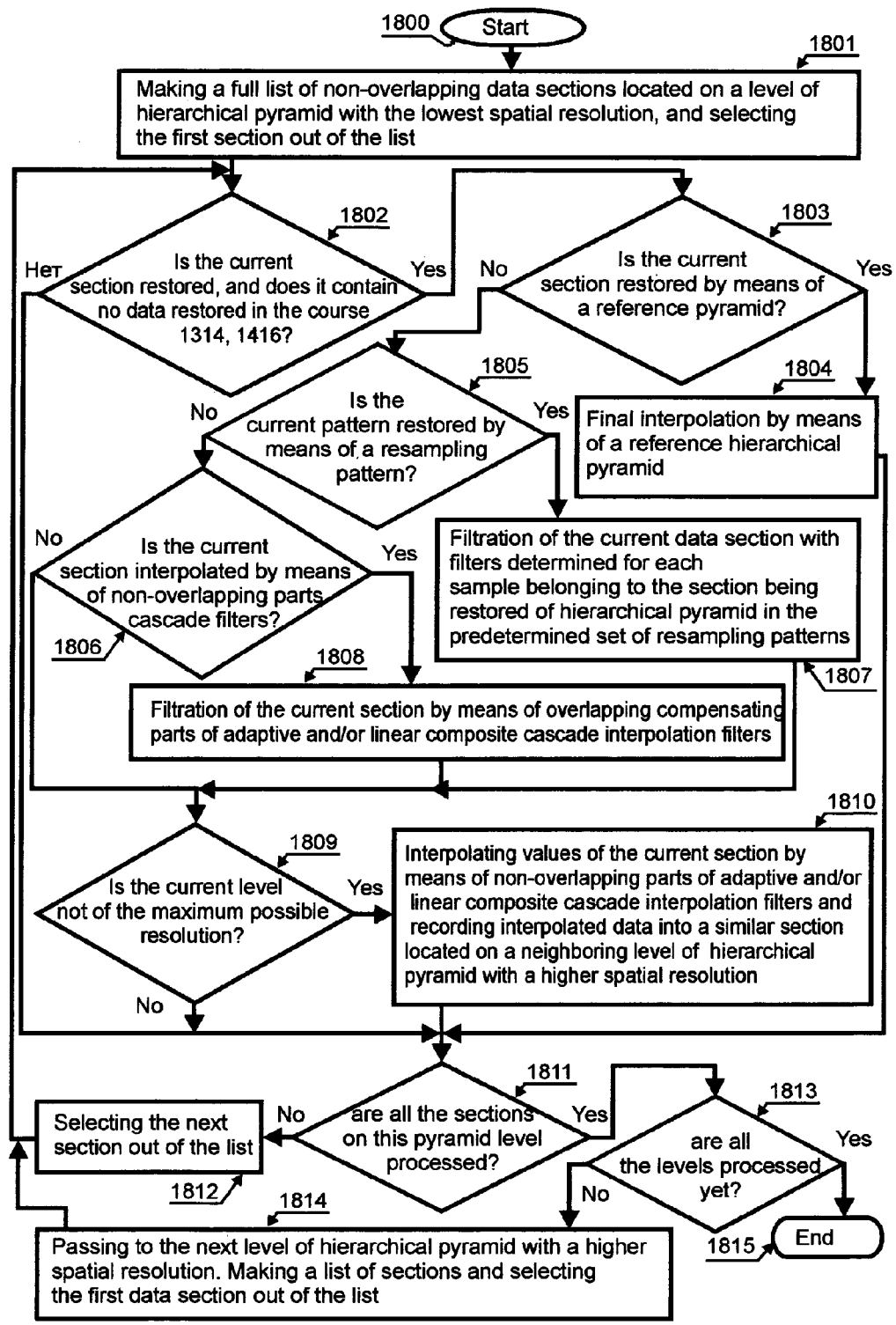
FIG. 18 is a sequence of operations with an operating unit of final filtration and interpolation of transmitted data.
Figure 19:
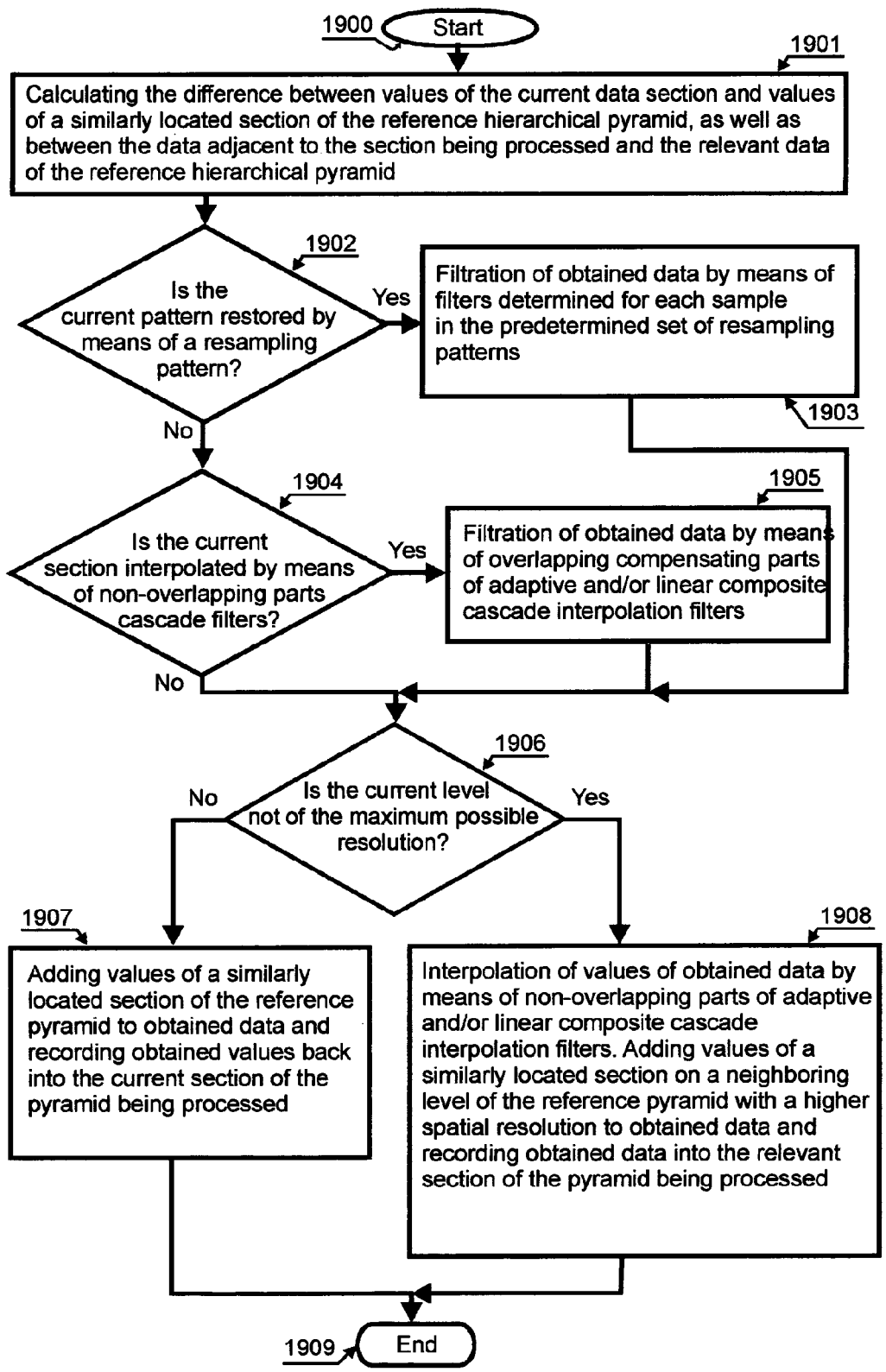
FIG. 19 is a sequence of operations with an operating unit of final filtration and interpolation of transmitted data, if the current data section was restored by means of a reference hierarchical pyramid.

FIG. 18 presents an example of sequence of operations with the aforesaid unit (1316) operating. At the first stage (1801), there is performed creation of a full list of non-overlapping data sections located on the level of hierarchical pyramid with the lowest spatial resolution, and selection of the first section out of the list. It is followed by checking (1802) the type of the current section by means of support data array (1315). If the current section were not restored (1803), or contains data obtained in unit (1314) of restoring missed sections, for which there are, restored similarly located sections on levels with a higher spatial resolution, the section in question is missed. Otherwise, by means of support data array (1315), it is checked (1805), whether the current data section is restored by means of a resampling pattern. If a resampling pattern was used, filtration of the current data section is performed (1807) by means of overlapping compensating parts of adaptive and/or linear composite cascade interpolation filters determined for each sample belonging to the current data section in storage (1306) of a predetermined set of resampling patterns. It is followed by recording obtained values to the current data section. Otherwise, by means of support data array (1315), it is checked (1806), whether the values of the current data section are obtained by means of non-overlapping parts of adaptive and/or linear composite cascade interpolation filters. If they are, there is performed (1808) filtration of the current section by means of overlapping compensating parts of adaptive and/or linear composite cascade interpolation filters with consequent recording of obtained values to the current data section. Thereafter it is checked (1809), whether the level being processed of the hierarchical pyramid is of the highest spatial resolution, and if it is not, interpolation is performed (1810) of the values of the current section by means of non-overlapping parts of adaptive and/or linear composite cascade interpolation filters, with subsequent recording of interpolated data to a similar section located on a neighboring level of the pyramid with a higher spatial resolution. Additionally, information is renewed in support data array (1315) for the section being recorded. Therefore, at processing the next level of hierarchical pyramid, the recorded section is accounted for as a restored one.

After processing current data section, a check is performed (1811) for availability of unprocessed sections on the current level of the pyramid being restored. If there are such sections, the next section is selected out of the list (1812), and the processing cycle is repeated. Otherwise, it is checked, whether all the levels of the hierarchical pyramid being restored are processed, and if it is not the case, transition is performed (1814) to the next level of hierarchical pyramid with a higher spatial resolution. Meanwhile, a full list is created of data sections on the new level of the hierarchical pyramid, and the first section is selected out of the list, whereupon the processing cycle is repeated. If, however, all the levels of the hierarchical pyramid being processed, the process is completed (1815). At the end of the process of final interpolation, restored data are read (1317) from the level of hierarchical pyramid, which is of the highest spatial resolution.

It is also possible to use an accelerated process of restoring transmitted data. In the accelerated process of restoring, the intermediate stage of restoration performed by unit (1312) of interpolation of missed sections, for which there are restored similarly located sections on levels with a lower spatial resolution, is eliminated, and in the process of operation of unit (1314) of restoring missed sections, for which there are restored similarly located sections on levels with a higher spatial resolution, filtration (1703) of values of the current data section by means of adaptive and/or linear overlapping low-pass filters is replaced with filtration of non-overlapping low-pass filters. An example of such an accelerated process is presented in FIG. 20. At the first stage (2006), operation of unit (1305) of restoring transmitted data sections is followed by successive filling (2007) levels of hierarchical pyramid, which have low spatial resolution, by means of modified unit (1314) of restoring missed sections, for which there are restored similarly located sections on levels with a higher spatial resolution. As a result, the level of the pyramid being restored, which has the lowest spatial resolution, is completely filled (2008), which is immediately followed by the process (1316) of final filtration and interpolation. Here, it is possible to combine the fast and slow methods of restoring transmitted data. For example, it is possible to use the fast method of restoration for levels of the pyramid being restored, which are of high spatial resolution, and the slow method for the rest of the levels.

It is also possible to use another, yet more accelerated method of restoring transmitted data, where no low-pass filtration is performed in the unit of restoring missed sections, for which there are restored similarly located sections on levels with a higher spatial resolution, with the decimation process immediately performed instead. Here, it is also possible to combine the fast and slow methods of restoration for different levels of the hierarchical pyramid being restored.

Additionally, it is possible to use a variant of the claimed method of decoding data, where a one-dimensional data array encoded through a lossy compression method is obtained from subsamples obtained from sections of the hierarchical pyramid formed of encoded digital signals without using resampling patterns, whereas information encoded through a lossless method contains no data on the type of applied resampling patterns, as the aforesaid patterns were not used in encoding. Then the process of restoring transmitted data sections is performed without using resampling patterns, and the process of final filtration is not performed altogether, with only the process of final interpolation implemented.

Additionally, the claimed method and device for decoding may include the following essential features:

Encoded data may be obtained from sections of different fixed size, whereas a number of sets of resampling patterns are used in the process of restoring transmitted data sections, each of them intended for its own fixed size of section.

If encoded data constitute a full-color image presented in the form of several independently encoded color planes, each of the aforesaid planes is decoded independently from the others.

Together with encoded data, information may be encoded through a lossless method, which contains unambiguous description of the process of restoring encoded data sections from a restored array of subsamples, that is, resampling patterns used in encoding, or just parts of these patterns. Here, the process of restoring transmitted data in the unit of lossless encoding of transmitted patterns is preceded by lossless decoding of information containing transmitted resampling patterns, or just parts thereof, whereupon this decoded information is added to storage (1306) of a predetermined set of resampling patterns and is used later in the process of restoring transmitted data sections.

The encoding process may be performed for the entire input data array, or else this array may be divided into overlapping units, and for each unit the above-enumerated operations may be performed independently from the others.

Figure 14:
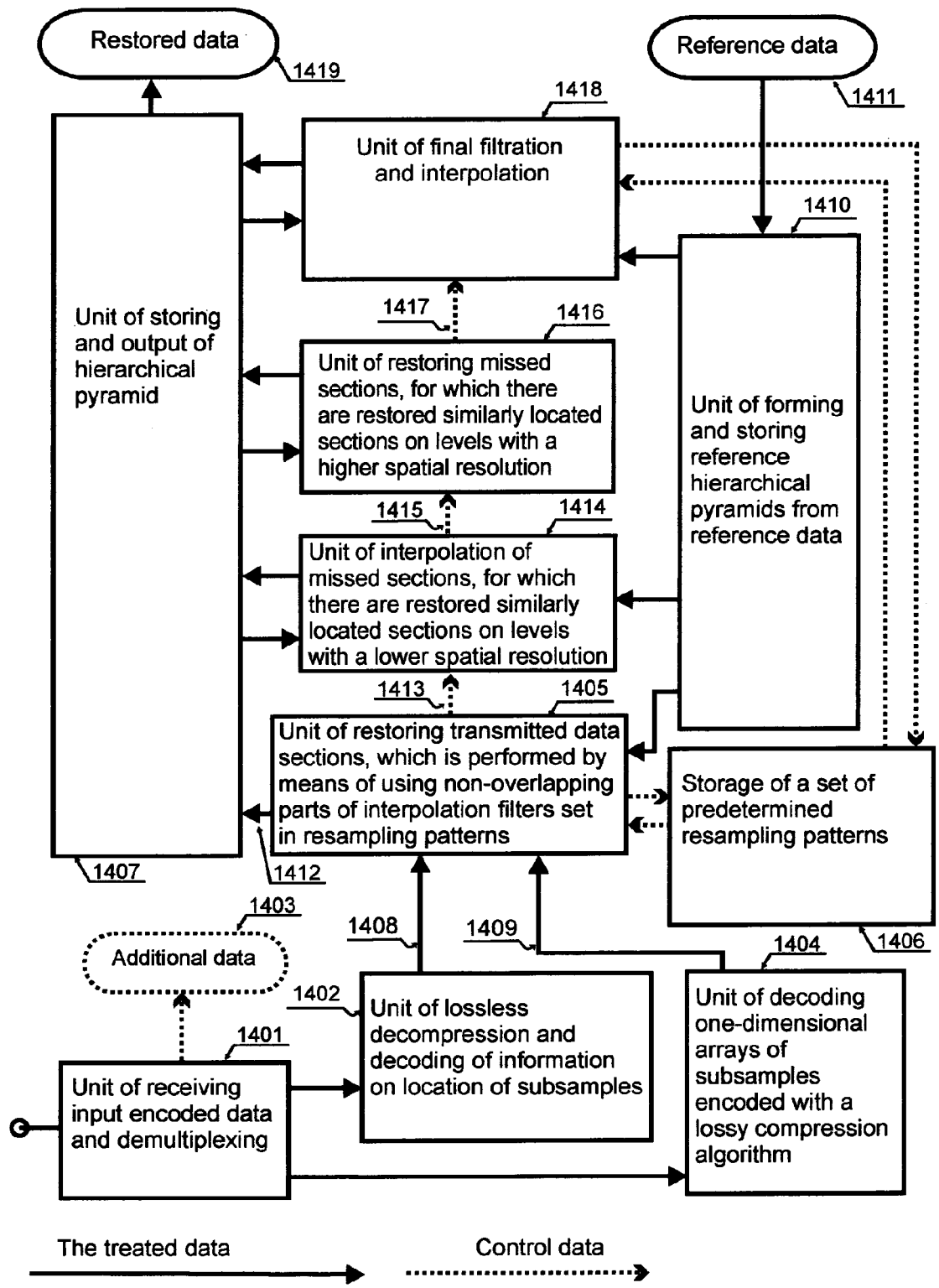
FIG. 14 is a general diagram of a device implementing the above method of decoding, provided reference data arrays are used.

FIG. 14 is schematic presentation of a device implementing a variant of the claimed method of decoding data, where decoded data are presented in the form of a one-dimensional data arrays compressed through a lossy compression method, and information encoded through a lossless method, where the aforesaid one-dimensional data arrays is obtained from subsamples obtained by means of adaptive and/or linear filters from sections of the hierarchical pyramid formed of digital signals being encoded, and from sections of differential pyramids obtained from the aforesaid pyramid, as well as from reference hierarchical pyramids of the same size as the aforesaid pyramid and obtained from reference data arrays, whereas the aforesaid adaptive and/or linear filters are set in the resampling patterns selected from a predetermined set of resampling patterns and used at encoding, whereas the aforesaid information contains data encoded through the lossless method on location of the aforesaid subsamples in the aforesaid pyramid and in differential pyramids, as well as data encoded through the lossless method on the type of resampling patterns used for obtaining these subsamples.

At the first stage of this method, compressed data are divided in unit (1401) of receiving input encoded data and demultiplexing. Here, additional data are singled out (1403), which may contain, e.g., information on the number of decimation levels used in compression, or on the size of the original data array. Additional information may also be used for setting rules to be used for forming reference data arrays. Compressed arrays of subsamples are restored in units of the one-dimensional data array, which are combined in unit (1404) of decoding one-dimensional arrays of subsamples encoded by means of an algorithm of lossy compression. In particular, each unit of decoding one-dimensional data array may successively use algorithms of arithmetic decoding, inverse quantization and inverse DCT transform. Compressed data on location of subsamples in the original hierarchical pyramid and in differential hierarchical pyramids are decoded in unit (1402) of lossless decompression and decoding of information on location of subsamples. In particular, this unit may use the algorithm of arithmetic decoding and the algorithm of decoding information from a compact hierarchical tree structure of data. Besides, this unit decodes information on types of resampling patterns used in encoding.

Thereafter, unit (1410) of forming and storing reference hierarchical pyramids from reference data, by means of adaptive and/or linear low-pass filters, forms reference hierarchical pyramids from reference data (1411). Then, in unit (1405) of restoring transmitted data sections, restoration is performed of transmitted sections of the original hierarchical pyramid and saving them (1412) to unit (1407) of storing and output of hierarchical pyramid.

FIG. 15 presents an example of sequence of operations with operating unit (1405) of restoring transmitted data sections performed by means of non-overlapping parts of interpolation filters determined in resampling patterns. At the first stage (1501), based on decoded information (1408) on location of subsamples and type of applied resampling patterns, a list is created of all data sections transmitted by the encoding device, and information is read on location and type of the applied resampling pattern for the first data section on the list. If the current section is encoded with a resampling pattern (1502), values of the restored array of subsamples are read (1409), and the current data section is restored by means of non-overlapping parts of adaptive and/or linear composite cascade interpolation filters determined for each sample of the data section being restored in the resampling pattern being used (1504). Here, the resampling pattern being used is read from storage (1406) of a set of resampling patterns. Otherwise (1503), direct restoration is performed (1409) of the current data section by means of values from the restored values from the restored array of subsamples. Then, if (1505) the current section is encoded by means of a reference hierarchical pyramid, values of a similarly located section taken from the relevant reference hierarchical pyramid stored in unit (1410) of forming and storing of reference hierarchical pyramids from reference data are added (1506) to values of the current data section. Data obtained in the aforesaid way (1412) are recorded (1507) to a relevant place in unit (1407) of storing and output of hierarchical pyramid. Additionally, information on parameters of restoration of the current data section is saved to support data array (1413). If (1509) not all the transmitted data sections are processed, information is read (1508) on the next section on the list, and processing is repeated. Otherwise, the process is completed (1510).

It is followed by restoration of sections missed at the previous stage and saving thereof to unit (1407) of storing and output of hierarchical pyramid. This process is performed by unit (1414) of interpolation of missed sections, for which there are restored similarly located sections on levels with a lower spatial resolution.

FIG. 16 presents an example of sequence of operations with this unit (1414) operating. At the first stage (1601), a full list is created of non-overlapping data sections located on the level of hierarchical pyramid with the lowest spatial resolution, and the first section from the list is selected. Then, by means of support data array (1413), it is checked (1602), whether the current section contains restored data. If there are no such data on the section, the section is not processed. Otherwise, by means of support data array (1413), it is checked (1603), whether a reference pyramid of data was used in restoring the current section. If no reference pyramid was used, interpolation is performed (1604) of the current data section by means of non-overlapping interpolation filters. Otherwise, values of a similarly located section of the reference hierarchical pyramid are deducted (1605) from values of the current data section. It is followed by interpolation (1606) of obtained data by means of non-overlapping interpolation filters. Thereafter, values of a similarly located section located on the next level of reference pyramid with a higher spatial resolution is added (1607) to obtained data.

Figure 21:
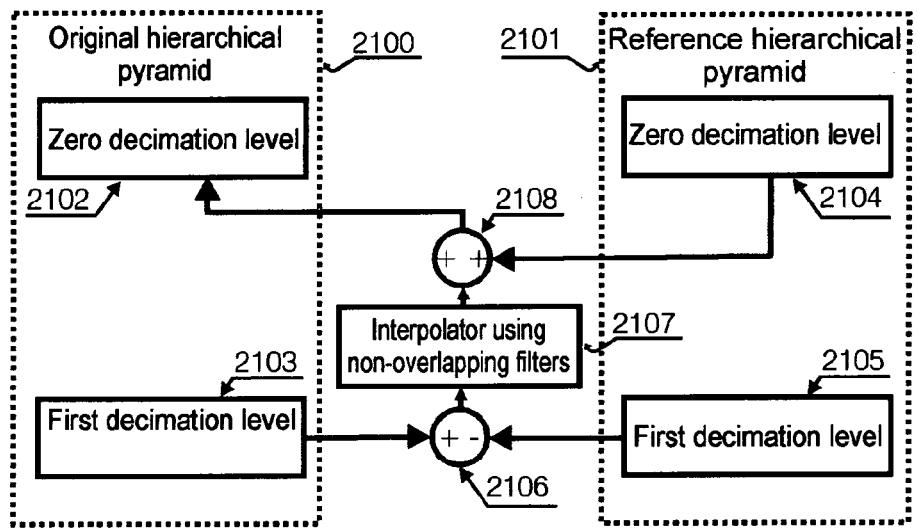
FIG. 21 is a flowchart of calculations performed during intermediate interpolation, provided a reference hierarchical pyramid is used.

FIG. 21 presents a flow chart of these stages (1605,1606, 1607) for two levels of original (2100) and reference (2101) hierarchical pyramids. Data of the reference hierarchical pyramid (2105) located in the relevant way are deducted (2106) from values of restored data located on the first level of the pyramid being processed (2103). Obtained differential values are interpolated by non-overlapping interpolator (2107), whereupon they are added (2108) with values of the zero level of reference hierarchical pyramid (2104) located in the relevant way, and obtained data are saved to the zero level of the pyramid being processed (2102). In the general sequence of operations presented in FIG. 16, the process of recording (1608) of obtained data is also performed for sections restored without using the reference hierarchical pyramid. Obtained values are recorded (1608) to a similar section located on a neighboring level of the pyramid being restored with a higher spatial resolution. In addition, information is renewed for the section being recorded in support data array (1413); apart from that, all the accumulated support data are copied to output support data array (1415). Therefore, in processing the next levels of hierarchical pyramid, the recorded section is accounted for as a restored one. If (1609) there are still unprocessed sections on the level being processed of the hierarchical pyramid, the next section is selected from the list (1610), and the cycle is repeated. Otherwise, it is checked (1611), whether the next unprocessed level of hierarchical pyramid is of the highest spatial resolution, and if it is not, transition is performed (1612) to the next level of hierarchical pyramid with a higher spatial resolution. Here, a full list is created of data sections on the new level of the hierarchical pyramid, and the first section is selected from the list, whereupon processing is repeated. If, however, only the level of hierarchical pyramid with the highest spatial resolution remains unprocessed, processing is completed (1613).

It is followed by restoration of missed sections of the hierarchical pyramid located on levels of the hierarchical pyramid being processed with low spatial resolution and saving these sections to unit (1407) of storing and output of hierarchical pyramid. This process is performed by means of unit (1416) of restoring of missed sections, for which there are restored similarly located sections on levels with a higher spatial resolution.

FIG. 17 presents an example of sequence of operations with this unit (1416) operating. At the first stage (1701), a full list is created of non-overlapping data sections located on the level of hierarchical pyramid with the highest spatial resolution, and the first section is selected from the list. Then, by means of support data array (1415), check is performed (1702) for availability of unrestored section located similarly to the current restored data section, yet being on the nearest level of hierarchical pyramid with a lower spatial resolution. If there is no such section, or the current section is not restored, no processing is performed. Otherwise, filtration is performed (1703) of values of the current data section, by means of adaptive and/or linear overlapping low-pass filters, with subsequent decimation (1704) of obtained values. A reduced copy obtained in the aforesaid way of the data section being processed is recorded (1705) to the relevant unrestored section belonging to the nearest level of hierarchical pyramid with a lower spatial resolution than the level being processed. Here, information is renewed in support data array (1415) for the recorded data section; apart from this, all the accumulated support data are copied to output support array (1417). Therefore, in processing of the next levels of the pyramid being restored, the recorded section is accounted for as a restored one. If (1706) there are still unprocessed sections on the level being processed of the hierarchical pyramid, the next section is selected from the list (1707), and the cycle is repeated. Otherwise, it is checked (1708), whether the next unprocessed level of the hierarchical pyramid is of the lowest spatial resolution, and if it is not, transition is performed (1709) to the next level of hierarchical pyramid with a lower spatial resolution. Here, a full list is created of data sections on the new level of hierarchical pyramid, and the first section is selected from the list, whereupon the processing cycle is repeated. If, however, only the level of hierarchical pyramid with the lowest spatial resolution remains unprocessed, processing is completed (1710).

It is followed by processes of final interpolation and filtration of data sections stored in unit (1407) of storing and output of hierarchical pyramid. This process is performed by unit (1418) of final filtration and interpolation.

FIG. 18 presents an example of sequence of operations, with this unit (1418) operating. At the first stage (1801), a full list is created of non-overlapping data sections located on the level of hierarchical pyramid with the lowest spatial resolution, and the first section is selected from the list. It is followed by checking (1802) the type of the current section by means of support data array (1417). If (1803) the current section were not restored or contains data obtained in unit (1416) of restoring missed sections, for which there are restored similarly located sections on levels with a higher spatial resolution, the section in question is missed. Otherwise, by means of support data array (1417), it is checked (1803), whether a reference hierarchical pyramid was used in restoring the current section. If no reference pyramid was used, it is checked (1805), by means of support data array (1417), whether the current data section is restored by means of a resampling pattern. If a resampling pattern was used, the current data section is filtered (1807) by means of overlapping compensating parts of adaptive and/or linear composite cascade interpolation filters determined for each sample belonging to the current data section in storage (1406) of a predetermined set of resampling patterns. It is followed by recording obtained values to the current data section. Otherwise, by means of support data array (1417), it is checked (1806), whether values of the current data section are obtained by means of non-overlapping parts of adaptive and/or linear composite cascade interpolation filters. If it is the case, filtration of the current section is performed (1808) by means of overlapping compensating parts of adaptive and/or linear composite cascade interpolation filters, with subsequent recording of obtained values to the current data section. Thereafter, it is checked (1809), whether the level being processed of the hierarchical pyramid is of the highest spatial resolution, and if it is not, interpolation is performed (1810) of values of the current section by means of non-overlapping parts of adaptive and/or linear composite cascade interpolation filters, with subsequent recording of interpolated data to a similar section located on a neighboring level of the pyramid with a higher spatial resolution. Additionally, information is renewed in support data array (1417) for the section being recorded. Therefore, in processing of the next level of the hierarchical pyramid, the recorded section is accounted for as a restored one. If, however, the current data section was restored by means of a reference hierarchical pyramid, there is performed process (1804) of final interpolation, with using a reference hierarchical pyramid. An example of sequence of operations in implementation of this process (1804) in unit (1418) of final filtration and interpolation is presented in FIG. 19.

At the first stage (1901), the difference is calculated between values of the current data section and values of a similarly located section of the reference hierarchical pyramid, as well as between the data adjacent to the section being processed and corresponding data of the reference hierarchical pyramid. Thereafter, by means of support data array (1417), it is checked (1902), whether the current section is restored by means of a resampling pattern. If a resampling pattern was used, filtration of data obtained at the first stage (1901) is performed (1903) by means of overlapping compensating parts of adaptive and/or linear composite cascade interpolation filters determined for each sample belonging to the current data section in storage (1406) of a predetermined set of resampling patterns. Otherwise, by means of support data array (1417), it is checked (1904), whether values of the current data section are obtained by means of non-overlapping parts of adaptive and/or linear composite cascade interpolation filters, and if it is, filtration of data obtained at the first stage (1901) is performed (1905) by means of overlapping compensating parts of adaptive and/or linear composite cascade interpolation filters. It is followed by checking (1906), whether the current level has the maximum possible resolution. If the current level has no maximum possible resolution, interpolation is performed (1908) of data obtained at previous stages, by means of non-overlapping parts of adaptive and/or linear composite cascade interpolation filters, with subsequent addition to obtained data of values of a similarly located section being on a neighboring level of reference pyramid with a higher spatial resolution, and with subsequent recording of obtained values to the relevant section of the pyramid being processed. Additionally, information is renewed in support data array (1417) for the section being recorded. Therefore, in processing the next level of the hierarchical pyramid, the recorded section is accounted for as a restored one. Otherwise, there are performed (1907) adding values of a similarly located section of the reference pyramid to obtained data, and recording obtained values back to the current section of the pyramid being processed.

Figure 22:
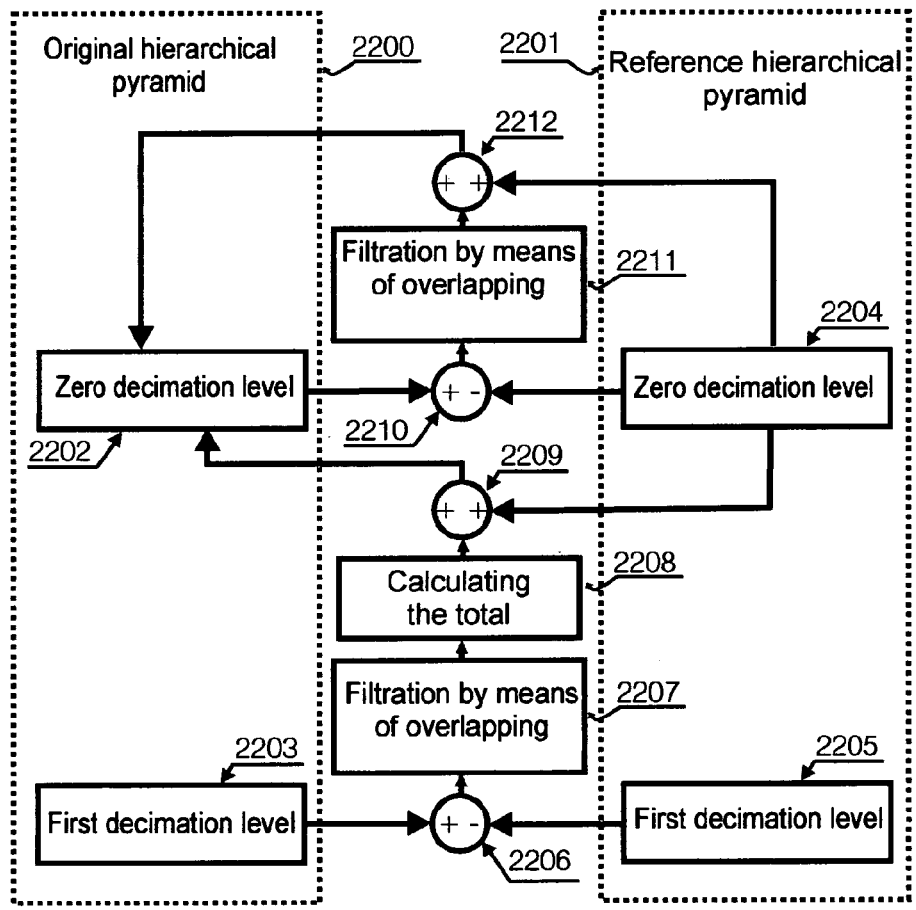
FIG. 22 is a flowchart of calculations performed in the process of final interpolation, provided a reference hierarchical pyramid is used.

FIG. 22 presents an example of flow chart of final interpolation with using a reference hierarchical pyramid for two levels of the hierarchical pyramid being restored (2200) and the reference hierarchical pyramid (2201). Data of the reference hierarchical pyramid (2205) located in the relevant way are deducted (2206) from values of restored data located on the first level of the pyramid being processed (2203). Obtained differential values are filtered (2207) by means of overlapping compensating parts of adaptive and/or linear composite cascade interpolation filters, whereupon they are interpolated (2208) by means of non-overlapping parts of adaptive and/or linear composite cascade interpolation filters. Thereafter, values of the zero level of the reference hierarchical pyramid (2204) located in the relevant way are added (2209) to obtained values. After that, obtained data are saved (2202) to the zero level of the pyramid being processed. An additional processing cycle is performed for processing the zero decimation level (2203). Data of the reference hierarchical pyramid located in the relevant way (2204) are deducted (2210) from values of restored data located on the zero level (2202) of the pyramid being processed. Obtained differential values are filtered (2211) by means of overlapping compensating parts of adaptive and/or linear composite cascade interpolation filters, whereupon values of the zero level of the reference hierarchical pyramid (2104) located in the relevant way are added thereto (2212), whereupon obtained data are saved (2202) to the zero level of the pyramid being processed.

Processing by unit (1418) of final filtration and interpolation of the next data section is followed by checking (1811) availability of unprocessed sections on the current level of the pyramid being restored. If such sections are available, the next section is selected from the list (1812), and the processing cycle is repeated. Otherwise, it is checked (1813), whether all the levels of the hierarchical pyramid being restored are processed, and if it is not the case, transition is performed (1814) to the next level of hierarchical pyramid with a higher spatial resolution. Here, a full list of data sections on the new level of hierarchical pyramid, and the first section is selected from the list, whereupon the processing cycle is repeated. If, however, all the levels of the hierarchical pyramid being processed, the process is completed (1815). At the end of the process of final interpolation, restored data (1419) are read from the level of the hierarchical pyramid being processed, which is of the highest spatial resolution.

It is also possible to use an accelerated process of restoring transmitted data. With the accelerated restoring process, the intermediate stage of restoration performed by unit (1414) of interpolation of missed sections, for which there are restored similarly located sections on levels with a lower spatial resolution, is eliminated, and in the process of operation of unit (1416) of restoring missed sections, for which there are restored similarly located sections on levels with a higher spatial resolution, filtration (1703) of values of the current data section, by means of adaptive and/or linear overlapping low-pass filters is replaced, with filtration with non-overlapping low-pass filters. An example of such an accelerated process is presented in FIG. 20. At the first stage (2006), after operation of unit (1405) of restoring transmitted sections by means of non-overlapping parts of interpolation filters determined in resampling patterns, there is performed successive filling (2007) of levels of hierarchical pyramid, which have a low spatial resolution, by means of modified unit (1416) of restoring missed sections, for which there are restored similarly located sections on levels with a higher spatial resolution. As a result, the level of the pyramid being restored, which has the lowest spatial resolution, is filled completely (2008), which is immediately followed by the process (1418) of final filtration and interpolation. Here, it is possible to combine the fast and slow methods of restoring transmitted data. For example, it is possible to use the fast method of restoration for levels of the pyramid being restored, which are of high spatial resolution, and the slow method for the rest of the levels.

It is also possible to use another, yet more accelerated method of restoring transmitted data, where no low-pass filtration is performed in the unit of restoring missed sections, for which there are restored similarly located sections on levels with a higher spatial resolution, with the decimation process immediately performed instead. Here, it is also possible to combine the fast and slow methods of restoration for different levels of the hierarchical pyramid being restored.

In addition, it is possible to use a variant of the claimed method of decoding data, where a one-dimensional data arrays encoded through the lossy compression method is obtained from subsamples obtained by means of adaptive and/or linear filters from sections of the hierarchical pyramid formed of digital signals being encoded, and from sections of differential pyramids obtained from the aforesaid pyramid and from reference hierarchical pyramids of the same size as the aforesaid pyramid, obtained from reference data arrays, and where the aforesaid subsamples were obtained without using resampling patterns, and information encoded through the lossless method contains no data on the type of used resampling patterns, as the aforesaid patterns were not used in encoding. In this case, the process of restoring transmitted data sections is performed without using resampling patterns, and the process of final filtration is not performed altogether, with just the process of final interpolation implemented instead.

Additionally, the claimed method and device for decoding may include the following essential features:

Encoded data may be obtained from sections of different fixed size, whereas a number of sets of resampling patterns are used in the process of restoring transmitted data sections, each of them intended for its own fixed size of section.

If encoded data constitute a full-color image presented in the form of several independently encoded color planes, each of the aforesaid planes is decoded independently from the others.

Together with encoded data, information may be encoded through a lossless method, which contains unambiguous description of the process of restoring encoded data sections from a restored array of subsamples, that is, resampling patterns used in encoding, or just parts of these patterns. Here, the process of restoring transmitted data in the unit of lossless encoding of transmitted patterns is preceded by lossless decoding of information containing transmitted resampling patterns, or just parts thereof, whereupon this decoded information is added to storage (1406) of a predetermined set of resampling patterns and is used later in the process of restoring transmitted data sections.

The encoding process may be performed for the entire input data array, or else this array may be divided into overlapping units, and for each unit the above-enumerated operations may be performed independently from the others.

Figure 23:
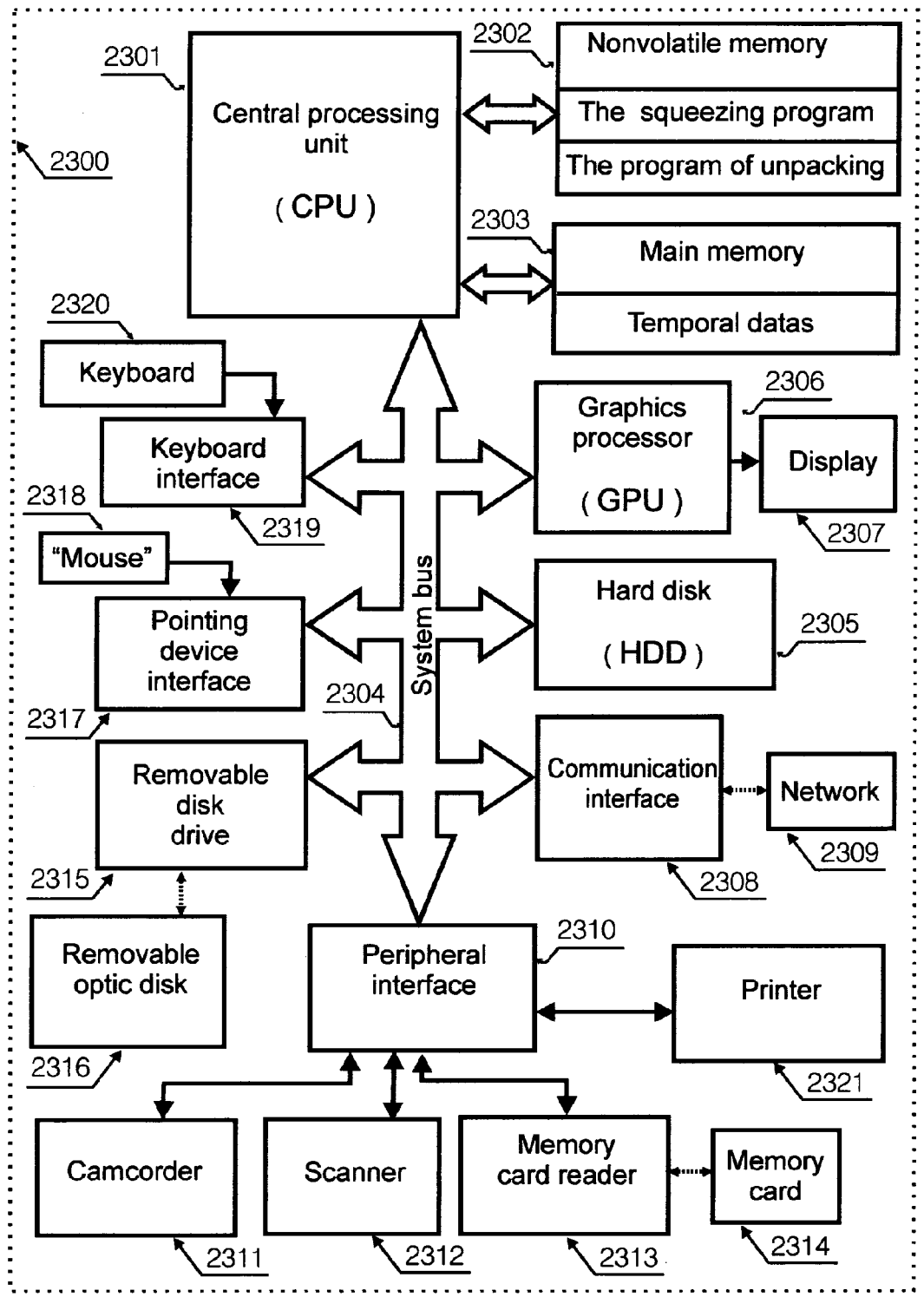
FIG. 23 is a schematic presentation of an example of implementation of a system comprising an encoding device of the presented invention, or just a component thereof, and/or comprising a decoding device of the presented invention, as well as a component thereof.

The system presented in a schematic way in FIG. 23 may comprise an encoding device of the claimed invention, or just a component thereof, and/or comprise a decoding device of the claimed invention, as well as a component thereof. In particular, the system (2300) may be a micro-computer connected through interface (2310) to various peripherals, such as camcorder (2311), scanner (2312), reader (2313) of memory cards (2314), printer (2320), as well as other devices, which may digitize, store, make physical copies of images and/or video sequences.

System (2300) comprises communication interface (2308), which may transmit via network (2309) images and video sequences compressed by system (2300), and/or receive from network (2309) compressed images and video sequences remotely transmitted for system (2300).

System (2300) also comprises storage device (2305), e.g., hard disk. System (2300) comprises drive (2315) for removable information carriers (2316), such as optical compact disks (CD) or digital versatile disks (DVD). Driver for removable carriers (2315) may also use other data carriers, such as removable hard disks, cassettes with magnetic tape or memory cards. Removable information carriers (2316), integrated information carrier (2305), as well as connectable peripherals (2313, 2314) may contain data encoded in the aforesaid way, as well as programs, which implement essential parts of the above-mentioned method of encoding and/or decoding.

Besides, programs, which implement the method of encoding and/or decoding presented in this invention, may be in nonvolatile memory (2302) recorded in the process of manufacturing device (2300), or may, be transmitted to system (2300) via network (2309) through communication interface (2308).

System (2300) may additionally comprise display (2307) for displaying decoded images and/or for interaction with the user. Besides, system (2300) may comprise keyboard (2320) with interface (2319) and/or pointing device (2318) with interface (2317), as well as other devices, which enable the user to interact with system (2300), in particular, select the data compression threshold (317).

System (2300) comprises unit (2301) of central processor, which is connected to above-described units (2305, 2308, 2310, 2315, 2317, 2319), as well as to unit (2306) of graphics processor, by means of system bus (2304). Central processor (2301) is also connected to nonvolatile memory (2302) and main memory (2303), and fulfills instructions recorded in nonvolatile memory (2302) or recorded in other units (2303, 2305, 2316, 2314) for implementation of the method of encoding and/or decoding described in this invention.

Central processor (2301) is able to fulfill efficiently operations required for implementation of all the above-described essential stages of the claimed invention and shown in FIGS. 2 to 22.

Central processor (2301), jointly with nonvolatile memory (2302) and main memory (2303) may implement the following essential parts of the claimed encoding device:
  Unit of forming and storing a hierarchical pyramid from input data.
  Unit of forming reference hierarchical pyramids from reference data
  Unit of calculating interlevel difference.
  Unit of calculating and storing differential hierarchical pyramids
  Unit (318, 504) of calculating local compression thresholds.
  Unit (320, 535) of preliminary classification of data sections.
  Unit (322, 538) of final classification of data sections and adaptive non-linear filtration and resampling.
  Storage (323, 537) of predetermined resampling patterns.
  Unit (324,541) of converting filtered subsamples into one-dimensional arrays.
  Unit (330, 550) of encoding location of subsamples and lossless compression.
  Units (329, 546, 549) of lossy compression combined in unit of lossy compression of one-dimensional data arrays.
  Unit (332, 551) of output driver.
  Unit (202, 209) of converting the data format.
  Unit (211) of forming reference arrays at encoding.
  Unit (214) of forming reference arrays at decoding.
  Unit (206, 215) of inverse transformation of data format.

Besides, system (2300) may also contain additional devices able to implement efficiently essential parts of the claimed encoding device. In particular, unit (2306) of graphics processor, jointly with nonvolatile memory (2302) and main memory (2303), may implement one or a number of above-enumerated essential parts of the claimed encoding device.

In addition, central processor (2301), jointly with nonvolatile memory (2302) and main memory (2303), may implement the following essential parts of the claimed decoding device:
  Unit (1301, 1401) of receiving encoded data and demultiplexing.
  Unit (1302, 1402) of lossless decompression and decoding of information on location of subsamples.
  Unit (1304, 1404) of decoding one-dimensional arrays of subsamples encoded by means of the algorithm of lossy compression.
  Unit (1410) of forming and storing reference hierarchical pyramids from reference data.
  Unit (1305, 1405) of restoring transmitted data sections.
  Storage (1306, 1406) of a set of predetermined resampling patterns.
  Unit (1307, 1407) of storing and output of hierarchical pyramid.
  Unit (1312, 1414) of interpolation of missed sections, for which there are restored similarly located sections on levels with a lower spatial resolution.
  Unit (1314, 1416) of restoring missed sections, for which there are restored similarly located sections on levels with a higher spatial resolution.
  Unit (1316, 1418) of final filtration and interpolation.
  Unit (214) of forming reference arrays at decoding.
  Unit (206, 215) of inverse transformation of data format.

System (2300) may also comprise additional devices, which are able to implement efficiently essential parts of the claimed decoding device. In particular, unit (2306) of graphics processor, jointly with nonvolatile memory (2302) and main memory (2303) may implement one or a number of above-enumerated essential parts of the claimed decoding device.

After switching on system (2300), the program of encoding and/or decoding may be read from nonvolatile memory (2302) into main memory (2303) and directly executed, or else, intermediate software may be loaded, which would read the program of encoding and/or decoding from other data carriers, or receive it via network interface (2308) through network (2309).

System bus (2304) exercises communication between different devices within system (2300), e.g., between central processor (2301) and graphics processor (2306). Specific configuration of the central bus may differ from the one shown in FIG. 23. In particular, central processor (2301) may be connected to nonvolatile memory (2302) via system bus (2304).

Applying a set of resampling patterns in the process of compression makes possible efficient use of two-dimensional correlation dependencies in data being compressed. Patterns contained in a set are selected in such a way to transform efficiently common sections of data being encoded. For example, using vertical pattern (901) on a data section with sharp horizontal drops and smooth vertical variations, it is possible to achieve fourfold reduction in the number of transmitted samples relative to the original data section (900), with virtually the same accuracy of its restoration. During decoding, by means of preliminary stages of restoration (1312, 1314, 1414, 1416), and by means of composite cascade interpolation filters, restoration is performed of all the sections of the hierarchical pyramid, which adjoin the transmitted sections. It allows exercising the process of final interpolation of transmitted data sections with using a large number of samples adjacent thereto of the pyramid being restored, which makes possible to raise significantly the interpolation accuracy. Interpolation accuracy may be raised even more substantially through using adaptive filters, which would analyze data sections adjacent to the one being restored, thus optimizing their operation. As a result, owing to a more efficient method of interpolating subsamples being restored and using an adaptively applied set of resampling patterns, interpolation accuracy is raised, with concurrent reduction of the number of subsamples required for correct interpolation.

Therefore, there are created efficient methods of encoding and decoding digital signals, as well as devices for implementation thereof, and systems for efficient transmission of digital signals via limited throughput communication channels, and there is expanded a range of methods of encoding and decoding digital signals, encoding and decoding devices, as well as systems for transmission of digital signals via limited throughput communication channels.

Meanwhile, the compression ratio for encoding is raised, without increasing the computational complexity of encoding device, distortions at decoding are reduced, without increasing the computational complexity of decoding device, and high quality is ensured for transmission of digital signals via a limited throughput communication channel. The claimed group of inventions presents new methods of encoding and decoding data, which allow raising efficiency of compression and/or improving the quality of the image being restored.

Industrial Applications

The present invention is embodied with multipurpose equipment extensively employed by the industry.

Sources of Information

[1] John G. Proakis, Dimitris G. Manolakis: Digital Signal Processing (Third Edition), Prentice-Hall 1996, pp 782-810, ISBN 0-13-394338-9.

[2] Bart et al. The Laplacian Pyramid as a Compact Image Code, IEEE Transactions, vol. COM-31, No. 4; April 1983; pp. 532-540.

[3] Martens; Jean B. O. S.; U.S. Pat. No. 4,864,396, September, 1989.

[4] Golin; Stuart J.; U.S. Pat. No. 5,305,103, Apr. 19, 1994.

[5] Weldy; John A.; U.S. Pat. No. 5,020,120, May 28, 1991.

[6] Kondo, et al.; U.S. Pat. No. 5,767,986, Jun. 16, 1998.

[7] Prakash, et al.; U.S. Pat. No. 6,876,771, Apr. 5, 2005.

[8] Kondo; Tetsujiro; U.S. Pat. No. 6,192,076, Feb. 20, 2001.

[9] Feria; Erlan H.; U.S. Pat. No. 6,760,479 Jul. 6, 2004.

[10] Feria, et al.; U.S. Pat. No. 7,046,856 May 16, 2006.

[11] Farrelle P. M. Recursive block coding for image data compression, Springer, 1990; pp 191-224.

[12] Miyaoka, et al.; U.S. Pat. No. 4,947,447, Aug. 7, 1990.

[13] Chan; Yiu K.; U.S. Pat. No. 5,343,539, Aug. 30, 1994.

[14] S. Mallat; Zhang. Matching pursuit with time-frequency dictionaries. IEEE Transactions on Signal Processing, No. 12, December 1993.

[15] Han, et al.; U.S. Pat. No. 6,771,835, Aug. 3, 2004.

[16] Zheng; Joe; U.S. Pat. No. 6,453,074, Sep. 17, 2002.

The invention claimed is:

1. Method of encoding digital signals, where, by means of computing facilities, as well as adaptive and/or linear overlapping low-pass filters, a hierarchical pyramid is formed based on encoded data, signal differences between this pyramid's levels are calculated to be used in the course of preliminary classification of the aforesaid hierarchical pyramid, which is carried out successively, from the level of a section with the lowest spatial resolution to the level of a section with the highest spatial resolution, and the aforesaid hierarchical pyramid is finally classified with a predetermined set of resampling patterns, whereupon each section of the aforesaid hierarchical pyramid selected at the stage of preliminary classification is converted into an array of subsamples, which is achieved by means of adaptive and/or linear filters set in the resampling pattern put in line with the aforesaid section at the final classification, and the obtained array is converted into a one-dimensional data array, with information on location of obtained subsamples and resampling patterns used for obtaining thereof saved, whereupon the aforesaid array is encoded through lossy compression, and information on location of subsamples is encoded through lossless compression.

2. Method according to claim 1, characterized in that the calculated signal difference between the levels of the aforesaid hierarchical pyramid is used to change the compression threshold at different sections of encoded data.

3. Method according to claim 1, characterized in that, if no pattern can be selected from the predetermined set of patterns for a section of the aforesaid hierarchical pyramid chosen in the course of preliminary classification, samples contained in such a section are directly added to the array of subsamples to be created, whereas information is saved stating that none of the patterns was used on the section in question.

4. Method according to claim 1, characterized in that information on location of obtained subsamples and the type of resampling patterns used for obtaining thereof, which is saved in the course of encoding, is presented in the form of a hierarchical tree structure.

5. Method according to claim 1, characterized in that signal differences between the levels of the aforesaid hierarchical pyramid are calculated by means of adaptive and/or linear overlapping interpolation filters.

6. Method according to claim 1, characterized in that the process of compression of the one-dimensional array of subsamples is optimized by means of statistical data collected at the stages of preliminary and final classification.

7. Method according to claim 1, characterized in that preliminary and final classifications are optimized, with a criterion of minimization of the common distortion level used for a predetermined data level.

8. Method according to claim 1, characterized in that the process of converting an array of subsamples into a one-dimensional array is carried out as an adaptive process, its parameters changing depending on statistics of signals being processed.

9. Method according to claim 1, characterized in that a hierarchical pyramid is formed based on encoded data with at least three decimation levels.

10. Method according to claim 1, characterized in that in the course of preliminary classification of sections of the aforesaid hierarchical pyramid, sections of different fixed size are used, whereas in the course of final classification by means of a predetermined set of resampling patterns, several resampling patterns are used, each of them intended for its own size of section being processed.

11. Method according to claim 1, characterized in that contents, or a part of contents, of the used set of resampling patterns is encoded through the lossless method and saved together with encoded data.

12. Method according to claim 1, characterized in that data being encoded constitute full-color image presented as a number of color planes, each of which is encoded separately.

13. Method according to claim 1, characterized in that the process of encoding a one-dimensional data array is carried out through discrete cosine transform and linear and/or non-linear adaptive quantization, with subsequent encoding of data obtained after quantization, together with quantization parameters, through a method of encoding with variable-length codes.

14. Method according to claim 1, characterized in that the process of encoding a one-dimensional data array is carried out through stationary and/or adaptive wavelet transform, as well as linear and/or non-linear adaptive quantization, with subsequent encoding of data obtained after quantization, together with quantization parameters, through a method of encoding with variable-length codes.

15. Method according to claim 1, characterized in that the process of encoding a one-dimensional data array is carried out through stationary and/or adaptive sub-band transform, as well as linear and/or non-linear adaptive quantization, with subsequent encoding of data obtained after quantization, together with quantization parameters, through a method of encoding with variable-length codes.

16. Method according to claim 13, characterized in that, instead of the method of encoding with variable-length codes, the arithmetic encoding method is used, jointly with a predetermined and/or adaptive statistical model.

17. Method according to claim 1, characterized in that, before being encoded, the one-dimensional data array undergoes preliminary segmentation, whereas encoding is carried out through several various lossy compression methods to be selected individually for each obtained segment.

18. Method according to claim 4, characterized in that the method of encoding with variable-length codes is used for encoding information on location of subsamples and the type of resampling patterns applied.

19. Method according to claim 4, characterized in that the method of arithmetic encoding jointly with a predetermined and/or adaptive statistical model is used for encoding information on location of subsamples and the type of resampling patterns applied.

20. Method according to claim 1, characterized in that its operations are performed for an entire array of data being encoded.

21. Method according to claim 1, characterized in that the array of data being encoded is preliminarily divided into overlapping blocks, with operations performed for each block independently from the others.

22. Method of decoding digital signals presented as a one-dimensional array of data obtained from subsamples taken from sections of a hierarchical pyramid formed from digital signals being encoded (the aforesaid array compressed through the lossy compression method) and information on location of these subsamples in the aforesaid pyramid encoded through the lossless compression method, where there is performed restoration of the array of subsamples through the lossy decoding method, decoding information on location of transmitted subsamples through the lossless method, restoration of transmitted sections of the hierarchical pyramid with the restored array of subsamples and decoded information on their location, restoration of missed sections of the hierarchical pyramid, for which there are restored similarly located sections on levels with a higher spatial resolution, performed by means of non-overlapping filters with subsequent decimation, whereupon the process of final interpolation of transmitted data is performed with adaptive and/or linear composite cascade overlapping interpolation filters, which is carried out successively, from the level of a section with the lowest spatial resolution to the level of a section of the aforesaid pyramid with the highest spatial resolution, whereupon restored digital signals are read from the hierarchical pyramid level with the highest spatial resolution.

23. Method according to claim 22, characterized in that the encoded one-dimensional data array is formed of subsamples obtained from sections of the aforesaid hierarchical pyramid by means of adaptive and/or linear filters set in the resampling pattern used in encoding, the above pattern selected out of a predetermined set of resampling patterns, where information on the type of resampling patterns applied is encoded together with information on location of transmitted subsamples; here, in the course of restoration of transmitted sections of the hierarchical pyramid, non-overlapping parts of adaptive and/or linear composite cascade interpolation filters are used, which are determined for each sample belonging to a section being restored of the hierarchical pyramid in a predetermined set of resampling patterns, whereas, concurrently with the process of final interpolation, there is performed final filtration of transmitted data sections with overlapping compensating parts of adaptive and/or linear composite cascade interpolation filters determined for each sample belonging to a section being restored of the hierarchical pyramid in a predetermined set of resampling patterns.

24. Method according to claim 22, characterized in that the process of restoration of missed sections of the hierarchical pyramid, for which there are restored similarly located sections on levels with a higher spatial resolution, is performed without using non-overlapping low-pass filters; instead, direct decimation is performed for sections with a higher spatial resolution.

25. Method according to claim 22, characterized in that, the transmitted data sections having been restored, the process of restoration is performed for the hierarchical pyramid sections missed in the course of restoration, for which there are restored similarly located sections on the pyramid levels with a lower spatial resolution, which is performed by means of non-overlapping interpolation filters, whereas the subsequent restoration of the missed sections of the hierarchical pyramid, for which there are restored similarly located sections on the levels with a higher spatial resolution, is performed by means of overlapping adaptive and/or linear filters with subsequent decimation.

26. Method according to claim 25, characterized in that an additional stage of restoration of missed sections and the corresponding stage of restoration by means of overlapping adaptive and/or linear filters with subsequent decimation are only performed for parts of the levels of the hierarchical pyramid being restored, which have low spatial resolution.

27. Method according to claim 23, characterized in that the aforesaid subsamples are obtained from sections of the above hierarchical pyramid, which have different fixed sizes, whereas the processes of restoration of transmitted data sections and final filtration are performed by means of several sets of resampling patterns, each of them intended for its own fixed section size.

28. Method according to claim 22, characterized in that encoded data contain information encoded through the lossless method, which comprises resampling patterns used in the course of encoding, or just parts of these patterns; here, restoration of encoded data is preceded by decoding of the aforesaid information, whereupon decoded patterns, or parts thereof, are added to the set of resampling patterns used in the process of restoration of encoded data.

29. Method according to claim 22, characterized in that encoded data constitute a number of separately encoded color planes belonging to a full-color image, where the process of decoding is performed independently for each of the encoded color planes.

30. Method according to claim 22, characterized in that its operations are performed for an entire array of data being restored.

31. Method according to claim 22, characterized in that the array of data being restored is preliminarily divided into overlapping blocks, with operations performed for each block independently from the others.

32. Method of encoding digital signals, where, by means of computing facilities, as well as adaptive and/or linear overlapping low-pass filters, a hierarchical pyramid is formed based on encoded data, as well as reference hierarchical pyramids of the same size based on reference data arrays, whereupon, based on the reference hierarchical pyramids and the original hierarchical pyramid, differential hierarchical pyramids are calculated, whereupon signal differences are calculated between the levels of the hierarchical pyramid created based on encoded data and the levels of the aforesaid differential pyramids, with the resulting interlevel difference to be used in the process of preliminary classification of the aforesaid hierarchical pyramid and obtained differential hierarchical pyramids, which is performed successively, from the level of a section with the lowest spatial resolution to the level of a section with the highest spatial resolution, where the aforesaid hierarchical pyramid and the obtained differential hierarchical pyramids are finally classified with a predetermined set of resampling patterns, whereupon each section of the aforesaid hierarchical pyramid and the section of the differential pyramids selected at the stage of preliminary classification is converted into an array of subsamples, which is achieved by means of adaptive and/or linear filters set in the resampling pattern put in line with the aforesaid section at the final classification, and the obtained subsamples are converted into at least two data arrays, for subsamples obtained from the aforesaid pyramid, and for subsamples obtained from differential pyramids, with information on location of obtained subsamples and resampling patterns used for obtaining thereof saved, whereupon the aforesaid arrays are encoded through lossy compression, and information on location of subsamples is encoded through lossless compression.

33. Method according to claim 32, characterized in that the calculated signal difference between the levels of the aforesaid hierarchical pyramid and the levels of the differential pyramids is used to change the compression threshold at different sections of encoded data.

34. Method according to claim 32, characterized in that, if no pattern can be selected from the predetermined set of patterns for a section of the aforesaid hierarchical pyramid and the differential pyramids chosen in the course of preliminary classification, samples contained in such a section are directly added to the array of subsamples to be created, whereas information is saved stating that none of the patterns was used on the section in question.

35. Method according to claim 32, characterized in that information on location of obtained subsamples and the type of resampling patterns used for obtaining thereof, which is saved in the course of encoding, is presented in the form of a hierarchical tree structure.

36. Method according to claim 32, characterized in that signal differences between the levels of the aforesaid hierarchical pyramid and between the levels of the differential pyramids are calculated by means of adaptive and/or linear overlapping interpolation filters.

37. Method according to claim 32, characterized in that the process of compression of one-dimensional arrays of subsamples is optimized by means of statistical data collected at the stages of preliminary and final classification.

38. Method according to claim 32, characterized in that preliminary and final classifications are optimized, with a criterion of minimization of the common distortion level used for a predetermined data level.

39. Method according to claim 32, characterized in that the process of converting an array of subsamples into one-dimensional arrays is carried out as an adaptive process, its parameters changing depending on statistics of signals being processed.

40. Method according to claim 32, characterized in that a hierarchical pyramid is formed based on encoded data, and reference pyramids are formed based on reference data, with at least three decimation levels.

41. Method according to claim 32, characterized in that, in the course of preliminary classification of sections of the aforesaid hierarchical pyramid and differential hierarchical pyramids, sections of different fixed size are used, whereas in the course of final classification by means of a predetermined set of resampling patterns, several resampling patterns are used, each of them intended for its own size of section being processed.

42. Method according to claim 32, characterized in that contents, or a part of contents, of the used set of resampling patterns is encoded through the lossless method and saved together with encoded data.

43. Method according to claim 32, characterized in that encoded data constitute a full-color image presented as a number of color planes, each of which is encoded separately.

44. Method according to claim 32, characterized in that the process of encoding one-dimensional data arrays is carried out through discrete cosine transform and linear and/or non-linear adaptive quantization, with subsequent encoding of data obtained after quantization, together with quantization parameters, through a method of encoding with variable-length codes.

45. Method according to claim 32, characterized in that the process of encoding one-dimensional data arrays is carried out through stationary and/or adaptive wavelet transform, as well as linear and/or non-linear adaptive quantization, with subsequent encoding of data obtained after quantization, together with quantization parameters, through a method of encoding with variable-length codes.

46. Method according to claim 32, characterized in that the process of encoding one-dimensional data arrays is carried out through stationary and/or adaptive sub-band transform, as well as linear and/or non-linear adaptive quantization, with subsequent encoding of data obtained after quantization, together with quantization parameters, through a method of encoding with variable-length codes.

47. Method according to claim 44, characterized in that, instead of the method of encoding with variable-length codes, the arithmetic encoding method is used, jointly with a predetermined and/or adaptive statistical model.

48. Method according to claim 32, characterized in that, before being encoded, one-dimensional data arrays undergo preliminary segmentation, whereas encoding is carried out through several various lossy compression methods to be selected individually for each obtained segment.

49. Method according to claim 35, characterized in that method of encoding with variable-length codes is used for encoding information on location of subsamples and the type of resampling patterns applied.

50. Method according to claim 35, characterized in that the method of arithmetic encoding, jointly with a predetermined and/or adaptive statistical model, is used for encoding information on location of subsamples and the type of resampling patterns applied.

51. Method according to claim 32, characterized in that its operations are performed for an entire array of data being encoded.

52. Method according to claim 32, characterized in that the array of data being encoded is preliminarily divided into overlapping blocks, with operations performed for each block independently from the others.

53. Method of decoding digital signals presented as one-dimensional arrays of data obtained from subsamples taken from sections of a hierarchical pyramid formed from digital signals being encoded and sections of the differential pyramids obtained from the aforesaid pyramid and from reference hierarchical pyramids of the same size obtained from reference data arrays (the aforesaid one-dimensional arrays compressed through the lossy compression method) and information on location of these subsamples in the aforesaid pyramid and in the differential pyramids encoded through the lossless compression method, lies in the fact that there is performed formation of reference hierarchical pyramids based on reference data arrays, decoding of information describing location of transmitted subsamples in the hierarchical pyramid based on encoded data, as well in differential pyramids, which is performed through a lossless decompression method, restoration of the arrays of subsamples through the lossy decoding method, whereupon there is performed restoration of transmitted sections of the aforesaid hierarchical pyramid with the restored arrays of subsamples and decoded information on their location, as well as with reference hierarchical pyramids for sections being restored from subsamples obtained from differential pyramids, whereupon there is performed restoration of missed sections of the hierarchical pyramid, for which there are restored similarly located sections on levels with a higher spatial resolution, performed by means of non-overlapping filters with subsequent decimation, whereupon the process of final interpolation of transmitted data is performed with adaptive and/or linear composite cascade overlapping interpolation filters, which is carried out successively, from the level of a section with the lowest spatial resolution to the level of a section with the highest spatial resolution, where for sections of the aforesaid pyramid restored from subsamples obtained from differential pyramids, and for sections obtained from those sections by means of interpolation, the processes of final filtration and interpolation are performed with using the relevant sections of reference hierarchical pyramids, whereupon restored digital signals are read from the hierarchical pyramid level with the highest spatial resolution.

54. Method according to claim 53, characterized in that encoded one-dimensional data arrays are formed of subsamples obtained from sections of the aforesaid hierarchical pyramid and sections of the differential pyramids by means of adaptive and/or linear filters set in the resampling pattern used in encoding, the above pattern selected out of a predetermined set of resampling patterns, where information on the type of resampling patterns applied is encoded together with information on location of transmitted subsamples; here, in the course of restoration of transmitted sections of the hierarchical pyramid, non-overlapping parts of adaptive and/or linear composite cascade interpolation filters are used, which are determined for each sample belonging to a section being restored of the hierarchical pyramid in a predetermined set of resampling patterns, whereas, concurrently with the process of final interpolation, there is performed final filtration of transmitted data sections with overlapping compensating parts of adaptive and/or linear composite cascade interpolation filters determined for each sample belonging to a section being restored of the hierarchical pyramid in a predetermined set of resampling patterns, where, for sections of the aforesaid pyramid restored from subsamples obtained from differential pyramids, all the above-mentioned processes of filtration and interpolation are performed with using the relevant sections of the reference hierarchical pyramids.

55. Method according to claim 53, characterized in that the process of restoration of missed sections of the hierarchical pyramid, for which there are restored similarly located sections on levels with a higher spatial resolution, is performed without using non-overlapping low-pass filters; instead, direct decimation is performed for sections with a higher spatial resolution.

56. Method according to claim 53, characterized in that, the transmitted data sections having been restored, the process of restoration is performed for the hierarchical pyramid sections missed in the course of restoration, provided that there are restored similarly located sections on the pyramid levels with a lower spatial resolution, which is performed by means of non-overlapping interpolation filters, where, for sections of the aforesaid pyramid restored from subsamples obtained from differential pyramids, the aforesaid interpolation is performed with using the relevant sections of the reference hierarchical pyramids; besides, subsequent restoration of the missed sections of the hierarchical pyramid, for which there are restored similarly located sections on the levels with a higher spatial resolution, is performed by means of overlapping adaptive and/or linear filters with subsequent decimation.

57. Method according to claim 56, characterized in that an additional stage of restoration of missed sections and the corresponding stage of restoration by means of overlapping adaptive and/or linear filters with subsequent decimation are only performed for the part of the levels of the hierarchical pyramid being restored, which have low spatial resolution.

58. Method according to claim 54, characterized in that the aforesaid subsamples are obtained from sections of the above hierarchical pyramid, which have different fixed sizes, whereas the processes of restoration of transmitted data sections and final filtration are performed by means of several sets of resampling patterns, each of them intended for its own fixed section size.

59. Method according to claim 53, characterized in that encoded data contain information encoded through the lossless method, which comprises resampling patterns used in the course of encoding, or just parts of these patterns; here, restoration of encoded data is preceded by decoding of the aforesaid information, whereupon decoded patterns, or parts thereof, are added to the set of resampling patterns used in the process of restoration of encoded data.

60. Method according to claim 53, characterized in that encoded data constitute a number of separately encoded color planes belonging to a full-color image, where the process of decoding is performed independently for each of the encoded color planes.

61. Method according to claim 53, characterized in that its operations are performed for an entire array of data being restored.

62. Method according to claim 53, characterized in that the array of data being restored is preliminarily divided into overlapping blocks, with operations performed for each block independently from the others.

63. Device for implementation of the method of encoding digital signals according to claim 1, which comprises a unit of forming and storing hierarchical pyramid from input data, a unit of calculating interlevel difference, a unit of preliminary classification of data sections, a unit of final classification, filtration and resampling, a unit of converting filtered subsamples into a one-dimensional array, a unit of encoding location of subsamples and lossless compression, a unit of lossy compression of one-dimensional array, an output driver unit, and a storage of a set of predetermined resampling patterns, where the unit of forming and storing hierarchical pyramid from input data is connected to the unit of calculating interlevel difference and the unit of final classification, filtration and resampling, whereas the unit of calculating interlevel difference is connected to the unit of preliminary classification of data sections, where the latter one is connected to the unit of final classification, filtration and resampling, which, in its turn, is connected to the storage of a set of predetermined resampling patterns and to the unit of converting filtered subsamples into a one-dimensional array, which is connected to the unit of encoding location of subsamples and lossless compression, and to the unit of lossy compression of one-dimensional array, their outputs connected to the output driver unit.

64. Device according to claim 63, characterized in that it comprises a unit of calculating local compression thresholds connected to the unit of calculating interlevel difference and to the unit of preliminary classification of data sections.

65. Device according to claim 63, characterized in that the unit of preliminary classification of data section classifies the data into sections of different fixed size, while the unit of final classification, filtration and resampling processes sections of different fixed size.

66. Device according to claim 63, characterized in that it comprises a unit of lossless encoding of resampling patterns, which is connected to the storage of a set of predetermined resampling patterns, and to the output driver unit.

67. Device according to claim 63, characterized in that the process of encoding a full-color image comprising a number of color planes is performed independently for each of the aforesaid planes.

68. Device according to claim 63, characterized in that the output driver unit adds more information to encoded data.

69. Device for implementation of the method for decoding digital signals according to claim 23, which contains a unit of receiving input encoded data and demultiplexing, a unit of lossless decompression and decoding of information on location of subsamples, a unit of decoding a one-dimensional array of subsamples encoded by means of a lossy compression algorithm, a unit of restoration of transmitted data sections, a unit of restoration of missed sections, for which there are similar restored sections on the pyramid levels with a higher spatial resolution, a unit of final filtration and interpolation, a unit of storing and output of hierarchical pyramid, a storage of a set of predetermined resampling patterns; where the unit of receiving input encoded data and demultiplexing is connected to the unit of lossless decompression and decoding of information on location of subsamples, and to the unit of restoration of a one-dimensional array of subsamples encoded by means of a lossy compression, their outputs connected to the unit of restoration of transmitted data sections, which is connected to the unit of storing and output of hierarchical pyramid, the storage of a set of predetermined resampling patterns and the unit of restoration of missed sections, for which there are similar restored sections on the pyramid levels with a higher spatial resolution, the latter being connected to the unit of storing and output of hierarchical pyramid and the unit of final filtration and interpolation, which is connected to the unit of storing and output of hierarchical pyramid, and the storage of a set of predetermined resampling patterns.

70. Device according to claim 69, characterized in that it comprises a unit of interpolation of missed sections, for which there are restored similarly located sections on the levels with a lower spatial resolution, which is connected to the opening of the link between the unit of restoration of transmitted data sections and the unit of restoration of missed sections, for which there are similar restored sections on the pyramid levels with a higher spatial resolution, and also connected to the unit of storing and output of hierarchical pyramid.

71. Device according to claim 69, characterized in that the unit of restoration of transmitted data sections and the unit of final filtration and interpolation work with data sections of different fixed sizes, while using several sets of resampling patterns stored in the storage of a set of resampling patterns, where each of the aforesaid sets is intended for its own fixed size of the section being processed.

72. Device according to claim 69, characterized in that it comprises a unit of lossless decoding of transmitted patterns, which is connected to the unit of receiving input encoded data and demultiplexing, and to the storage of a set of predetermined resampling patterns.

73. Device according to claim 69, characterized in that decoding of encoded full-color image comprising a number of color planes is performed independently for each of the aforesaid planes.

74. Device according to claim 69, characterized in that the unit of receiving encoded data and demultiplexing singles out additional information from encoded data.

75. Device for implementation of the method of encoding digital signals according to claim 32, which comprises a unit of forming and storing a hierarchical pyramid from input data, a unit of forming reference hierarchical pyramids from reference data, a unit of calculating and storing differential hierarchical pyramids, a unit of calculating interlevel difference, a unit of preliminary classification of data sections, as well as a unit of final classification, filtration and resampling, a unit of converting filtered subsamples into one-dimensional arrays, a unit of encoding location of subsamples and lossless compression, a unit of lossy compression of one-dimensional data arrays, a unit of output driver and a storage of a set of predetermined resampling patterns, where the unit of forming and storing hierarchical pyramid from input data is connected to the unit of calculating and storing differential hierarchical pyramids, as well as to the unit of calculating interlevel difference and the unit of final classification, filtration and resampling, while the unit of forming reference hierarchical pyramids from reference data is connected to the unit of calculating and storing differential hierarchical pyramids, whereas the latter one is connected to the unit of final classification, filtration and resampling, and to the unit of calculating interlevel difference, where the latter one is connected to the unit of preliminary classification of data sections, which is connected to the unit of final classification, filtration and resampling, which, in its turn, is connected to the storage of a set of predetermined resampling patterns, and to the unit of converting filtered subsamples into one-dimensional arrays, which is connected to the unit of encoding location of subsamples and lossless compression, and to the unit of lossy compression of data arrays, their outputs connected to the output driver unit.

76. Device according to claim 75, characterized in that it comprises a unit of calculating local compression thresholds, which is connected to the unit of calculating interlevel difference, and to the unit of preliminary classification of data sections.

77. Device according to claim 75, characterized in that the unit of preliminary classification of data sections classifies the data into sections of different fixed size, while the unit of final classification, filtration and resampling processes sections of different fixed size.

78. Device according to claim 75, characterized in that it comprises a unit of lossless encoding of resampling patterns, which is connected to the storage of a set of predetermined resampling patterns, and to the output driver unit.

79. Device according to claim 75, characterized in that the process of encoding a full-color image comprising a number of color planes is performed independently for each of the aforesaid planes.

80. Device according to claim 75, characterized in that the output driver unit adds more information to encoded data.

81. Device for implementation of the method for decoding digital signals according to claim 54, which comprises a unit of receiving input encoded data and demultiplexing, a unit of lossless decompression and decoding of information on location of subsamples, a unit of decoding one-dimensional arrays of subsamples encoded by means of a lossy compression algorithm, a unit of restoration of transmitted data sections, a unit of restoration of missed sections, for which there are similar restored sections on the pyramid levels with a higher spatial resolution, a unit of final filtration and interpolation, a unit of storing and output of hierarchical pyramid, a unit of forming and storing reference hierarchical pyramids from reference data, a storage of a set of predetermined resampling patterns, where the unit of receiving input encoded data and demultiplexing is connected to the unit of lossless decompression and decoding of information on location of subsamples, and to the unit of restoration of one-dimensional arrays of subsamples encoded by means of a lossy compression, their outputs connected to the unit of restoration of transmitted data sections, which is connected to the unit of storing and output of hierarchical pyramid, to the unit of forming and storing reference hierarchical pyramids from reference data, to the storage of a set of predetermined resampling patterns and the unit of restoration of missed sections, for which there are similar restored sections on the pyramid levels with a higher spatial resolution, the latter being connected to the unit of storing and output of hierarchical pyramid and to the unit of final filtration and interpolation, which is connected to the unit of storing and output of hierarchical pyramid, to the unit of forming and storing reference hierarchical pyramids from reference data, and to the storage of a set of predetermined resampling patterns.

82. Device according to claim 81, characterized in that it comprises a unit of interpolation of missed sections, for which there are restored similarly located sections on the levels with a lower spatial resolution, which is connected to the opening of the link between the unit of restoration of transmitted data sections and the unit of restoration of missed sections, for which there are similar restored sections on the pyramid levels with a higher spatial resolution, and also connected to the unit of storing and output of hierarchical pyramid, and to the unit of forming and storing reference hierarchical pyramids from reference data.

83. Device according to claim 81, characterized in that the unit of restoration of transmitted data sections and the unit of final filtration and interpolation work with data sections of different fixed sizes, while using several sets of resampling patterns stored in the storage of a set of resampling patterns, where each of the aforesaid sets is intended for its own fixed size of the section being processed.

84. Device according to claim 81, characterized in that it comprises a unit of lossless decoding of transmitted patterns, which is connected to the unit of receiving input encoded data and demultiplexing, and to the storage of a set of predetermined resampling patterns.

85. Device according to claim 81, characterized in that decoding of an encoded full-color image comprising a number of color planes is performed independently for each of the aforesaid planes.

86. Device according to claim 81, characterized in that the unit of receiving encoded data and demultiplexing singles out additional information from encoded data.

* * * * *